US009517747B2

United States Patent
Hotta et al.

(10) Patent No.: US 9,517,747 B2
(45) Date of Patent: Dec. 13, 2016

(54) SIDE AIRBAG APPARATUS

(71) Applicant: TOYODA GOSEI CO., LTD., Kiyosu-shi, Aichi-ken (JP)

(72) Inventors: Masashi Hotta, Kiyosu (JP); Yuji Sato, Kiyosu (JP); Kensaku Honda, Kiyosu (JP); Hitoshi Kawabe, Kiyosu (JP); Hiroshi Kato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/867,354

(22) Filed: Sep. 28, 2015

(65) Prior Publication Data

US 2016/0016530 A1  Jan. 21, 2016

Related U.S. Application Data

(62) Division of application No. 14/088,710, filed on Nov. 25, 2013, now Pat. No. 9,180,836.

(30) Foreign Application Priority Data

Nov. 30, 2012  (JP) .................................. 2012-262156

(51) Int. Cl.
*B60R 21/233* (2006.01)
*B60R 21/239* (2006.01)
(Continued)

(52) U.S. Cl.
CPC .......... *B60R 21/239* (2013.01); *B60R 21/207* (2013.01); *B60R 21/2334* (2013.01);
(Continued)

(58) Field of Classification Search
CPC .......... B60R 2021/23316; B60R 2021/23324; B60R 2021/2395; B60R 21/239; B60R 21/2342; B60R 21/207; B60R 21/233
See application file for complete search history.

(56) References Cited

U.S. PATENT DOCUMENTS 5,586,782 A  12/1996  Zimmerman, II et al.
5,765,863 A   6/1998  Storey et al.
(Continued)

FOREIGN PATENT DOCUMENTS

JP  48-008974 U  3/1973
JP  06-001013 U  1/1994
(Continued)

OTHER PUBLICATIONS

Office Action mailed Mar. 1, 2016 issued in the corresponding JP patent application No. 2012-262156 (and English translation).

*Primary Examiner* — James English
(74) *Attorney, Agent, or Firm* — Posz Law Group, PLC

(57) ABSTRACT

An airbag of a side airbag apparatus includes an upstream inflation portion, which inflates by inflation gas, and deploys frontward at a side of a vehicle seat. An opening is provided at a wall portion of the upstream inflation portion. A pressure regulator valve closes before an occupant is restrained by the upstream inflation portion, thereby restricting the inflation gas in the upstream inflation portion from flowing through the opening. Upon the occupant restraint, the pressure regulator valve cancels the restriction in response to a change in a tensed state of the dividing portion by an external force applied due to the restraint. A tear seam that connects valve body portions of the pressure regulator valve delays the opening time of the pressure regulator valve upon the occupant restraint by the upstream inflation portion relative to the opening time set only by the pressure regulator valve.

5 Claims, 34 Drawing Sheets

(51) Int. Cl.
   *B60R 21/207*    (2006.01)
   *B60R 21/231*    (2011.01)
   *B60R 21/2334*    (2011.01)
   *B60R 21/2338*    (2011.01)

(52) U.S. Cl.
   CPC   *B60R 21/23138* (2013.01); *B60R 2021/2395* (2013.01); *B60R 2021/23146* (2013.01); *B60R 2021/23324* (2013.01); *B60R 2021/23382* (2013.01)

(56) References Cited

U.S. PATENT DOCUMENTS

| | | | |
|---|---|---|---|
| 5,791,685 A * | 8/1998 | Lachat | B60R 21/23138 280/729 |
| 5,853,191 A * | 12/1998 | Lachat | B60R 21/23138 280/729 |
| 6,056,318 A | 5/2000 | Braunschadel | |
| 6,073,959 A * | 6/2000 | Heinz | B60R 21/23138 280/729 |
| 6,270,113 B1 * | 8/2001 | Wipasuramonton | B60R 21/23138 280/728.1 |
| 6,364,348 B1 * | 4/2002 | Jang | B60R 21/201 280/730.2 |
| 7,192,050 B2 | 3/2007 | Sato et al. | |
| 8,714,584 B2 | 5/2014 | Honda et al. | |
| 8,714,588 B2 | 5/2014 | Honda et al. | |
| 2003/0234528 A1 | 12/2003 | Bohn et al. | |
| 2009/0020987 A1 | 1/2009 | Wipasuramonton et al. | |
| 2012/0025499 A1 * | 2/2012 | Shibayama | B60R 21/233 280/730.2 |
| 2012/0074677 A1 | 3/2012 | Hiruta et al. | |
| 2014/0265275 A1 | 9/2014 | Rickenbach et al. | |

FOREIGN PATENT DOCUMENTS

| | | |
|---|---|---|
| JP | 09-249085 A | 9/1997 |
| JP | 11-222098 A | 8/1999 |
| JP | 2000-016228 A | 1/2000 |
| JP | 2000-153747 A | 6/2000 |
| JP | 2007-331667 A | 12/2007 |
| JP | 2008-155918 A | 7/2008 |
| JP | 2011-031719 A | 2/2011 |
| JP | 2011-031722 A | 2/2011 |
| JP | 2001-122062 A | 5/2011 |
| JP | 2001-213262 A | 8/2011 |
| JP | 2012-030614 A | 2/2012 |
| JP | 2012-066746 A | 4/2012 |

\* cited by examiner

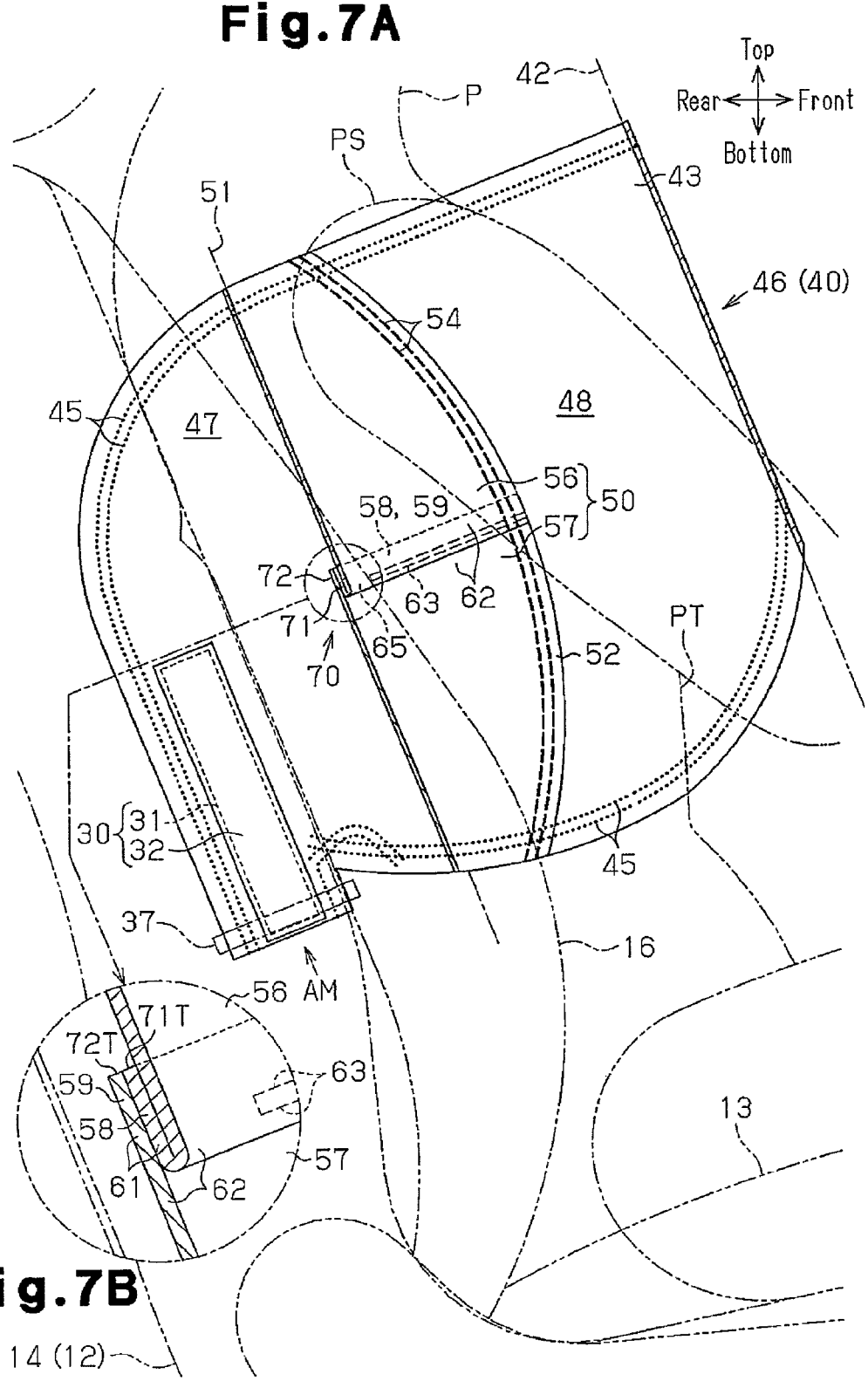

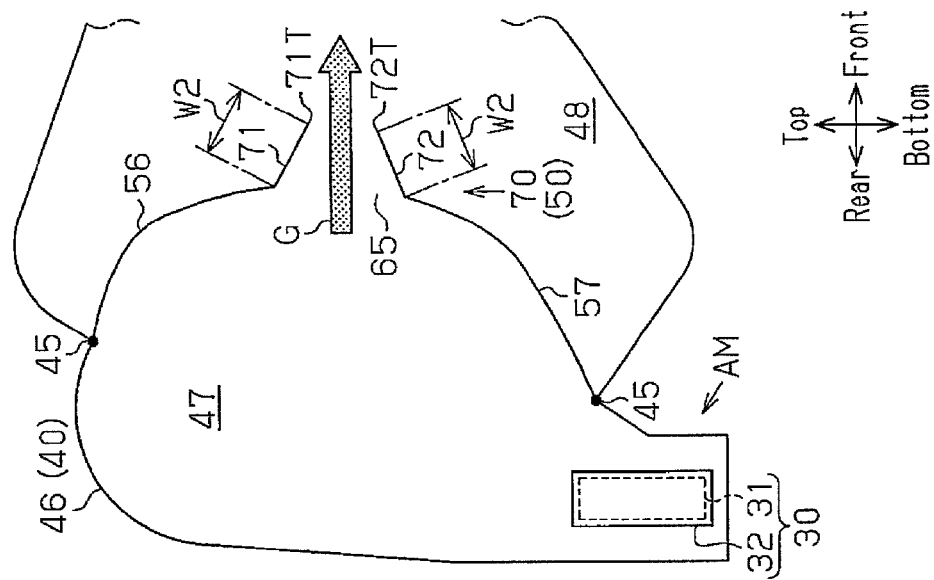
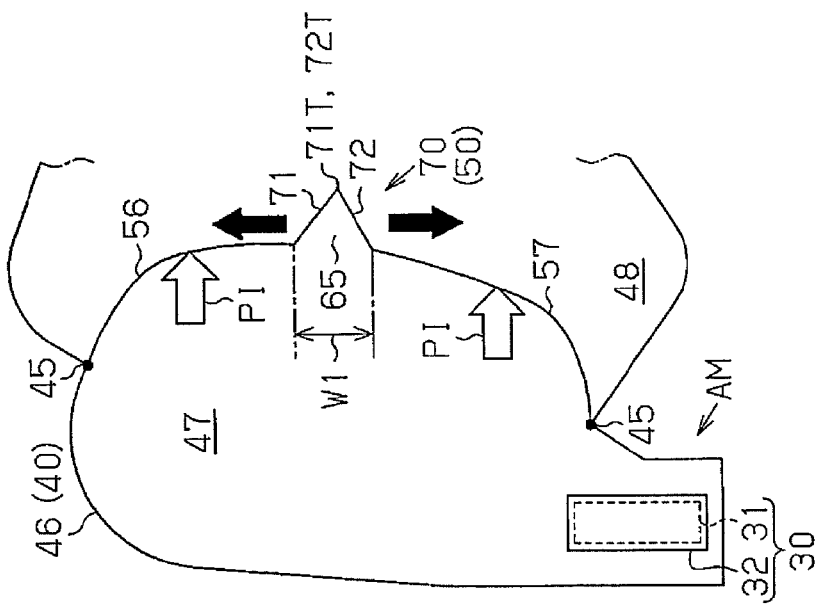
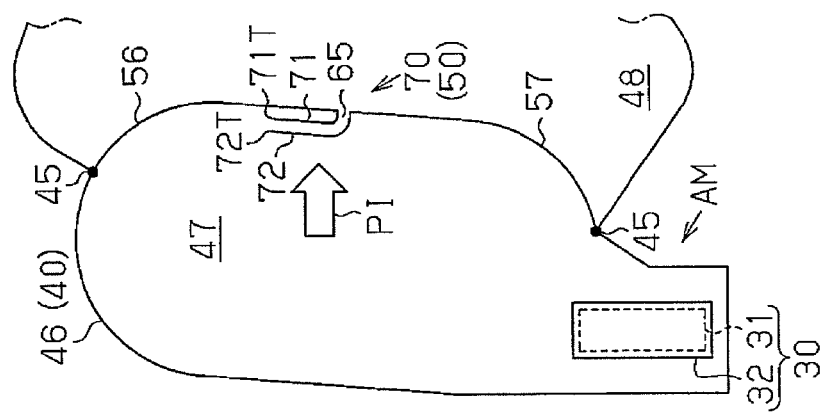

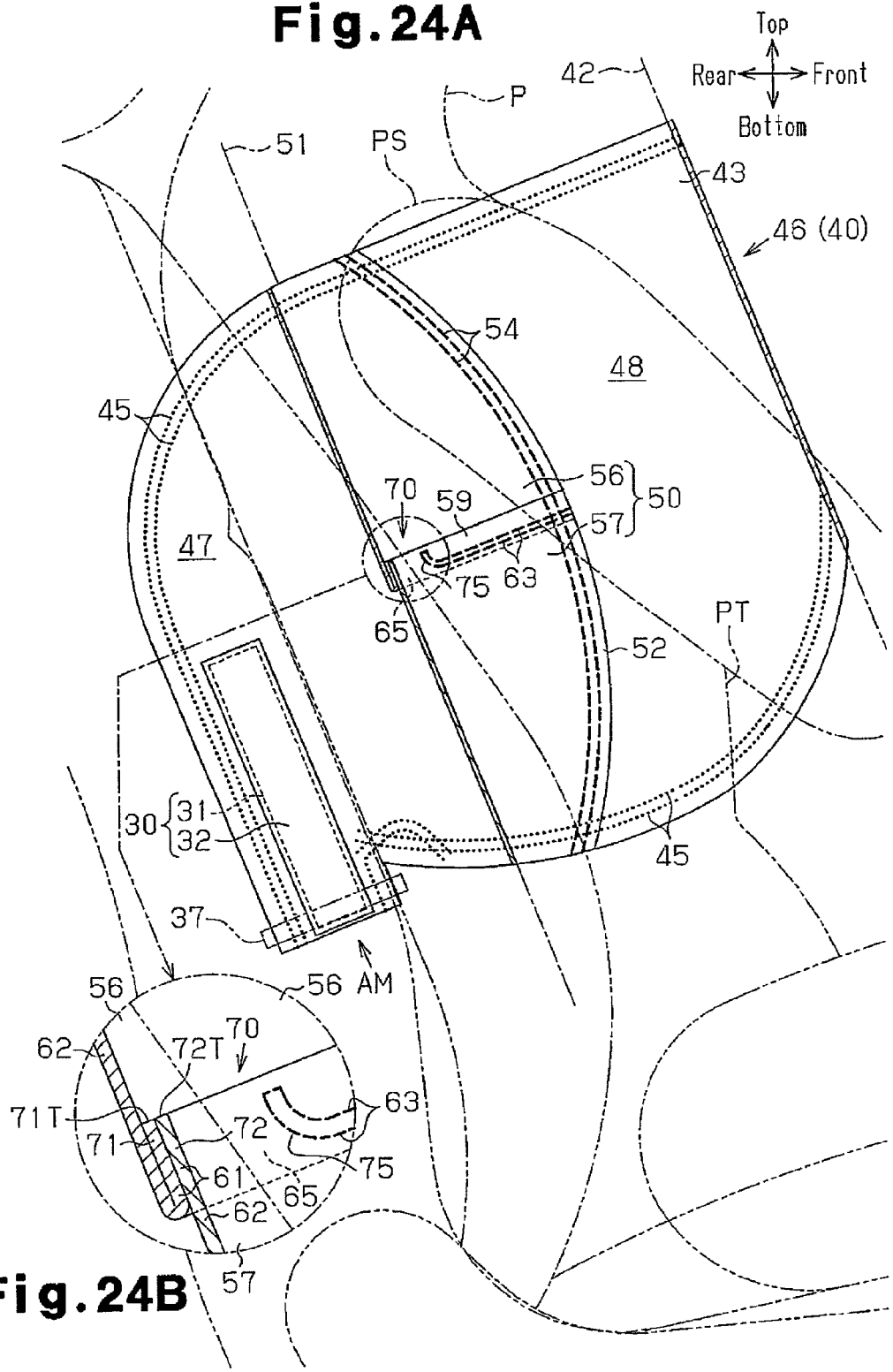

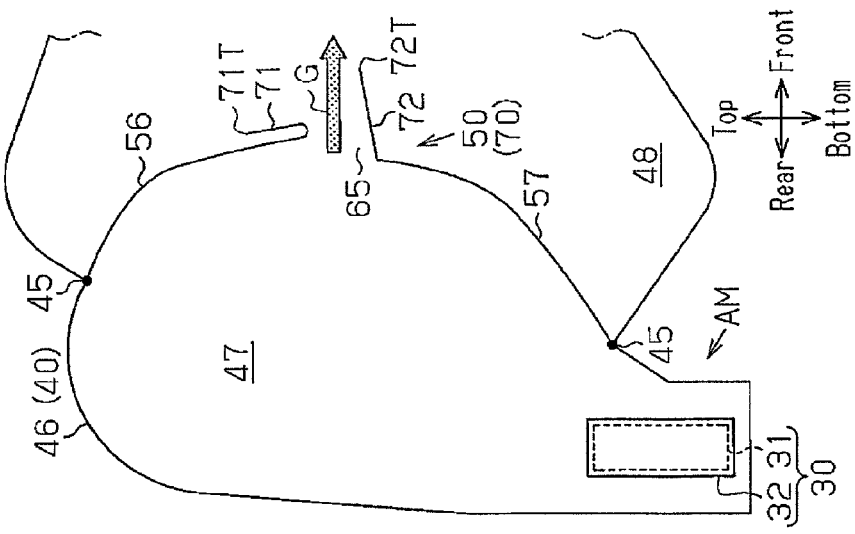
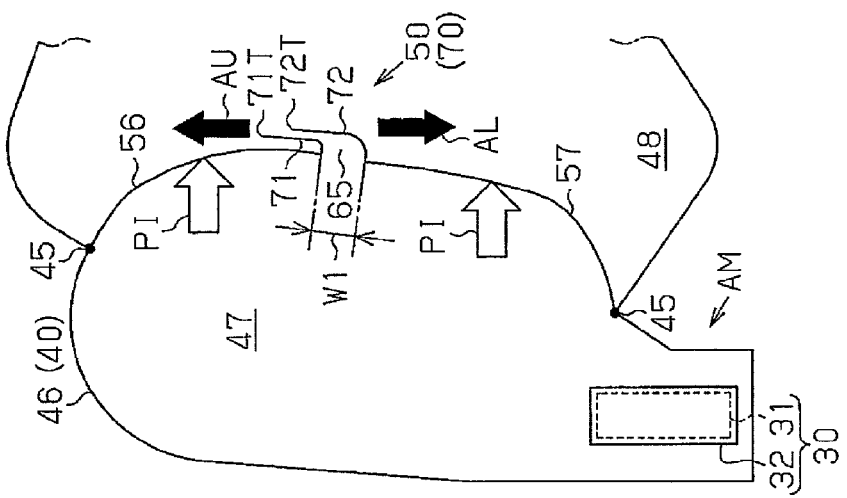
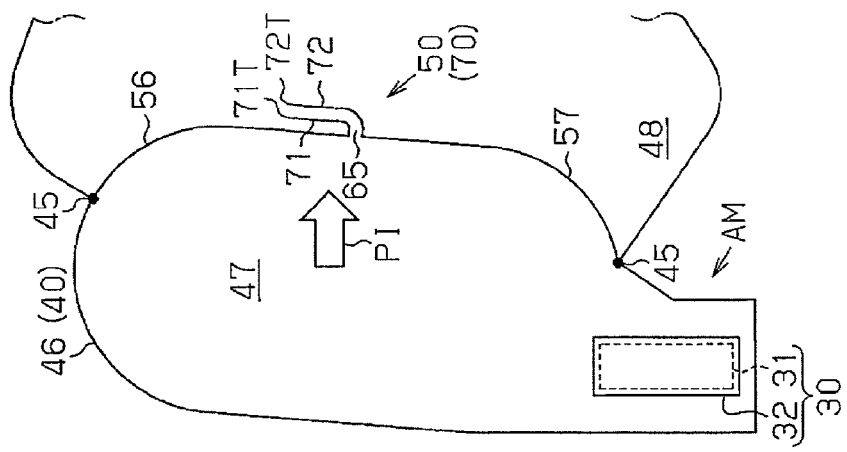

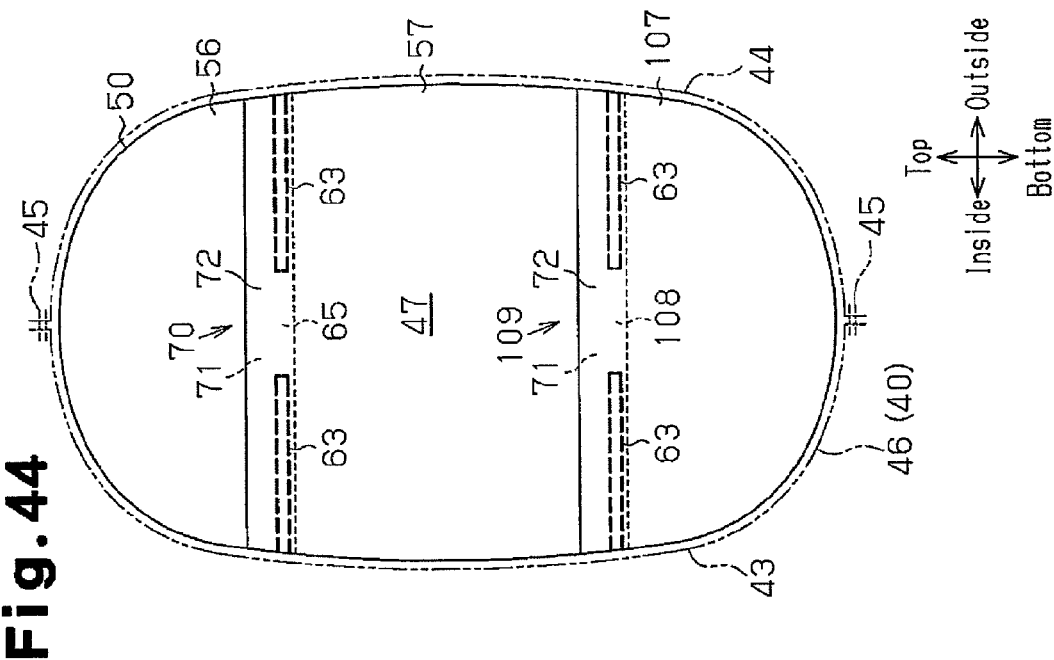
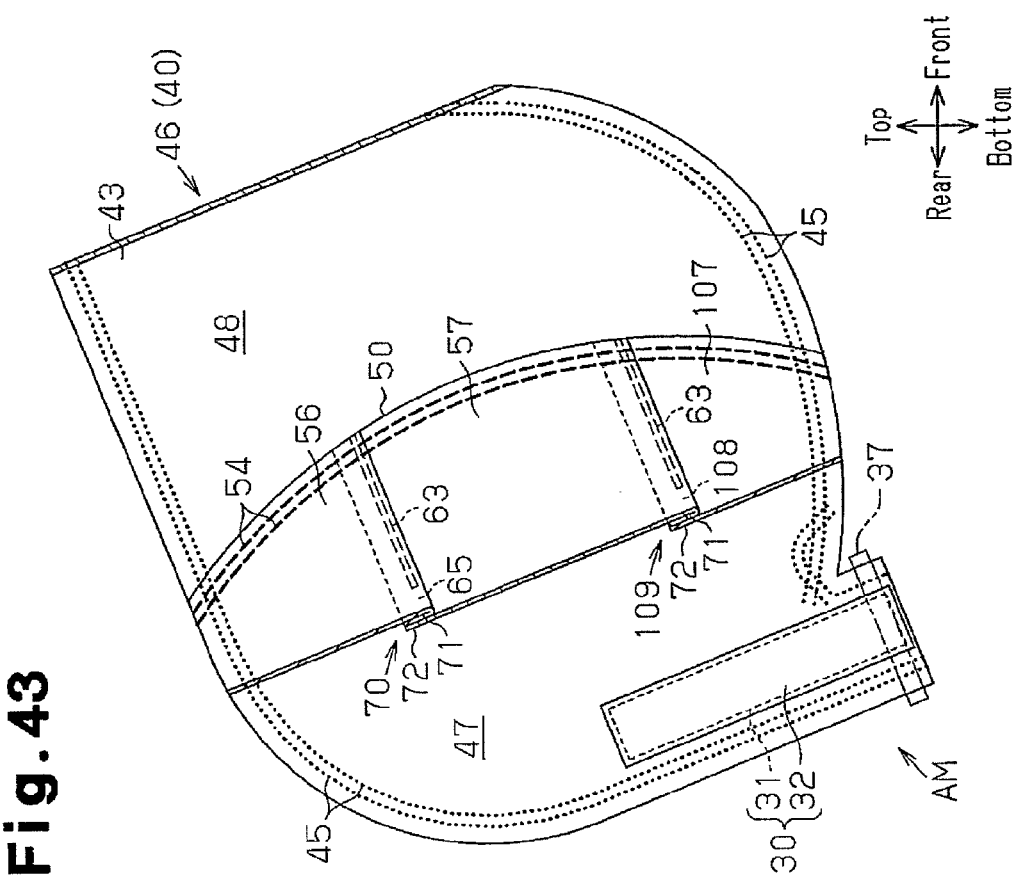

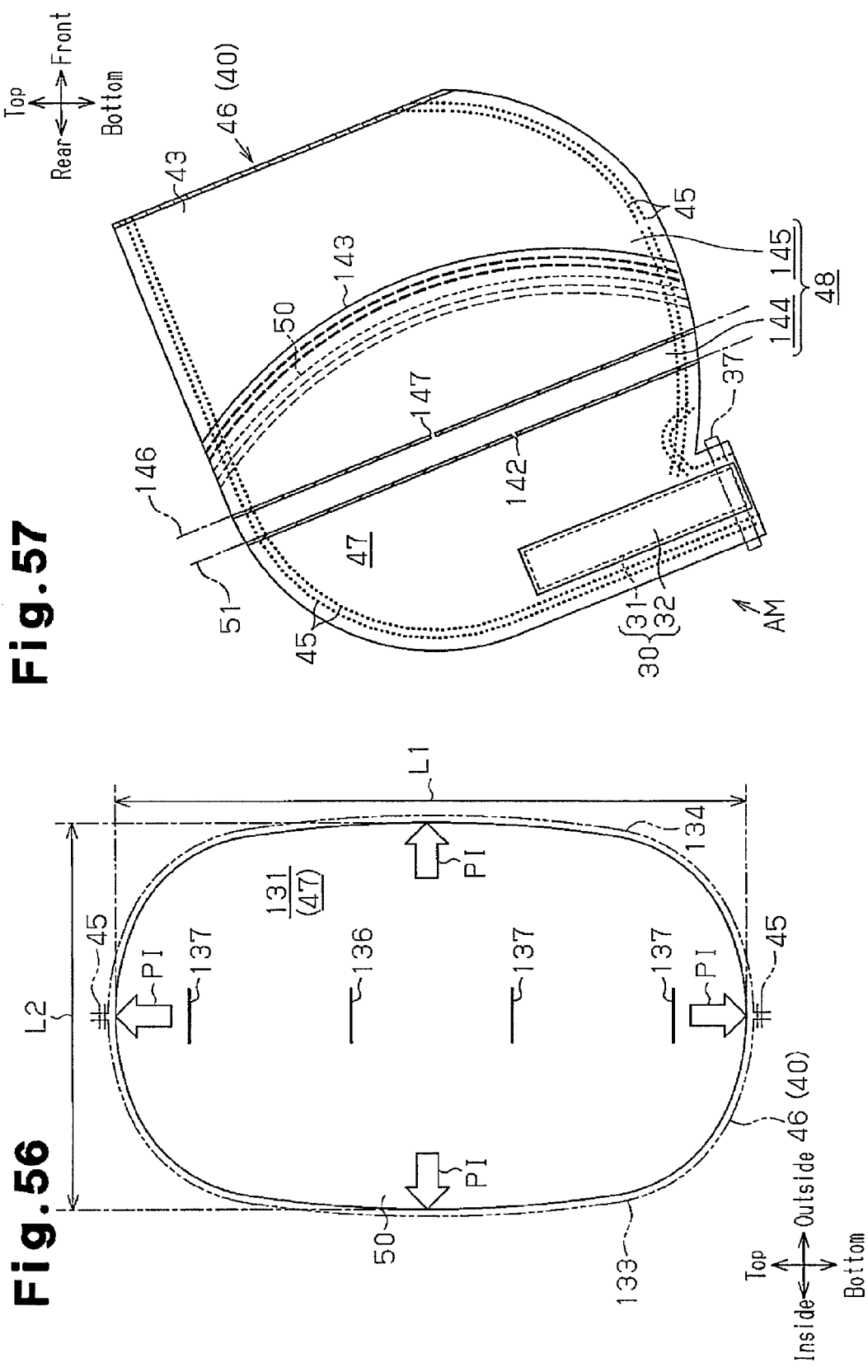

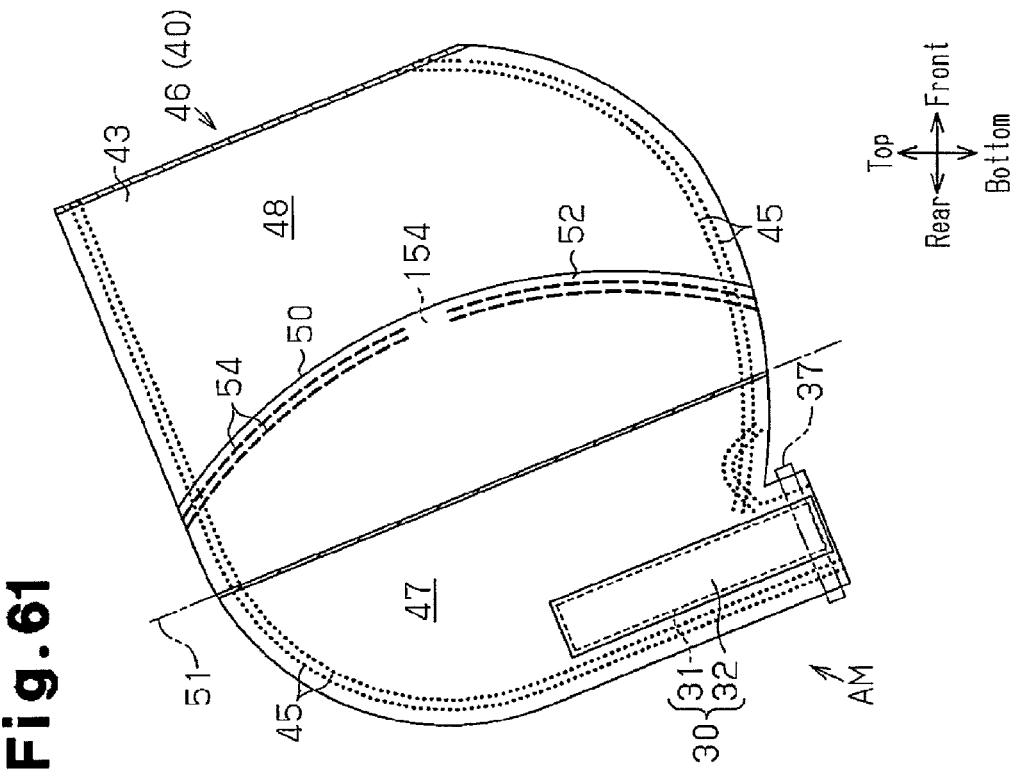
Fig.61
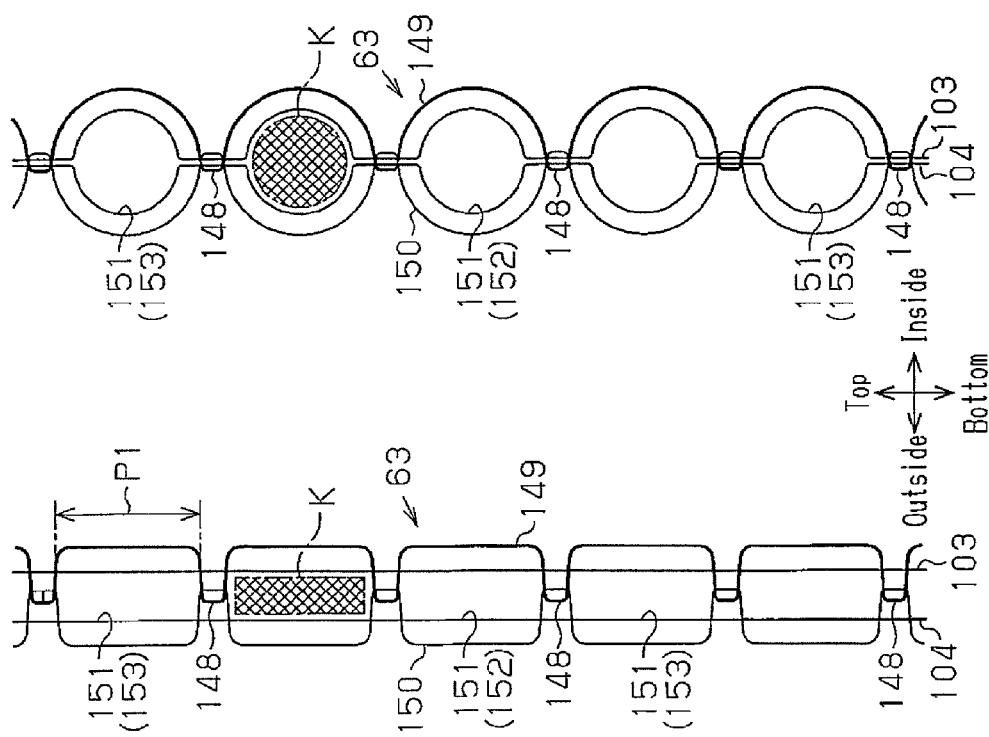
Fig.60A
Fig.60B

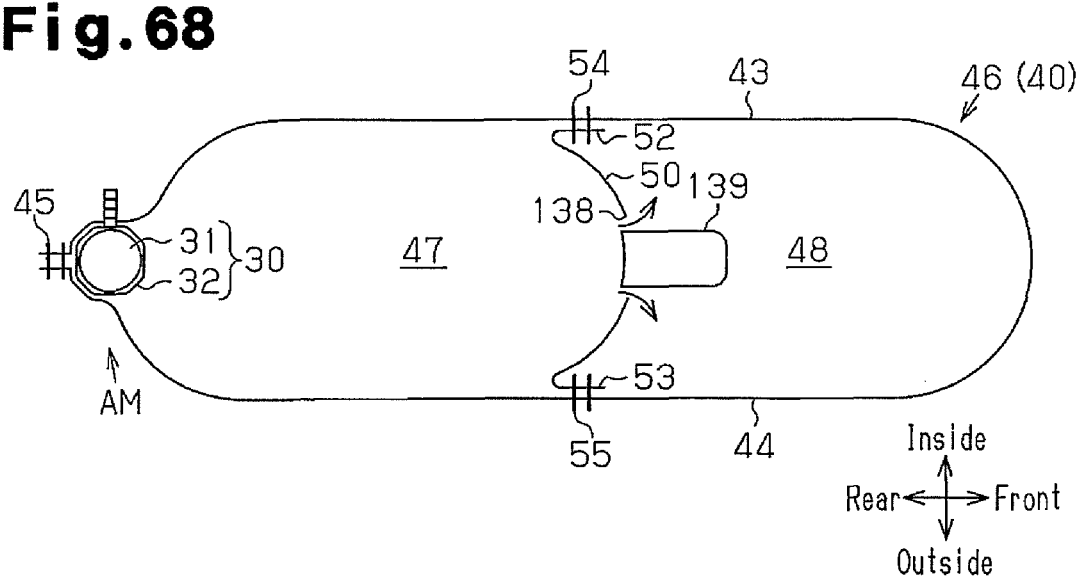

SIDE AIRBAG APPARATUS

CROSS REFERENCE TO RELATED APPLICATIONS

The present application is a divisional of application Ser. No. 14/088,710 filed on Nov. 25, 2013, which is based on and claims priority to Japanese Patent Application No. 2012-262156 filed on Nov. 30, 2012, disclosures of which are incorporated herein by reference.

BACKGROUND OF THE INVENTION

The present invention relates to a side airbag apparatus that deploys and inflates an airbag at a side of an occupant seated in a seat of a vehicle when an impact is applied to the vehicle from a side of the vehicle seat, and protects the occupant from the impact by the airbag.

A side airbag apparatus that includes an airbag and an inflator has been widely known. In a case where an impact is applied to a motor vehicle from a side of a vehicle seat on which an occupant is seated due to a side collision and the like, such a side airbag apparatus protects the occupant from the impact. The airbag includes an inflation portion that inflates by inflation gas generated by the inflator. The airbag including the inflation portion is installed in a side part of a seat back of the motor vehicle seat together with the inflator in a folded state.

In the above described side airbag apparatus, when an impact is applied from a side to a motor vehicle configuring member (body side portion) configuring the side part of the motor vehicle, for example a side door, the inflation gas from the inflator is supplied to the inflation portion of the airbag. The airbag is inflated and deployed by the inflation gas, breaking the side part of the seat back, and is projected out from the motor vehicle seat in a state in which a part of the airbag is left within the seat back. The airbag enters a space between the motor vehicle seat and the body side portion, and is inflated and deployed frontward. The airbag is located between the occupant and the body side portion entering toward a motor vehicle interior side to restrain the occupant, and also to protect the occupant by reducing the impact from the side transmitted to the occupant through the body side portion.

An example of the side airbag apparatus is configured such that an inflation portion is divided into an upstream inflation portion, to which inflation gas from an inflator is supplied, and a downstream inflation portion adjacent to the upstream inflation portion by a dividing portion, and that the dividing portion is provided with an opening and a pressure regulator valve (for example, see JP 2012-30614 A).

The pressure regulator valve closes before an occupant restraint by the upstream inflation portion, so as to restrict the inflation gas from flowing to the downstream inflation portion from the upstream inflation portion through the opening. Therefore, internal pressure of the upstream inflation portion within the inflation portion mainly increases, and the upstream inflation portion is inflated and deployed. Further, upon the occupant restraint by the upstream inflation portion, the pressure regulator valve opens by an external force applied due to the restraint. By this opening incident, the inflation gas in the upstream inflation portion flows out to the downstream inflation portion through the opening. By this flow-out incident, the internal pressure of the upstream inflation portion decreases and internal pressure of the downstream inflation portion increases, whereby the downstream inflation portion is deployed and inflated.

By the aforementioned operation of the pressure regulator valve, a property of load that the occupant receives through the airbag can be made to be suitable for appropriately restraining and protecting the occupant, such that it reaches a predetermined value within a short period of time and thereafter maintained at the predetermined value.

However, in the aforementioned side airbag apparatus, although the pressure regulator valve can be opened and closed according to a restraining circumstance of the occupant by the upstream inflation portion and cause the inflation gas in the upstream inflation portion to flow out from the opening, the flow-out thereof is performed uniformly. If the flow-out of the inflation gas from the opening can be performed in various manners, it is expected that the performance of restraining and protecting the occupant by the airbag is improved.

This applies similarly to a side airbag apparatus in which only the opening among the opening and pressure regulator valve is provided at the dividing portion. Further, the above matter applies similarly to a side airbag apparatus in which the inflation portion is not divided by the dividing portion and the opening and pressure regulator valve are provided in a wall portion of the inflation portion, and it applies to a side airbag apparatus in which the inflation portion is not divided by the dividing portion and only the opening among the opening and pressure regulator valve is provided on the wall portion of the inflation portion.

SUMMARY OF THE INVENTION

The invention has been made in view of the above situations, and an aim thereof is to provide a side airbag apparatus that improves a performance of restraining and protecting the occupant by an airbag through an improvement in a flow-out manner of inflation gas flowing out from a portion inflated within an inflation portion.

To achieve the foregoing objective and in accordance with a first aspect of the present invention, a side airbag apparatus that includes an airbag, a pressure regulator valve, and a time changing apparatus is provided. The airbag includes an inflation portion that inflates by inflation gas supplied in response to an impact applied from a side to a vehicle seat, and that deploys toward a front of the vehicle seat at a side of the vehicle seat. An opening is provided in a wall portion forming the inflation portion. The pressure regulator valve closes before an inflated part of the inflation portion restrains an occupant to restrict the inflation gas from flowing out from the inflated part of the inflation portion through the opening. When the inflated part of the inflation portion restrains the occupant, the pressure regulator valve opens in response to a change in a tensed state of the wall portion by an external force applied due to the restraint, thereby cancelling the restriction. The time changing apparatus changes an opening time of the pressure regulator valve upon the occupant restraint by the inflated part in the inflation portion to a time that is different from an opening time set only by the pressure regulator valve.

In accordance with a second aspect of the present invention, a side airbag apparatus that includes an airbag, a pressure regulator valve, and an outflow amount apparatus is provided. The airbag includes an inflation portion that inflates by inflation gas supplied in response to an impact applied from a side to a vehicle seat, and that deploys toward a front of the vehicle seat at a side of the vehicle seat. An opening is provided in a wall portion forming the inflation portion. The pressure regulator valve closes before an inflated part of the inflation portion restrains an occupant to restrict the inflation gas from flowing out from the inflated part of the inflation portion through the opening. When the inflated part of the inflation portion restrains the occupant, the pressure regulator valve opens in response to a change in a tensed state of the wall portion by an external force applied due to the restraint, thereby cancelling the restriction. Upon the occupant restraint by the inflated part of the inflation portion, the outflow amount changing apparatus changes an amount of the inflation gas flowing out from the inflated part of the inflation portion to an outflow amount that is different from an outflow amount in a case of the inflation gas passing through only the opening.

In accordance with a third aspect of the present invention, a side airbag apparatus that includes an airbag and a time changing apparatus is provided. The airbag includes an inflation portion that inflates by inflation gas supplied in response to an impact applied from a side to a vehicle seat, and that deploys toward a front of the vehicle seat at a side of the vehicle seat. An opening is provided in a wall portion forming the inflation portion. The time changing apparatus changes a time at which the inflation gas starts to flow out through the opening when an inflated part of the inflation portion restrains an occupant to a time different from an outflow starting time in a case in which the inflation gas flows out from the opening without being obstructed by the wall portion.

In accordance with a fourth aspect of the present invention, a side airbag apparatus that includes an airbag and an outflow amount changing apparatus is provided. The airbag includes an inflation portion that inflates by inflation gas supplied in response to an impact applied from a side to a vehicle seat, and that deploys toward a front of the vehicle seat at a side of the vehicle seat. An opening is provided in a wall portion forming the inflation portion. When an inflated part of the inflation portion restrains an occupant, the outflow amount changing apparatus changes an amount of the inflation gas flowing out from the portion in response to a change in an internal pressure of the inflation portion.

In accordance with a fifth aspect of the present invention, a side airbag apparatus that includes an airbag and an outflow amount changing apparatus is provided. The airbag includes an inflation portion that inflates by inflation gas supplied in response to an impact applied from a side to a vehicle seat, and that deploys toward a front of the vehicle seat at a side of the vehicle seat. An opening is provided in a wall portion forming the inflation portion. When the inflated part of the inflation portion restrains an occupant, the outflow amount changing apparatus changes an amount of the inflation gas flowing out from the inflated part to an outflow amount that is different from an outflow amount in a case in which the inflation gas passes through only the opening.

In accordance with a sixth aspect of the present invention, a side airbag apparatus that includes an airbag and a pre-restraint flowing out apparatus is provided. The airbag includes an inflation portion that inflates by inflation gas supplied in response to an impact applied from a side to a vehicle seat, and that deploys toward a front of the vehicle seat at a side of the vehicle seat. An opening is provided in a wall portion forming the inflation portion. Before the inflated part of the inflation portion restrains an occupant, the pre-restraint flowing out apparatus causes the inflation gas to start flowing out from the inflate part.

BRIEF DESCRIPTION OF THE DRAWINGS

FIG. 7A is a partial cross-sectional side view showing an internal structure of the airbag module of FIG. 4 together with the vehicle seat and the occupant;

FIG. 7B is a partial cross-sectional side view showing a part of FIG. 7A in enlarged manner;

FIGS. 10A to 10C are cross-sectional side views schematically showing an operation of the pressure regulator valve in the first embodiment;

FIG. 24A is a partial cross-sectional side view of a side airbag apparatus of a fourteenth embodiment, showing an internal structure of an airbag module having an airbag in a non-inflated and deployed state together with a vehicle seat and an occupant;

FIG. 24B is a partial cross-sectional side view showing a part of FIG. 24A in enlarged manner;

FIGS. 25A to 25C are cross-sectional side views schematically showing an operation of a pressure regulator valve in the fourteenth embodiment;

FIG. 43 is a cross-sectional side view of a side airbag apparatus of a twenty-first embodiment, showing an internal structure of an airbag module having an airbag in a non-inflated and deployed state;

FIG. 44 is a rear view showing a state in which a dividing portion of the twenty-first embodiment is tensed;

FIG. 56 is a rear view showing a state in which a dividing portion is tensed in a side airbag apparatus of a twenty-ninth embodiment;

FIG. 57 is a cross-sectional side view of a side airbag apparatus of a thirtieth embodiment, showing an internal structure of an airbag module having an airbag in a non-inflated and deployed state;

FIGS. 60A, 60B are cross-sectional views schematically showing how a passage (opening, auxiliary opening) formed between adjacent joining portions (interlacing portion of an upper string and a lower string) changes before and after an occupant restraint in the thirty-first embodiment;

FIG. 61 is a cross-sectional side view of a side airbag apparatus of a thirty-second embodiment, showing an internal structure of an airbag module having an airbag in a non-inflated and deployed state;

FIG. 65A is a cross-sectional side view showing an internal structure of an airbag module having an airbag in a non-inflated and deployed state together with a part of an outer cloth portion of the airbag, and FIG. 65B is a partial side view showing a part of a woven fabric configuring a dividing portion in FIG. 65A in an enlarged manner;

FIG. 68 is a cross-sectional plan view schematically showing an internal structure of the airbag module having both an upstream inflation portion and a downstream inflation portion inflated in the thirty-fifth embodiment.

DETAILED DESCRIPTION OF THE PREFERRED EMBODIMENTS

First Embodiment

Hereinbelow, a first embodiment of a side airbag apparatus will be described with reference to FIG. 1 to FIG. 10.

The side airbag apparatus herein is equipped in a motor vehicle. In the following description, the description will be given by assuming a forward direction of the motor vehicle as the front, and a backing direction of the motor vehicle as the back. Further, a center portion in the lateral direction (vehicle widthwise direction) of the motor vehicle will be used as a reference, and a location relatively near the center portion and inside the vehicle will be termed "inner side", a location relatively far from the center portion yet inside of the vehicle will be termed "motor vehicle outer side". Further, in each drawing, "front", "back", "inner side" and "motor vehicle outer side" will respectively be described as "front", "back", "inside", and "outside".

Further, it is assumed that an occupant (adult) having a standard body size is seated in a vehicle seat at a standard posture.

Figure 1:
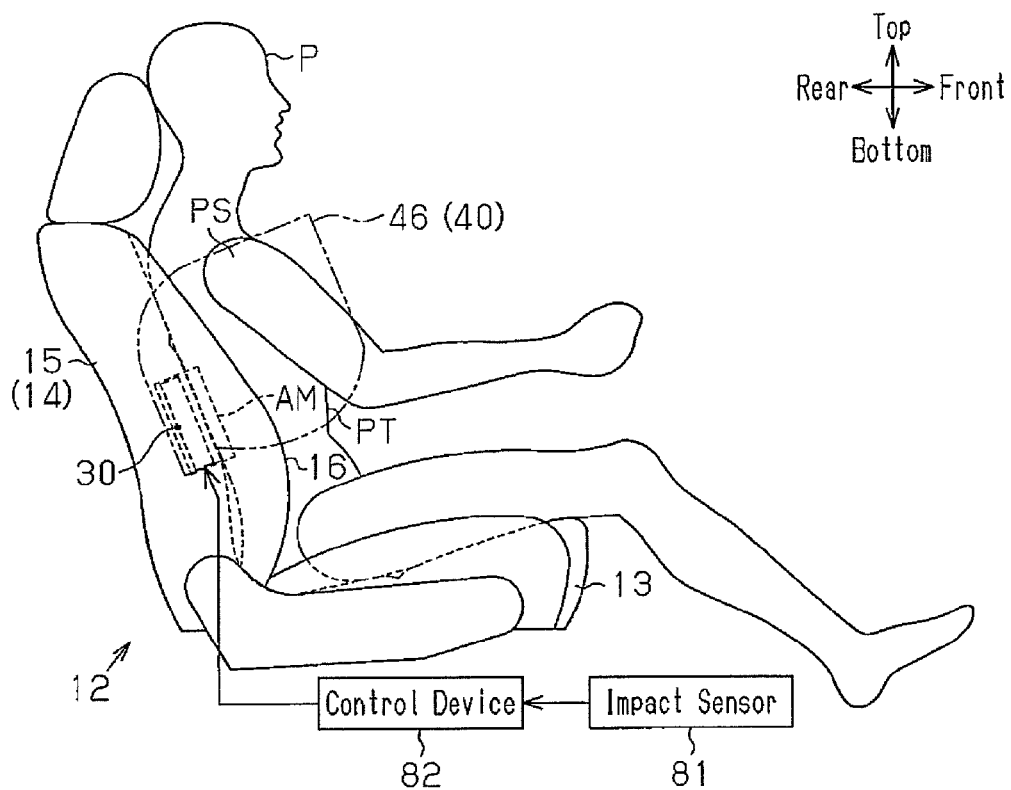
FIG. 1 is a side view showing a vehicle seat provided with a side airbag apparatus with an occupant, as a first embodiment of the side airbag apparatus.
Figure 2:
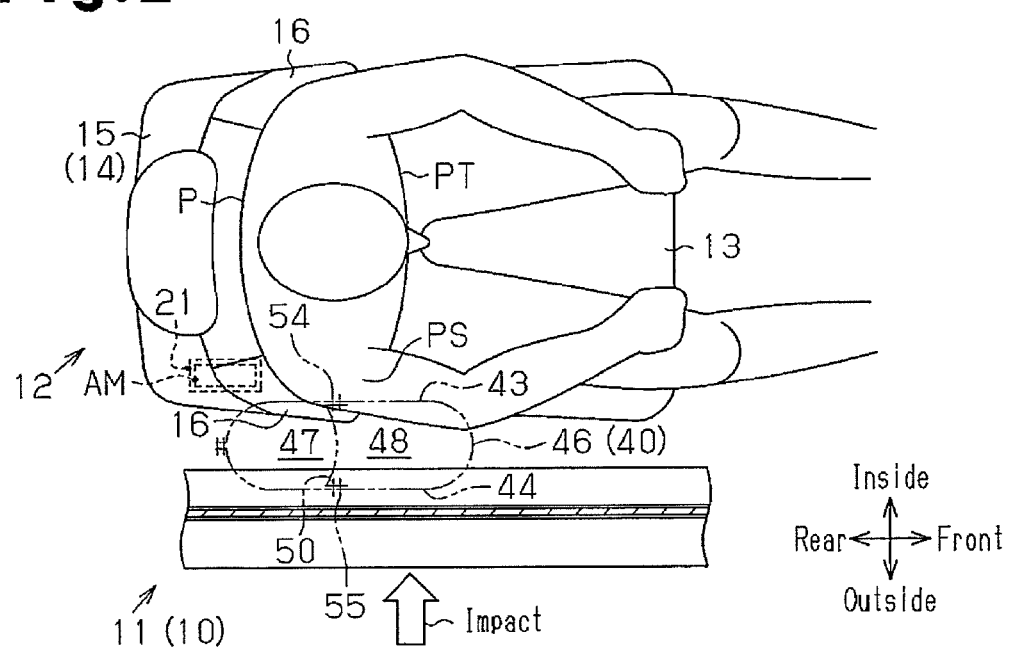
FIG. 2 is a cross-sectional plan view showing a positional relationship of the vehicle seat, the occupant, and a body side portion in the first embodiment.

As shown in FIG. 1 and FIG. 2, a vehicle seat 12 as a vehicle seat is arranged in the vicinity of the inner side (upper side in FIG. 2) of a body side portion 11 in a motor vehicle 10. The body side portion 11 refers to a motor vehicle configuring member (vehicle configuring member) arranged at a side part of the motor vehicle 10, and primarily a door, and a pillar correspond to this. For example, the body side portion 11 corresponding to a front seat is a front door, and a center pillar (B pillar). Further, the body side portion 11 corresponding to a back seat is a back part of a side door (rear door), a C pillar, a front part of a tire housing, or a rear quarter.

The vehicle seat 12 includes a seat cushion (seat) 13, and a seat back 14 that stands from a back side of the seat cushion 13 and of which reclining angle is adjusted by an angle adjusting mechanism (not shown). The vehicle seat 12 is arranged in the motor vehicle 10 in a posture by which the seat back 14 faces forward. The widthwise direction of the vehicle seat 12 arranged as above matches the vehicle widthwise direction.

The seat back 14 includes a seat back main body 15, and a pair of side support portions 16 provided on both side parts in the widthwise direction of the vehicle seat 12. The seat back main body 15 is reclined backward, and supports upper half of the body of an occupant P from behind. The side support portions 16 protrude forward from the seat back main body 15 and restrict movement of the upper half of the body of the occupant P in the widthwise direction when the occupant P sits on the seat cushion 13 and leans against the seat back main body 15.

Next, as for the seat back 14, an internal structure of the side part on the motor vehicle outer side including the side support portion 16 on the motor vehicle outer side will be described.

Figure 3:
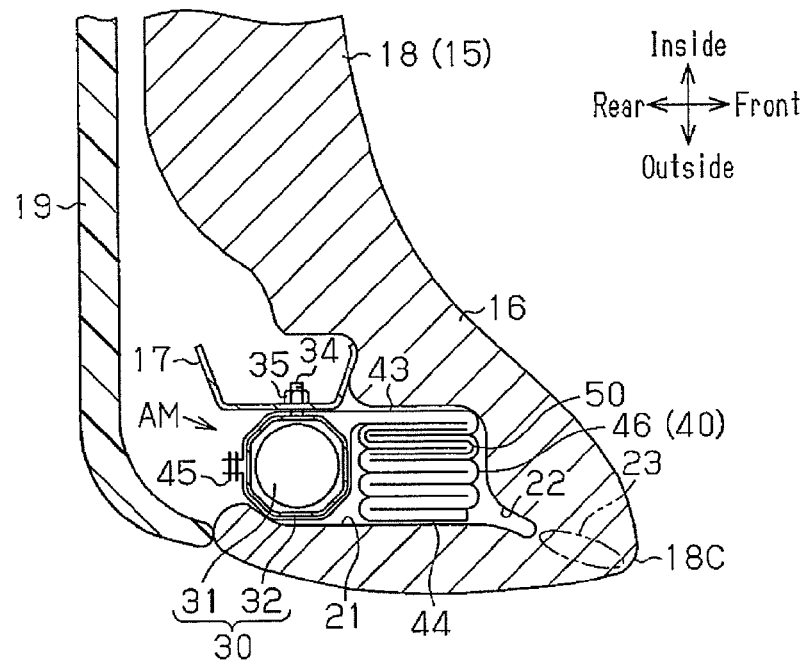
FIG. 3 is a partial cross-sectional plan view showing an internal structure of a seat back side part where an airbag module is assembled in the first embodiment.

A seat frame forming a framework thereof is arranged within the seat back 14. As shown in FIG. 3, a part of the seat frame is arranged on the outer side (lower side in FIG. 3) portion within the seat back 14, and this portion (hereafter referred to as "side frame portion 17") is formed by bending a metal plate. A seat pad 18 formed of an elastic material such as urethane foam is arranged on the front side of the seat frame including the side frame portion 17. Further, a hard back board 19 formed of composite resin is arranged at the back side of the seat frame. Although the seat pad 18 is covered by a skin, depiction of the skin is omitted in FIG. 3. The same applies to FIG. 6 to be described below.

In the seat pad 18, a housing portion 21 is provided in the vicinity of the outer side of the side frame portion 17. A position of the housing portion 21 is in the vicinity of a back portion of the occupant P seated in the vehicle seat 12 (see FIG. 2). The housing portion 21 has an airbag module AM configuring a main portion of the side airbag apparatus assembled therein.

A slit 22 extends diagonally frontward from a corner portion on the outer side and on the front side of the housing portion 21. A portion in between a corner portion 18C on the front side of the seat pad 18 and the slit 22 (portion surrounded by a broken line in which a long dash alternates with a pair of short dashes in FIG. 3) configures a breakable portion 23 that is to be broken by an airbag 40 to be described below.

The airbag module AM to be assembled in the seat back 14 includes an inflator assembly 30 and the airbag 40 as primarily configuring members. Next, each of these configuring members will be described.

<Inflator Assembly 30>

Figure 6:
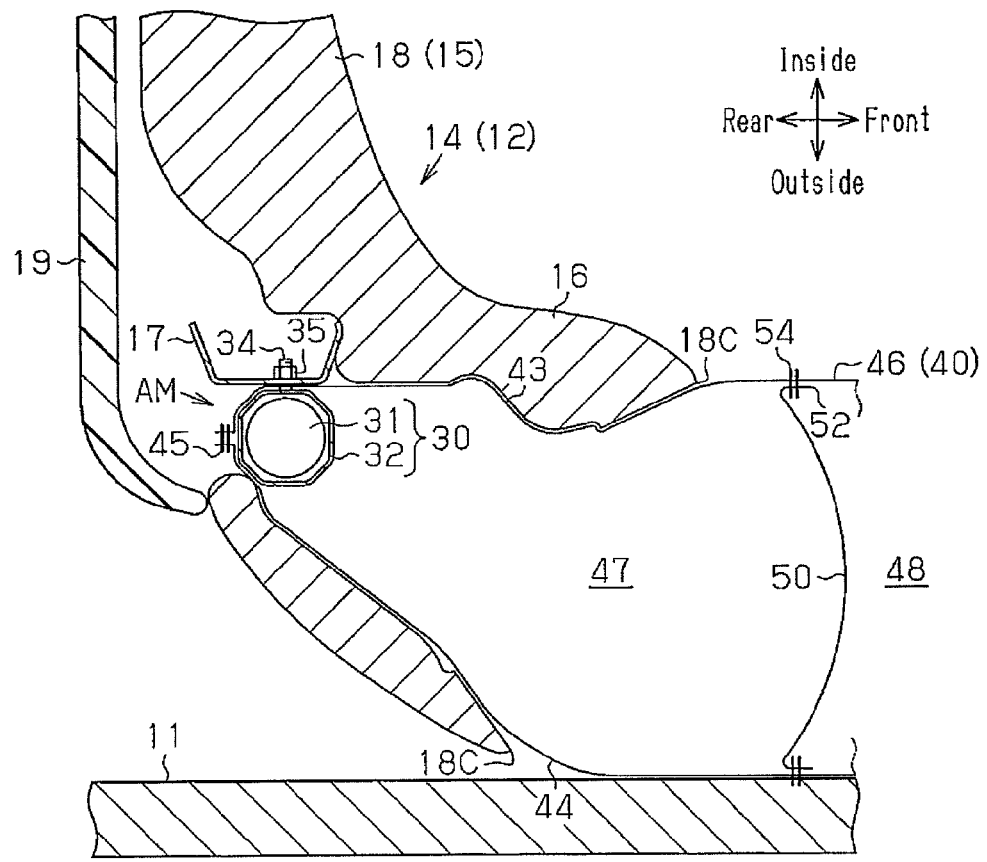
FIG. 6 is a partial cross-sectional plan view showing a state in which the airbag of FIG. 3 is projected out from the vehicle seat with a part thereof being remained in the seat back, while being deployed and inflated.

As shown in FIG. 6 and FIG. 7, the inflator assembly 30 includes an inflator 31 as a gas generator, and a retainer 32 attached outside the inflator 31. As the inflator 31, a type called a pyrotechnic type is employed. The inflator 31 has an elongated shape extending in a substantially up and down direction (substantially columnar shape), and gas generating agent (not shown) for generating inflation gas is housed inside thereof. The inflator 31 includes a gas ejecting portion (not shown) at one of ends in the longitudinal direction (upper end in the first embodiment). A harness (not shown) that is to be an input wiring for operation signals to the inflator 31 is connected at another of the ends (lower end in the first embodiment) in the longitudinal direction of the inflator 31.

As the inflator 31, instead of the pyrotechnic type using the gas generating agent, a type (hybrid type) that ejects the inflation gas by breaking a barrier wall of a high pressure gas tank in which high pressure gas is filled by explosive powder or the like may be used.

On the other hand, the retainer 32 is a member that functions as a diffuser for controlling a direction in which the inflation gas is to be ejected, and has a function to bind the inflator 31 onto the side frame portion 17 (see FIG. 3) together with the airbag 40. Most part of the retainer 32 is formed in a substantially cylindrical shape that extends in a substantially up and down direction by bending a plate material such as a metal plate. A window portion (not shown) is provided at an upper portion of the retainer 32, and most of the inflation gas ejected from the inflator 31 flows out to the outside of the retainer 32 through this window portion.

In the retainer 32, as an engaging member for attaching the same to the side frame portion 17, a plurality of bolts 34 (see FIG. 6) is fixed thereto. In other words, the plurality of bolts 34 is indirectly fixed to the inflator 31 via the retainer 32. The bolts 34 may be provided on the inflator 31 instead of the retainer 32. Further, the inflator assembly 30 may be configured by the inflator 31 and the retainer 32 being integrated.

<Airbag 40>

The airbag 40 is supplied with the inflation gas from the inflator 31 when an impact is applied from a side of the vehicle seat 12 to the body side portion 11 by a side collision and the like during when the motor vehicle 10 is running and the like. The airbag 40 is deployed and inflated substantially forward from the seat back 14 while leaving a part of itself within the seat back 14 (see FIG. 2 and FIG. 6).

Figure 4:
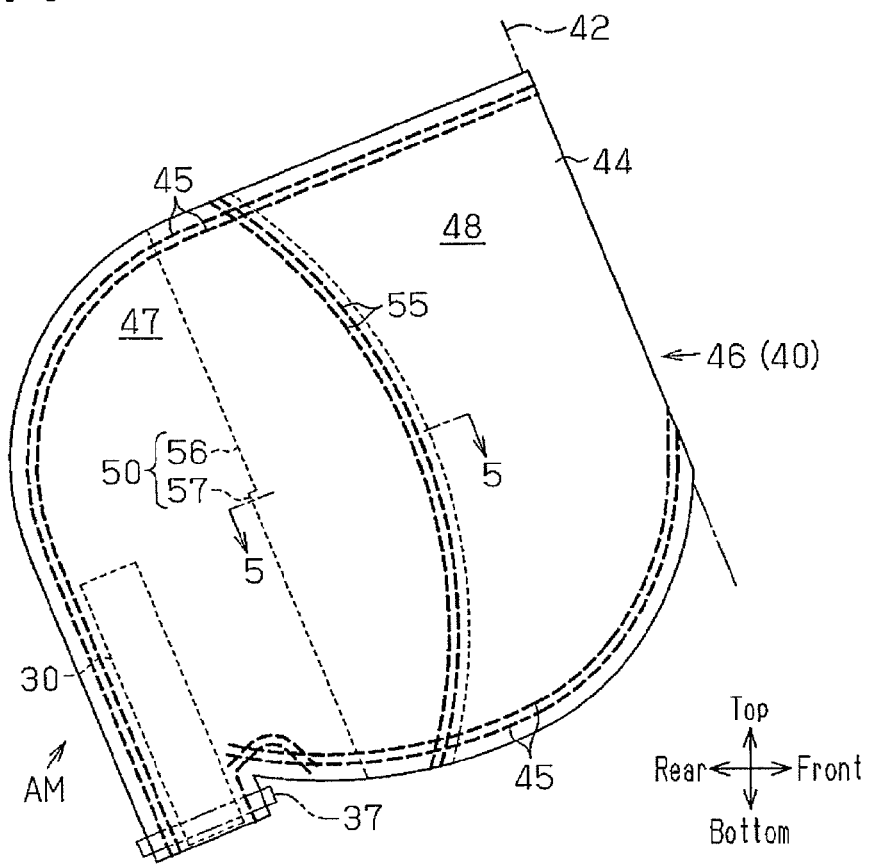
FIG. 4 is a side view showing the airbag module with an airbag in a non-inflated and deployed state in the first embodiment.

FIG. 4 shows the airbag module AM in a state in which the airbag 40 is deployed in a flat shape without inflation gas G (hereinbelow referred to as "non-inflated and deployed state"). Further, FIG. 7A shows an internal structure of the airbag module AM, showing the airbag module AM with the airbag 40 of FIG. 4 being cut at a center portion in its widthwise direction (vehicle widthwise direction) together with the occupant P and the vehicle seat 12.

As shown in FIG. 4 and FIG. 7, the airbag 40 is formed by folding a piece of fabric sheet (also called a foundation fabric, and a panel fabric) in half along a folding line 42 set at its center portion so as to be overlapped in the widthwise direction (vehicle widthwise direction) of the vehicle seat 12, and connecting the overlap portion in a bag shape. In order to distinguish two overlapped portions of the airbag 40, the one positioned on the inner side will be termed an inner fabric portion 43 (see FIG. 7), and the one positioned on the outer side will be termed an outer fabric portion 44 (see FIG. 4).

In the first embodiment, the fabric sheet is folded in half so that the folding line 42 is positioned at a front end of the airbag 40, however, the fabric sheet may be folded in half so that the folding line 42 is positioned at other ends, for example, a rear end, an upper end, and a lower end. Further, the airbag 40 may be configured by two pieces of fabric sheets divided along folding lines 42. In this case, the airbag 40 is formed by overlapping two fabric sheets in the widthwise direction (vehicle widthwise direction) of the vehicle seat 12, and connecting the fabric sheets in a bag shape. Further, the airbag 40 may be configured by three or more pieces of fabric sheets.

In the airbag 40, respective outer shapes of the inner fabric portion 43 and the outer fabric portion 44 are in a symmetrical relationship about a of line symmetry to each other with the folding line 42 as a symmetric axis. The respective shapes and sizes of the inner fabric portion 43 and the outer fabric portion 44 are set to be shapes and sizes that would occupy a space between a part of an upper half of the body (mainly thorax PT and shoulder PS) of the occupant P seated in the vehicle seat 12 and the body side portion 11 when the airbag 40 is deployed and inflated.

As the inner fabric portion 43 and the outer fabric portion 44, a material with high strength and flexibility that can easily be folded, for example, a woven fabric formed by using polyester threads, polyamide threads and the like are suitable.

The connection of the inner fabric portion 43 and the outer fabric portion 44 is formed at peripheral joining portions 45 provided in their peripheral portions. In the first embodiment, the peripheral joining portions 45 are formed by sewing (sewed together by a thread) portions within the peripheral portions of the inner fabric portion 43 and the outer fabric portion 44 excluding the front ends (portions in the vicinity of the folding line 42). This aspect applies similarly to first joining portions 54, 55, a second joining portion 63, and the like to be described below.

In regards to the sewing, in FIG. 4, FIG. 7 to FIG. 9, FIG. 11 to FIG. 24, FIG. 26 to FIG. 29, FIG. 33, FIG. 36, FIG. 41, FIG. 43 to FIG. 48, FIG. 50, FIG. 52, FIG. 57, FIG. 59, FIG. 61, FIG. 65A, and FIG. 66, a sewn portion is expressed by three types of lines. A first type of line is a line (one type of broken line) that is expressed by intermittently aligning bold lines with a certain length, and this illustrates a state of seeing the sewn portion from a side (see the peripheral joining portion 45 and the first joining portion 55 in FIG. 4). A second type of line is a line (one type of broken line) that is expressed by intermittently aligning thin lines with a certain length, and this illustrates a state of sewing threads that are positioned at a back of the outer fabric portion 44 and thus cannot be seen directly (see the second joining portion 63 in FIG. 7). A third type of line is a line (one type of broken line) that is expressed by aligning dots at a certain interval, and this illustrates states between the inner fabric portion 43 and the outer fabric portion 44 that are the target of sewing, and the sewing threads between an upper fabric portion 56 and a lower fabric portion 57 (see the peripheral joining portion 45 in FIG. 7). That is, a drawing that expresses the sewing by the third type of line illustrates a cross-sectional structure along a cross section passing through the sewn portion, and illustrates a cross section of the sewing threads.

As shown in FIG. 4 and FIG. 7, in the airbag 40, a portion surrounded by the peripheral joining portion 45 is an inflation portion 46 that is to be inflated by the inflation gas G.

The peripheral joining portion 45 may be formed by means other than sewing using the sewing threads as above, for example, by adhesion using adhesives. This point applies similarly to first joining portions 54, 55, second joining portions 63, extended joining portions 76, 106, an auxiliary first joining portion 88, a division joining portion 111, and joining portions 117, 141, 148, 156, 157 to be described below.

The inflator assembly 30 is arranged at a rear end lower portion in the airbag 40 in a posture that is tilted lower on the front side. Further, the bolt 34 of the retainer 32 is penetrated in the inner fabric portion 43 (see FIG. 3). According to such a penetration, the inflator assembly 30 is engaged in a state of being positioned relative to the airbag 40. Further, the lower portion rear end of the airbag 40 is tightened by a ring-shaped tightening tool 37 in an airtight manner relative to the lower end of the inflator assembly 30.

A dividing portion 50 is provided in the inflation portion 46. The dividing portion 50 has a configuration similar to those generally called tethers. When the dividing portion 50 is tensed, an end positioned on the inside in the widthwise direction of the vehicle seat 12 (motor vehicle 10) will be termed an "inner end 52", and an end positioned on the outside will be termed an "outer end 53".

Figure 5:
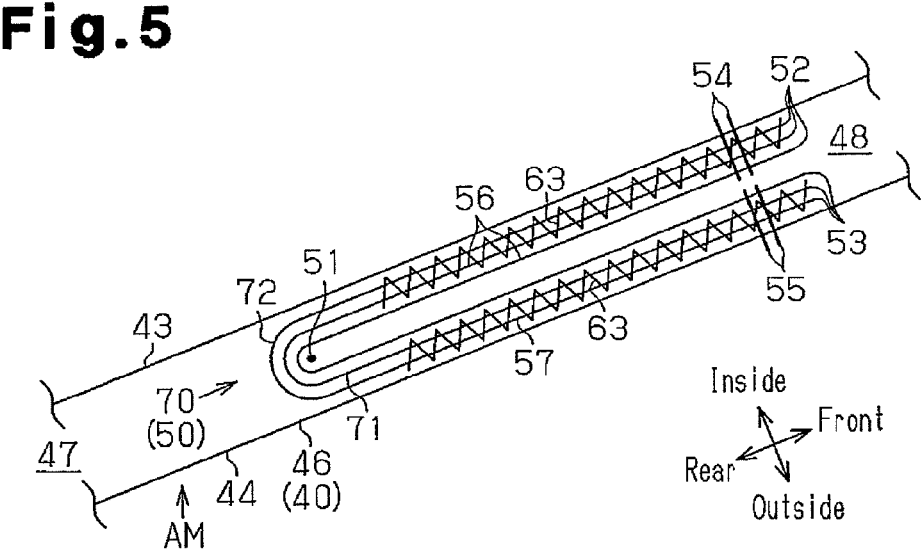
FIG. 5 is a partial cross-sectional view schematically showing an internal structure of the airbag taken along line 5-5 in FIG. 4.

FIG. 5 shows a cross-sectional structure taken along line 5-5 in FIG. 4. In FIG. 5, respective members are depicted by omitting their thicknesses, and each of the second joining portions 63 are depicted in a zigzag shape. As shown in FIG. 5 and FIG. 7, when the airbag 40 is in the non-inflated and deployed state, the dividing portion 50 is overlapped in the widthwise direction of the vehicle seat 12 (motor vehicle 10) by being folded in half along a folding line 51 extending in an up and down direction. The dividing portion 50 in this state is arranged in the inflation portion 46 in a state in which the folding line 51 is positioned on an upstream side of the inner end 52 and the outer end 53. In the specification, a side closer to the inflator 31 will be termed an "upstream side", and a side far from the inflator 31 will be termed a "downstream side".

Figure 9:
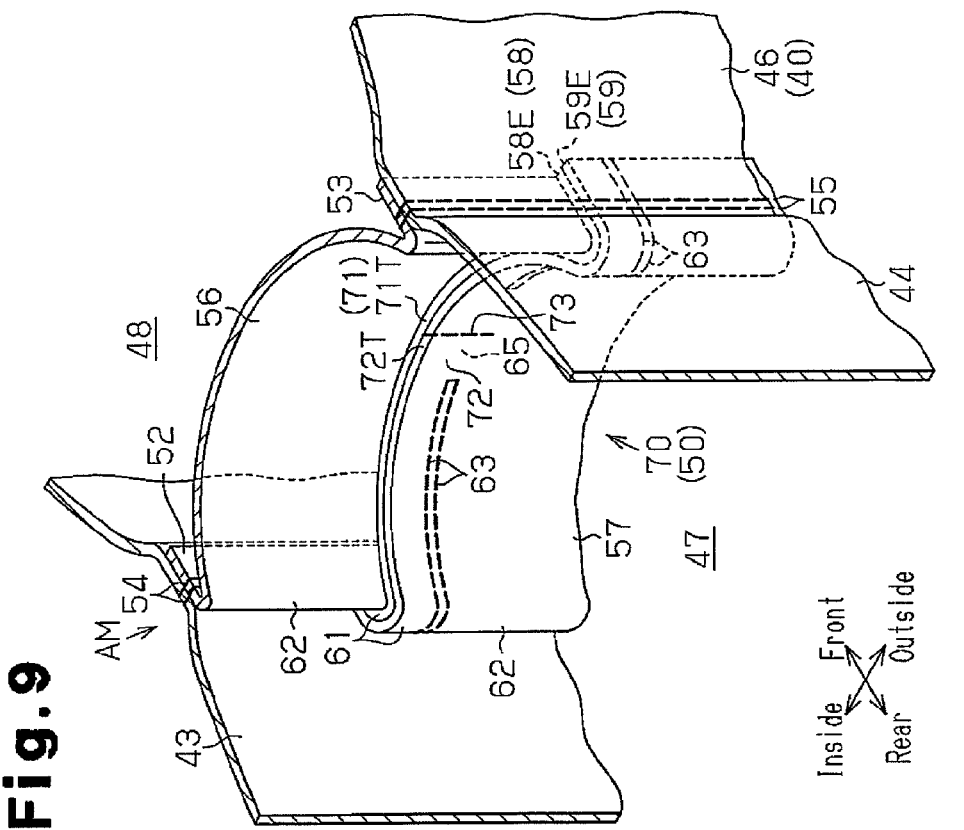
FIG. 9 is a partial perspective view showing a pressure regulator valve when the dividing portion is tensed in the first embodiment.
Figure 8:
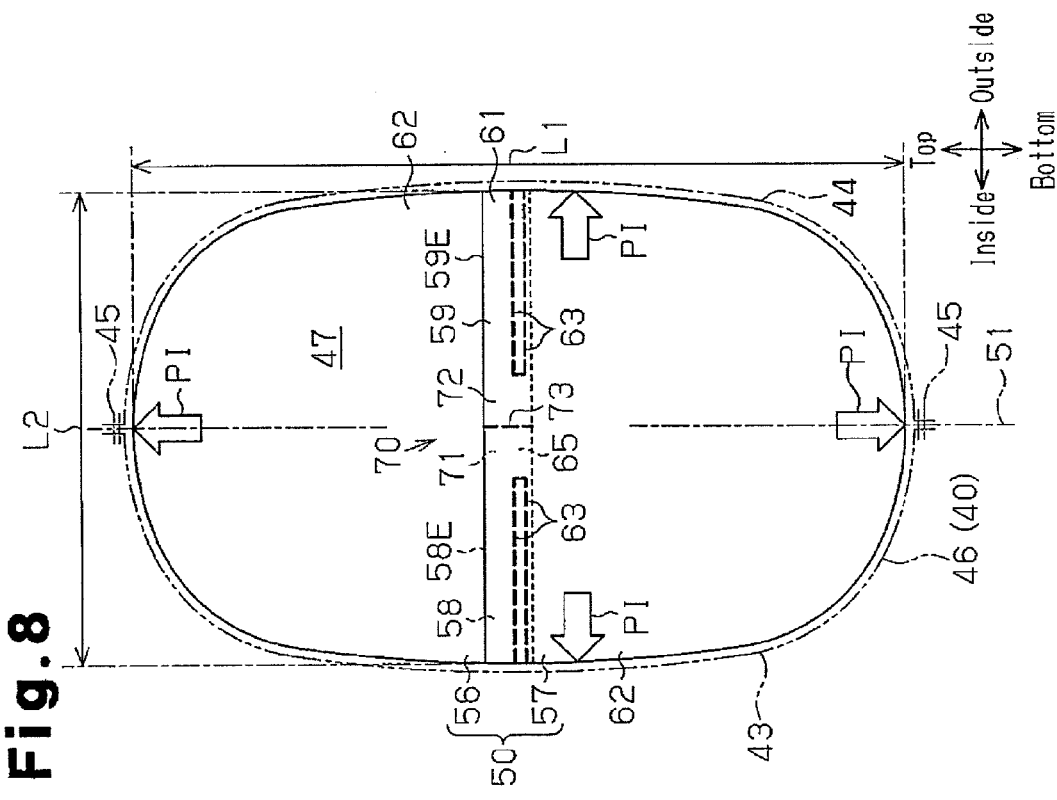
FIG. 8 is a rear view showing a state in which a dividing portion of the first embodiment is tensed.

As shown in FIG. 8 and FIG. 9, when the dividing portion 50 is tensed in a sheet shape due to the deployment and inflation of the inflation portion 46, it has a shape in which a dimension L1 along the folding line 51 (hereinbelow referred to as a "vertical direction") is larger than a dimension L2 in a direction orthogonally intersecting the folding line 51 (hereinbelow referred to as a "lateral direction"). An inner end 52 of the dividing portion 50 is connected to the inner fabric portion 43 of the airbag 40 by the first joining portion 54 extending in a substantially up and down direction. Further, the outer end 53 of the dividing portion 50 is connected to the outer fabric portion 44 of the airbag 40 by the first joining portion 55 extending in the substantially up and down direction.

The dividing portion 50 is bridged between the inner fabric portion 43 and the outer fabric portion 44 by the above connections. When the airbag 40 is in the non-inflated and deployed state, the dividing portion 50 comes to be in the state of being folded in half (see FIG. 5, FIG. 7A). Further, when the inflation portion 46 is deployed and inflated, the dividing portion 50 comes to be in the state of being tensed in the widthwise direction (vehicle widthwise direction) of the vehicle seat 12 (see FIG. 9), and restricts an inflation thickness of the inflation portion 46 in this direction.

Further, the dividing portion 50 in the state of being folded in half is connected to the airbag 40 at opposite ends in the direction along the folding line 51 (vertical direction). That is, as shown in FIG. 7A, the upper end of the dividing portion 50 is connected (sewn together) to the upper ends of the fabric portions 43, 44 of the airbag 40 by the aforementioned peripheral joining portion 45. Further, the lower end of the dividing portion 50 is connected (sewn together) to the lower ends of the fabric portions 43, 44 by the peripheral joining portion 45.

As shown in FIG. 7A and FIG. 9, by using the dividing portion 50, the inflation portion 46 is divided into an upstream inflation portion 47 on the rear side that configures a rear half portion and where the inflator assembly 30 is arranged, and a downstream inflation portion 48 that configures a front half portion of the inflation portion 46 and where the inflator assembly 30 is not arranged. A wall portion of the upstream inflation portion 47 is configured by a part of the inner fabric portion 43, a part of the outer fabric portion 44, and the dividing portion 50. The same applies to a wall portion of the downstream inflation portion 48.

According to such a configuration, the inflation gas from the inflator 31 initially is supplied to the upstream inflation portion 47, and thereafter is supplied to the downstream inflation portion 48.

The dividing portion 50 is configured by fabric portions aligned in the vertical direction (up and down direction). In order to distinguish each fabric portion, one that is positioned on the upper side will be termed an upper fabric portion 56, and one that is positioned on the lower side will be termed a lower fabric portion 57. The fabric portions 56, 57 are formed in a sheet shape by using the same material as the fabric sheet of the airbag 40.

As shown in FIG. 7B and FIG. 9, in the upper fabric portion 56 and the lower fabric portion 57, their ends 58, 59 are overlapped in a band shape in a state in which end edges 58E, 59E of the ends 58, 59 are matched. The two fabric portions 56, 57 are connected at a boundary portion between a pair of overlap portions 61, each having a band shape, and other portions (hereinbelow referred to as "non-overlap portion 62") by a second joining portion 63 extending in a lateral direction (vehicle widthwise direction). The boundary portion is separated from the end edges 58E, 59E by a predetermined distance in the vertical direction (up and down direction).

In the dividing portion 50, at a substantial center portion in both the vertical direction (up and down direction) and the lateral direction (vehicle widthwise direction), an opening 65 and a pressure regulator valve 70 are provided. Next, the opening 65 and the pressure regulator valve 70 will be described.

The second joining portion 63 is released of the connection at a part thereof (portion that becomes a center portion in the lateral direction (vehicle widthwise direction) when the dividing portion 50 is tensed). In other words, in the boundary portion of the overlap portions 61 and the non-overlap portion 62, the second joining portion 63 for connecting the upper fabric portion 56 and the lower fabric portion 57 is not provided at the portion that becomes the center portion in the lateral direction (vehicle widthwise direction) when the dividing portion 50 is tensed. Accordingly, the portion released of the connection, which is the portion where the second joining portion 63 is not provided, forms the slit-shaped opening 65 extending in the lateral direction (vehicle widthwise direction). The upstream inflation portion 47 and the downstream inflation portion 48 are communicated by this opening 65. The lateral direction (vehicle widthwise direction) herein is identical to a direction in which impact is applied onto the motor vehicle 10 and the vehicle seat 12.

As shown in FIG. 8 and FIG. 9, the pressure regulator valve 70 is a valve that closes before the occupant restraint by the upstream inflation portion 47 and restricts the inflation gas from flowing to the downstream inflation portion 48 from the upstream inflation portion 47 through the opening 65. The valve 70 cancels the restriction upon the occupant restraint by the upstream inflation portion 47 by opening in accordance with a change in a tensed state of the dividing portion 50 caused by the external force applied due to the restraint. The pressure regulator valve 70 includes a pair of valve body portions 71, 72, that is, the overlap portions 61, at portions corresponding to the opening (proximal portion).

More specifically, the valve body portion 71 is configured by a portion between the opening 65 and the end edge 58E, and the valve body portion 72 is configured by a portion between the opening 65 and the end edge 59E. The pressure regulator valve 70 closes by the valve body portions 71, 72 contact each other at least at parts thereof, for example, at distal ends 71T, 72T, and the flow of the inflation gas at the opening 65 and in the valve body portions 71, 72 is restricted (see FIG. 10A, 10B). Further, the pressure regulator valve 70 opens by the opening 65 being opened, and the valve body portions 71, 72 being pushed out from the upstream inflation portion 47 to the downstream inflation portion 48 through the opening 65, and an entirety of the valve body portion 71 being separated from an entirety of the valve body portion 72 within the downstream inflation portion 48. By the above opening, the flow restriction of the inflation gas G in the opening 65 and in the valve body portions 71, 72 is cancelled, and the flow is allowed (see FIG. 10C).

Further, a time changing apparatus that changes an opening time of the pressure regulator valve 70 upon the occupant restraint by the upstream inflation portion 47 to a time that is different from an opening time only by the pressure regulator valve 70 is provided. The time changing apparatus herein is configured by a retaining portion that retains the pressure regulator valve 70 in a closed state, and cancels the retainment from a midpoint of the occupant restraint by the inflation portion 46. In the first embodiment, the retaining portion is configured by a tear seam 73 that connects the two valve body portions 71, 72 in the state of contacting each other or being positioned proximal to each other, and is broken from a midpoint of the occupant restraint.

The tear seam 73 extends in the vertical direction (up and down direction) at the center portion in the lateral direction (vehicle widthwise direction) of the two valve body portions 71, 72 when the dividing portion 50 enters the tensed state. The tear seam 73 connects the two valve body portions 71, 72 with a degree of strength that is lower than other joining portions, for example, the peripheral joining portion 45, the first joining portions 54, 55, and the second joining portions 63. The tear seam 73 is more prone to being broken than the other joining portions. The tear seam 73 is formed by sewing the two valve body portions 71, 72 together by using the sewing thread.

The tear seam 73 may be formed by means other than the sewing thread. For example, adhesive agent may be used, and the two valve body portions 71, 72 may be adhered to each other by the adhesive agent to form the tear seam 73.

Further, the tear seam 73 may be provided at a plurality of sections in the lateral direction (vehicle widthwise direction) of the two valve body portions 71, 72 so as to extend parallel to each other.

Moreover, as described above, the overlap portions 61 having the valve body portions 71, 72 are arranged on the upstream inflation portion 47 before when the inflation portion 46 is deployed and inflated (see FIG. 7B).

Further, the overlap portions 61 are folded upward or downward (upward in the first embodiment) at the boundary portion with the non-overlap portion 62, and are overlapped with the non-overlap portion 62. Further, the overlap portions 61 that are folded and having the band shape are connected (sewn together) to the inner fabric portion 43 and the outer fabric portion 44 that are corresponding in the airbag 40, and the non-overlap portion 62 of the dividing portion 50 at the opposite ends in the direction along the second joining portion 63 (lateral direction) by the aforementioned first joining portions 54, 55 (see FIG. 5, and FIG. 7A).

The airbag module AM is configured in a compact form (hereafter referred to as "storing form") by the airbag 40 in the non-inflated and deployed state (see FIG. 4 and FIG. 7) being folded. This is for optimizing the airbag module AM to be stored in a housing portion 21 (see FIG. 3) having a limited size in the seat back 14.

As shown in FIG. 3, the airbag module AM in the storing form is provided in the housing portion 21 in a state that positions the inflator assembly 30 at the rear side, and positions most of the airbag 40 on the front side. Further, as described above, the bolts 34 extending from the retainer 32 and inserted into the airbag 40 (inner fabric portion 43) are inserted to the side frame portion 17, and are tightened by nuts 35. By this tightening, the inflator assembly 30 is fixed to the side frame portion 17 together with the airbag 40.

The inflator assembly 30 may be fixed to the motor vehicle 10 (side frame portion 17) by a member that is different from the bolts 34 and the nuts 35 as described above.

As shown in FIG. 1, the side airbag apparatus includes an impact sensor 81 and a control device 82 aside from the aforementioned airbag module AM. The impact sensor 81 is configured by a velocity sensor and the like, is provided at the body side portion 11 of the motor vehicle 10 or the like (see FIG. 2, for example), and detects impact applied from the side to the body side portion 11. The control device 82 controls an operation of the inflator 31 based on detection signals from the impact sensor 81.

Further, although the motor vehicle 10 is equipped with a seat belt device for restraining the occupant P seated in the vehicle seat 12, the seat belt device is omitted in the respective drawings.

The side airbag apparatus of the first embodiment is configured as described above. Next, as workings of the side airbag apparatus, a representative operation manner (mode) will be described. FIGS. 10A to 10C schematically show how the state of the pressure regulator valve 70 and the like changes over time after starting the supply of the inflation gas G, and details thereof are omitted and simplified.

In the side airbag apparatus, when the impact from the side is not applied to the motor vehicle 10 (body side portion 11), an operation signal for causing the inflator 31 to operate is not outputted from the control device 82 to the inflator 31, and the inflation gas is not supplied from the inflator 31 to the inflation portion 46. The airbag 40 is kept stored in the housing portion 21 in the storing form together with the inflator assembly 30 (see FIG. 3). At this time, in the airbag 40, the inner fabric portion 43 and the outer fabric portion 44 are close to each other. The dividing portion 50 is in the state of being folded in half by positioning the folding line 51 on the upstream side of the inner end 52 and the outer end 53. The two valve body portions 71, 72 are overlapped with each other in the upstream inflation portion 47. The valve body portions 71, 72 in the pressure regulator valve 70 are connected by the tear seam 73.

In contrast, during when the motor vehicle 10 is running, when the impact of a predetermined value or more is applied to the body side portion 11 by a side collision and the like, and such an occurrence is detected by the impact sensor 81, the operation signal for causing the inflator 31 to operate is outputted from the control device 82 to the inflator 31 based on a detection signal thereon. According to this operation signal, in the inflator 31, gas generating agent generates the inflation gas having a high temperature and high pressure. The inflation gas is supplied initially to the upstream inflation portion 47 of the inflation portion 46. The upstream inflation portion 47 that has been supplied with the inflation gas starts the deployment and inflation.

Accordingly, the dividing portion 50 in the state of being folded in half is pulled. Tension is applied onto the dividing portion 50 in the vertical direction (up and down direction)

and in the lateral direction (vehicle widthwise direction), and the dividing portion 50 acts to enter the tensed state (see FIG. 9 and FIG. 10A).

An internal pressure PT is applied from an overlapping direction (thickness direction) onto the valve body portions 71, 72 positioned on the upstream inflation portion 47. The internal pressure PI is not as high as upon the restraint of the occupant P by the upstream inflation portion 47. The two valve body portions 71, 72 make tight contact with each other with their entire surfaces by the internal pressure PI, and come to be in a self-sealed state that restricts the flow of the inflation gas between the two valve body portions 71, 72. Further, the overlap portions 61 that was folded and overlapped with the non-overlap portion 62 of the dividing portion 50 are pressed against the non-overlap portion 62 by the internal pressure PI. Due to this also, the two valve body portions 71, 72 are caused to close with more ease.

Since the dividing portion 50 is longer in the vertical direction (up and down direction) than in the lateral direction (vehicle widthwise direction) (L1>L2), stronger tension tends to be applied in the lateral direction (vehicle widthwise direction) than in the vertical direction (up and down direction). The opening 65 easily closes due to extending in the lateral direction (vehicle widthwise direction) in which the stronger tension is likely to be applied.

However, despite the presence of the magnitude relationship of the tension (tensile strength) as aforementioned, the tension (tensile strength) is also applied in the vertical direction (up and down direction) that is a direction in which the opening 65 is to be opened, the opening 65 does not necessarily need to close for sure, and there is a risk that it may open. However, in such a case as well, the two valve body portions 71, 72 are closed at least at their distal ends 71T, 72T. This is because even if the opening 65 is pulled in the vertical direction (up and down direction) by the dividing portion 50 being tensed, whereby a force that acts to open the opening 65 works thereupon, such a force is the largest at the opening 65 and becomes smaller on farther side from the opening 65, and is the minimum at the distal ends 71T, 72T of the two valve body portions 71, 72.

Moreover, in the first embodiment, the overlap portions 61 folded to the non-overlap portion 62 are connected to the fabric portions 43, 44 together with the inner end 52 and the outer end 53 by the first joining portions 54, 55 at opposite ends of a direction in which the opening 65 (second joining portion 63) extends (lateral direction: vehicle widthwise direction). Therefore, when the upstream inflation portion 47 is deployed and inflated, not only a strong tension is applied in the lateral direction (vehicle widthwise direction) on the dividing portion 50 (non-overlap portion 62) but also a strong tension is applied on the overlap portions 61 in the same direction.

When the two valve body portions 71, 72 contact each other at least at parts thereof, the pressure regulator valve 70 comes to be in a state of being closed. The inflation gas inside the upstream inflation portion 47 is restricted from flowing out to the downstream inflation portion 48 by flowing between the two valve body portions 71, 72 and through the opening 65. By this restriction, the inflation gas hardly flows in the opening 65. The inflation gas in the upstream inflation portion 47 does not flow to the downstream inflation portion 48 through the opening 65, and is scarce, if any flows. As a result, the inflation gas is gathered in the upstream inflation portion 47, and an internal pressure of the upstream inflation portion 47 exclusively starts to increase.

In the first embodiment, since the inflation portion 46 is divided into the upstream inflation portion 47 and the downstream inflation portion 48 by the dividing portion 50, the capacity of the upstream inflation portion 47 is smaller than the capacity of the inflation portion 46 if the inflation portion 46 were not divided. Therefore, the internal pressure of the upstream inflation portion 47 starts to increase earlier that it would if the inflation portion 46 were not divided and becomes high earlier. Especially, the inflation gas in the upstream inflation portion 47 is allowed to flow only between the two valve body portions 71, 72, and does not flow out to the downstream inflation portion 48 without going between the two valve body portions 71, 72. Accordingly, an increasing rise of the internal pressure of the upstream inflation portion 47 is unlikely to drop due to the outflow of the inflation gas.

Further, by the inflation of the upstream inflation portion 47, the upstream inflation portion 47 acts to resolve the folded state in a reversed order of the order by which it was folded. When the upstream inflation portion 47 is inflated (deployed and inflated) while being unfolded (deploying), the seat pad 18 of the seat back 14 is pressed by the upstream inflation portion 47, and is broken at the breakable portion 23 (see FIG. 3). As shown in FIG. 6, the upstream inflation portion 47 is projected out forward from the seat back 14 through the broken portion in the state in which a part of the upstream inflation portion 47 is left within the housing portion 21.

As shown by broken line in which a long dash alternates with a pair of short dashes in FIG. 2, the upstream inflation portion 47 to which the inflation gas is supplied thereafter deploys while being unfolded frontward in a gap between the body side portion 11 and the vehicle seat 12.

The upstream inflation portion 47 starts to be pressed against the upper half of the body of the occupant P (thorax PT and the like) by the body side portion 11 entering into the inner side. By this pressing, the occupant P starts to be restrained of his upper half of the body (thorax PT and the like) primarily by the upstream inflation portion 47. Further, the impact from the side transmitted to the upper half of the body (thorax PT and the like) of the occupant P through the body side portion 11 is reduced, and the upper half of the body is protected.

Upon the above pressing, since the upstream inflation portion 47 primarily is deployed and inflated in the inflation portion 46, the portion where the occupant P receives the pressure of the inflation portion 46 is primarily the upstream inflation portion 47.

The inflation gas is kept supplied to the upstream inflation portion 47 while the two valve body portions 71, 72 make tight contact with their entire surfaces and in the closed state. On the other hand, the pressure regulator valve 70 starts to open by the external force applied from the body side portion 11.

That is, from the midpoint of the supplying period of the inflation gas G to the inflation portion 46, the inflation portion 46 (upstream inflation portion 47) is pressed and deformed by the external force that accompanies the restraint of the occupant. Accordingly, the tension that has been intensely exerted in the lateral direction (vehicle widthwise direction) to the dividing portion 50 is reduced. A difference in the tension in the vertical and lateral directions becomes small.

Further, the internal pressure of the upstream inflation portion 47 further increases due to the above deformation of the inflation portion 46, whereby the dividing portion 50 is pressed toward the downstream inflation portion 48 (see FIG. 10B), and the tension applied onto the dividing portion 50 changes. Further, the difference in the tension in the vertical and lateral directions becomes small by the above change in the tension also. The deformation of the opening 65 positioned on the dividing portion 50 is allowed, and the operation of the valve body portions 71, 72 positioned on the dividing portion 50 is allowed.

On the other hand, since the overlap portions 61 are overlapped on the non-overlap portion 62, and are connected to the fabric portions 43, 44 of the airbag 40 by the first joining portions 54, 55 at opposite ends in the lateral direction (vehicle widthwise direction), the force that works to maintain the state of being overlapped is strong at portions of the overlap portions 61 near the first joining portions 54, 55. However, this force becomes smaller on the farther side from the first joining portions 54, 55, and is minimum at the center portions in the lateral direction (vehicle widthwise direction), that is, at the two valve body portions 71, 72. Therefore, the overlap portion 61 that has been pulled in the vertical direction (up and down direction) deforms in the same direction only at the valve body portions 71, 72 and the vicinity portions thereof.

When the opening 65 opens to some degree, at the overlap portion 61, only the two valve body portions 71, 72 that have received the high internal pressure PI of the upstream inflation portion 47 are pressed into the downstream inflation portion 48 through the opening 65, and are inverted.

Accordingly, when a width W1 of the opening 65 in the vertical direction (up and down direction) after the valve body portions 71, 72 have been inverted as above is narrow, the distal ends 71T, 72T contact each other, and the two valve body portions 71, 72 close at the distal ends 71T, 72T (see FIG. 10B). This state continues during a period in which the width W1 of the opening 65 is kept narrower than a sum (2*W2) of widths W2 of the respective valve body portions 71, 72 (see FIG. 10C).

Further, when the width W1 of the opening 65 is larger than the sum (=2*W2), the distal ends 71T, 72T are separated (see FIG. 10C), and the pressure regulator valve 70 comes to be in the state of being opened. The flow restriction is cancelled by the above opening of the pressure regulator valve 70, and the inflation gas G in the upstream inflation portion 47 is allowed to flow out to the downstream inflation portion 48 by flowing through the opening 65, and between the valve body portions 71, 72.

Incidentally, upon the occupant restraint by the upstream inflation portion 47, the pressure regulator valve 70 is opened, whereas the opening timing thereof is changed to an opening time configured only by the pressure regulator valve 70 by the time changing apparatus, that is, to a time that is different from the original opening time of the pressure regulator valve 70 (opening time in the case where the time changing apparatus is not provided).

Specifically, in a period before the occupant restraint by the inflation portion 46, and in a period until the midpoint of the occupant restraint during the occupant restraint, a force that works to connect the two valve body portions 71, 72 by the tear seam 73, which is in other words a force that works to retain the two valve body portions 71, 72 to be in the state of contacting each other overwhelms a force that works to separate the two valve body portions 71, 72. Therefore, the tear seam 73 is not broken, and the connection by the tear seam 73 is maintained. The two valve body portions 71, 72 are retained in the state of contacting each other, and the pressure regulator valve 70 is retained in the closed state.

In contrast, from the midpoint of the occupant restraint by the inflation portion 46, the force that works to separate the two valve body portions 71, 72 overwhelms the force that works to connect the two valve body portions 71, 72 by the tear seam 73, that is, the force that works to retain the two valve body portions 71, 72 to be in the state of contacting each other. The tear seam 73 is broken, the connection (retaining) by the tear seam 73 is cancelled, and the force that works to keep the two valve body portions 71, 72 in the contacting state disappears. The two valve body portions 71, 72 are thus capable of separating (the pressure regulator valve 70 is capable of opening).

Accordingly, during the occupant restraint by the inflation portion 46, the opening time of the pressure regulator valve 70 is delayed by the period during which the two valve body portions 71, 72 are retained in the state of contacting each other by the tear seam 73. Accompanying this, the timing at which the inflation gas G in the upstream inflation portion 47 starts to flow out to the downstream inflation portion 48 through the opening 65 is delayed.

The internal pressure of the upstream inflation portion 47 shifts from an increasing trend to a decreasing trend by the outflow of the inflation gas G. In the meantime, the body side portion 11 still continues to enter toward the inner side, and the inflation portion 46 is pressed against the occupant P at the upstream inflation portion 47.

Further, an internal pressure of the downstream inflation portion 48 starts to increase by the inflow of the inflation gas, and the downstream inflation portion 48 starts to inflate. The inflation portion 46 begins to be pressed against the occupant P not only at the upstream inflation portion 47 but also at the downstream inflation portion 48, whereby the occupant P is restrained not only by the upstream inflation portion 47 but also by the downstream inflation portion 48 as well. Further, the impact from the side transmitted to the upper half of the body through the body side portion 11 is reduced not only by the upstream inflation portion 47 but also by the downstream inflation portion 48 as well, and the upper half of the body is further protected.

The first embodiment described in detail above achieves the following advantages.

(1) The time changing apparatus is provided, and the opening time of the pressure regulator valve 70 upon the occupant restraint by the upstream inflation portion 47 is configured to be changed to a time different from the opening time set only by the pressure regulator valve 70 (original opening time of the pressure regulator valve 70) (FIG. 8 and FIG. 9).

Therefore, the outflow starting time (manner of outflow) of the inflation gas G from the upstream inflation portion 47 can be changed by the change in the opening time to a more suitable configuration for restraining and protecting the occupant P, and the performance to restrain and protect the occupant P by the airbag 40 is improved.

(2) As the pressure regulator valve 70, one having the pair of valve body portions 71, 72 provided around the opening 65 is used. Further, the valve body portions 71, 72 are caused to be pressed by the inflation gas G within the upstream inflation portion 47 so as to contact each other or to come close to each other before the occupant restraint by the upstream inflation portion 47 (FIG. 10A). Further, upon the occupant restraint by the upstream inflation portion 47, the valve body portions 71, 72 are caused to be separated from each other by bending them by the external force applied due to the restraint through the dividing portion 50 (wall portion) (FIGS. 10B and 10C).

Thus, by using the pressure regulator valve 70 having such structure, the pressure regulator valve 70 is closed and the inflation gas is restricted from flowing out from the upstream inflation portion 47 through the opening 65 before the occupant restraint by the upstream inflation portion 47. In addition, upon the occupant restraint by the upstream inflation portion 47, the restriction is cancelled by opening the pressure regulator valve 70.

(3) The time changing apparatus is configured by the retaining portion by which the pressure regulator valve 70 is retained in the closed state until the midpoint of the occupant restraint by the upstream inflation portion 47, and the retaining is cancelled from the midpoint of the occupant restraint by the upstream inflation portion 47 (FIG. 8 and FIG. 9).

Therefore, during the occupant restraint by the upstream inflation portion 47, the opening time of the pressure regulator valve 70 is delayed by the time during which the pressure regulator valve 70 is retained in the closed state by the retaining portion, and the time when the inflation gas G starts to flow out from the upstream inflation portion 47 is delayed.

(4) The tear seam 73 by which two valve body portions 71, 72 that are in the state of contacted to each other are connected, and that is broken in the midpoint of the occupant restraint by the upstream inflation portion 47 is used as the retaining portion (time changing apparatus) (FIG. 8 and FIG. 9).

Therefore, the valve body portions 71, 72 are kept connected by the tear seam 73, the valve body portions 71, 72 are retained in the state of contacting each other, and the pressure regulator valve 70 is retained in the closed state in the time before the occupant restraint by the upstream inflation portion 47 and in the time until the midpoint of the occupant restraint during the occupant restraint.

In contrast, from the midpoint of the occupant restraint by the upstream inflation portion 47, the tear seam 73 is broken, and the two valve body portions 71, 72 can be separated (open the pressure regulator valve 70).

Modifications of the First Embodiment

The first embodiment may be modified as follows.

The inflation portion 46 does not necessarily need to be divided by the dividing portion 50, that is, may be configured by one chamber. In this case, the wall portion of the inflation portion 46 is configured by the inner fabric portion 43 and the outer fabric portion 44.

However, a part of the wall portion (inner fabric portion 43 and outer fabric portion 44) is formed of a different member from the remainder of the wall portion. Further, the aforementioned part is connected to the remainder of the wall portion by the first joining portion provided in the peripheral portion of the part. The opening 65 and the pressure regulator valve 70 are provided in this part.

This modification may be adapted respectively to second to fourteenth, sixteenth to twenty-first, and twenty-seventh embodiments to be described below.

In the overlap portion 61, the portion that functions as the two valve body portions 71, 72 is a portion corresponding to the opening 65 (proximal portion of the opening 65, more specifically, a portion between the opening 65 and the end edges 58E, 59E). Thus, so long as at least the distal ends 71T, 72T of the two valve body portions 71, 72 contact each other and are closed upon when the upstream inflation portion 47 is deployed and inflated (before the occupant restraint), a configuration of the portion of the overlap portion 61 not corresponding to the opening 65 (non-proximal portion) may be changed. For example, as for the portion of the overlap portion 61 not corresponding to the opening 65 (non-proximal portion), it may be connected partially or entirely. The means of the connection may be sewing, or may be adhesion. By being changed as above, only the portion corresponding to the opening 65 in the overlap portion 61 can be operated as the two valve body portions 71, 72, and phenomenon in which the non-corresponding portion moves unnecessarily, for example, clattering phenomenon can be prevented.

Other than the above, a notch may be formed at least in part of the portion of the overlap portion 61 not corresponding to the opening 65 (non-proximal portion).

The inner end 52 and the outer end 53 of the dividing portion 50 may be connected to the inner fabric portion 43 and the outer fabric portion 44 of the airbag 40 within the upstream inflation portion 47, or may be connected within the downstream inflation portion 48.

Further, one of the inner end 52 and the outer end 53 may be connected within the upstream inflation portion 47, and the other may be connected within the downstream inflation portion 48.

The opening 65 and the second joining portion 63 may be provided not only in the direction orthogonally intersecting the folding line 51 of the dividing portion 50, but also in a direction obliquely intersecting the folding line 51.

The folding line 51 in the dividing portion 50 in the state of being folded in half may be inclined relative to the vertical direction (up and down direction).

The dividing portion 50 does not necessarily need to be folded along the folding line 51.

The portion where the connection of the overlap portion 61 by the second joining portion 63 is cancelled may be set at a portion differing from the above respective embodiments.

A plurality of portions where the connection of the overlap portion 61 by the second joining portion 63 is cancelled may be set.

When folded in half, the dividing portion 50, which is formed by being folded along the folding line 51 to cause the inner end 52 and the outer end 53 to come close to each other, may be arranged in the inflation portion 46 in the non-inflated and deployed state while being in a state in which the folding line 51 is positioned on the downstream side of the inner end 52 and the outer end 53.

The inner end 52 of the dividing portion 50 may be connected to the inner fabric portion 43 in a front and rear direction of the vehicle seat 12 at a portion differing from the connecting portion of the outer end 53 with the outer fabric portion 44. In this case, the dividing portion 50 is tensed in the direction that it inclines relative to the front and rear direction of the vehicle seat 12.

Second Embodiment

Next, a side airbag apparatus of the second embodiment will be described with reference to FIG. 11.

The second embodiment differs from the first embodiment in a configuration of a pressure regulator valve 70.

More specifically, an upper fabric portion 56 and a lower fabric portion 57 respectively being configured by overlap portions 61 and a non-overlap portion 62 is as described in the first embodiment. In the second embodiment, an extended overlap portion 74 is provided in each overlap portion 61 toward a side separating away from a second joining portion 63 (upper side in FIG. 11) with a center portion in a lateral direction (vehicle widthwise direction: left and right direction of FIG. 11) as a starting point. The extended overlap portions 74 are positioned at positions opposing an opening 65. These extended overlap portions 74 are overlapped with each other in the upstream inflation portion 47 similar to the overlap portions 61.

Further, a tear seam 73 (retaining portion, time changing apparatus) extending in a direction of extension of the extended overlap portions 74 is extended to distal ends of the extended overlap portions 74, whereby the two extended overlap portions 74 are connected by the tear seam 73. The tear seam 73 is elongated by the two extended overlap portions 74.

The configurations other than the above are similar to the first embodiment. Therefore, elements identical to the first embodiment are given the same reference numerals, and redundant descriptions are omitted.

According to the second embodiment configured as above, the valve body portions 71, 72 are elongated by the extended overlap portions 74 being provided. It is more difficult for the two valve body portions 71, 72 to be pushed out (be inverted) to a downstream inflation portion 48 through the opening 65 by the elongated length of the extended overlap portions 74. Further, it is more difficult for the occurrence of the valve body portions 71, 72 being separated from each other after having been inverted (pressure regulator valve 70 being opened) to take place. Therefore, the opening time of the pressure regulator valve 70 is delayed by the two extended overlap portions 74.

Further, the strength of the tear seam 73 is increased by the tear seam 73 becoming longer. Therefore, the timing of breaking is delayed by the tear seam 73 being elongated. As a result, the time when the valve body portions 71, 72 are pushed out (inverted) to the downstream inflation portion 48 through the opening 65 and the valve body portions 71, 72 separate from each other (opening time of the pressure regulator valve 70) is further delayed.

Thus, the second embodiment achieves advantages as follows in addition to the advantages of (1) to (4) as above.

(5) The extended overlap portions 74, which extend away from the second joining portion 63, and are overlapped together with the overlap portions 61 within the upstream inflation portion 47 with the respective overlap portions 61 as the starting points are provided.

Therefore, the opening time of the pressure regulator valve 70 can be delayed in comparison to one without the extended overlap portions 74.

Further, the opening time of the pressure regulator valve 70 can be adjusted by adjusting the lengths of the extended overlap portions 74 in the direction of extension.

(6) The extended overlap portions 74 are connected by the tear seam 73 by extending the tear seam 73.

Therefore, the opening time of the pressure regulator valve 70 can further be delayed by the length of the tear seam 73.

Modifications of the Second Embodiment

The second embodiment may be modified as follows.

The tear seam 73 may be provided at a plurality of positions in the lateral direction (vehicle widthwise direction).

The tear seam 73 may have a length by which it does not reach distal ends of the extended overlap portions 74.

Third Embodiment

Figure 12:
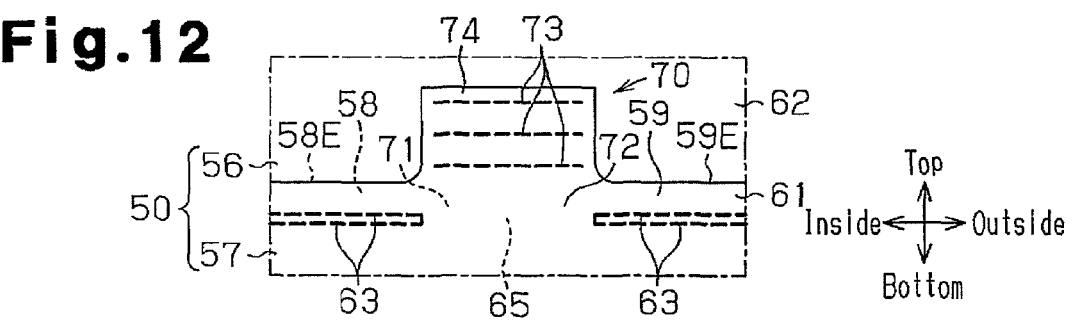
FIG. 12 is a partial rear view showing a pressure regulator valve of a side airbag apparatus of a third embodiment.

Next, a side airbag apparatus of the third embodiment will be described with reference to FIG. 12.

The third embodiment differs from the second embodiment in a configuration of tear seams 73 as a time changing apparatus and a retaining portion.

Specifically, the tear seams 73 are provided in extended overlap portions 74. The tear seams 73 are provided parallel to a second joining portion 63, and extend in a lateral direction (vehicle widthwise direction) when a dividing portion 50 comes to be in a tensed state.

The configurations other than the above are similar to the second embodiment. Therefore, elements identical to the second embodiment are given the same reference numerals, and redundant descriptions are omitted.

In the third embodiment configured as above has the tear seams 73 provided in the extended overlap portions 74 extending along the second joining portion 63. Therefore, although the easiness of breaking of the tear seams 73 differs from the second embodiment, advantages similar to (1) to (6) described above can be obtained.

Modifications of the Third Embodiment

The third embodiment may be modified as follows.

In the third embodiment, although three tear seams 73 are formed parallel to each other, a number thereof may be changed on condition of being one or more. Further, intervals between the adjacent tear seams 73 may be set evenly for all of the tear seams 73, or may be set unevenly.

In the case where a plurality of the tear seams 73 is provided, lengths thereof may be set evenly, or may be set unevenly. The tear seam 73 has a characteristic in which the strength to connect the two extended overlap portions 74 becomes stronger as the length becomes longer.

The tear seams 73 may be provided in the valve body portions 71, 72 in addition to the extended overlap portions 74.

Fourth Embodiment

Figure 13:
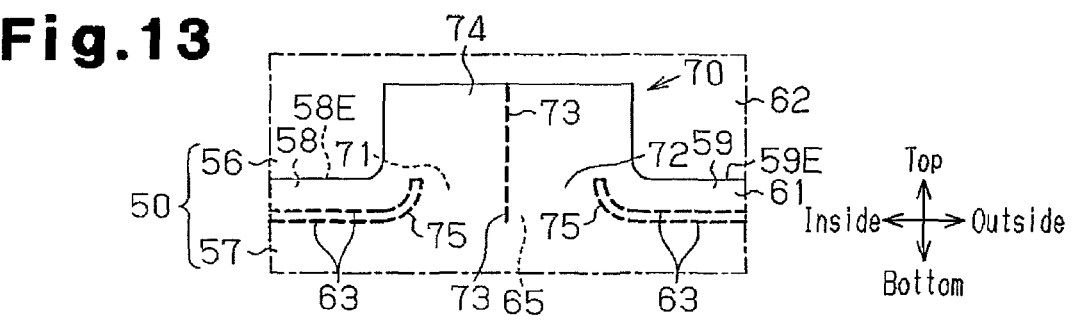
FIG. 13 is a partial rear view showing a pressure regulator valve of a side airbag apparatus of a fourth embodiment.

Next, a side airbag apparatus of the fourth embodiment will be described with reference to FIG. 13.

Upon opening a pressure regulator valve 70 by which the valve body portions 71, 72 separate from each other, a large stress is applied to second joining portions 63 connecting two overlap portions 61 at a boundary portion with a non-overlap portion 62, especially at portions of the second joining portions 63 that are adjacent to an opening 65.

Thus, in the fourth embodiment, stress relaxation portions 75 that relax the stress applied to the portions of the second joining portions 63 that is adjacent to the opening 65 due to the opening of the pressure regulator valve 70 are provided on the overlap portions 61. In the fourth embodiment, a portion that is adjacent to the opening 65 in each of the second joining portions 63 is formed in a curve shape at the overlap portions 61, that is, more specifically, is formed in a curved shape that bulges in a curvature toward a non-overlap portion 62 of the overlap portions 61 (lower side of FIG. 13) and toward inner side of the opening 65, and the stress relaxation portions 75 are formed by the curved portions of the second joining portions 63.

The configurations other than the above are similar to the second embodiment. Therefore, elements identical to the second embodiment are given the same reference numerals, and redundant descriptions are omitted.

In the fourth embodiment configured as above, each of the stress relaxation portions 75 relaxes the stress applied to the portions of the second joining portions 63 that are adjacent to the opening 65. That is, the stress due to the opening of the pressure regulator valve 70 is received at the portions within the second joining portions 63 that are adjacent to the opening 65, which are in this case the non-overlap portion 62 of the overlap portions 61 (lower side of FIG. 13), and that is formed in the curved shape bulging in a curvature toward the inner side of the opening 65. The stress is received at a large portion in the curved shape compared to a case of being received at a narrow portion such as the end of each second joining portion 63.

Thus, the fourth embodiment achieves advantages as follows in addition to the advantages of (1) to (6) as above.

(7) The stress relaxation portions 75 for relaxing the stress applied to the portions of the second joining portions 63 adjacent to the opening 65 due to the opening of the pressure regulator valve 70 are provided at the overlap portions 61.

Therefore, by receiving the stress applied due to the opening of the pressure regulator valve 70 by the stress relaxation portions 75, the portions of the second joining portions 63 adjacent to the opening 65 can be prevented from being damaged by the stress.

(8) Parts of the second joining portions 63 (portions of the second joining portions 63 adjacent to the opening 65) are configured as the stress relaxation portions 75.

Accordingly, since the parts of the second joining portions 63 are caused to function as the stress relaxation portions 75, the stress relaxation portions 75 does not have to be provided separately from the second joining portions 63.

(9) The portions of the second joining portions 63 adjacent to the opening 65 are configured as the stress relaxation portions 75 by being formed in the curved shape at the overlap portions 61.

Therefore, the stress relaxation portions 75 can be formed despite having the simple configuration of forming the portions of the second joining portions 63 adjacent to the opening 65 in the curved shape.

Further, by receiving the stress due to the opening of the pressure regulator valve 70 by the wide portion with the curved shape, the stress is prevented from being applied by being accumulated at certain portions of the second joining portions 63.

(10) The portions of the second joining portions 63 adjacent to the opening 65 are formed in the curved shape that bulges toward the non-overlap portion 62 of the two overlap portions 61 (lower side in FIG. 13) and toward the inner side of the opening 65 in the shape of the curvature, and the stress relaxation portions 75 are formed by these curved portions.

Accordingly, by forming the stress relaxation portions 75 in the shape that bulges in the curvature shape, the shape of the stress relaxation portions 75 can gradually be changed, whereby the stress relaxation portions 75 can easily be formed compared to those in which the shape changes rapidly.

Fifth Embodiment

Next, a side airbag apparatus of the fifth embodiment will be described with reference to FIG. 14.

The fifth embodiment differs from the fourth embodiment in that the extended overlap portions 74 are connected by a pair of extended joining portions 76.

Figure 14:
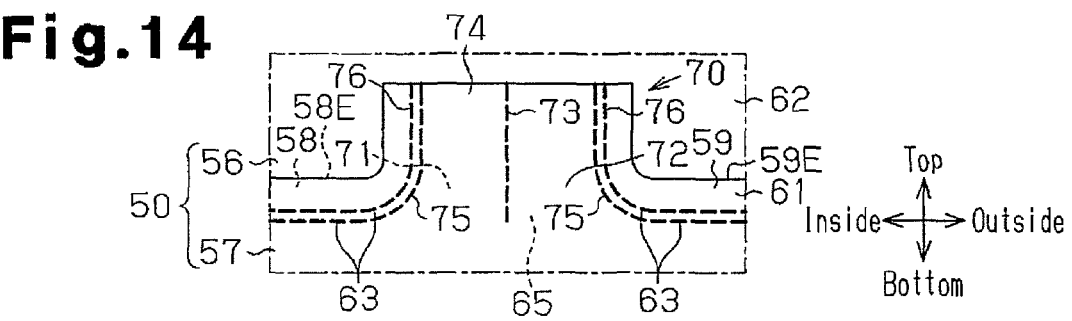
FIG. 14 is a partial rear view showing a pressure regulator valve of a side airbag apparatus of a fifth embodiment.

The extended joining portions 76 has an end on an opening 65 of respective stress relaxation portions 75 (inner ends) as starting points, and extend along a tear seam 73 toward a side away from second joining portions 63 (upper side in FIG. 14). Each of the extended joining portions 76 extends to a distal end of the extended overlap portion 74.

A portion of each extended overlap portion 74 that is sandwiched by the two extended joining portions 76 configures valve body portions 71, 72 together with portions in the respective overlap portions 61 that are sandwiched by the two second joining portions 63 (two stress relaxation portions 75).

The configurations other than the above are similar to the fourth embodiment. Therefore, elements identical to the fourth embodiment are given the same reference numerals, and redundant descriptions are omitted.

In the fifth embodiment configured as above, since the extended joining portions 76 are provided on the stress relaxation portions 75, it is more difficult for the extended overlap portions 74 to deform. Therefore, upon an occupant restraint by an upstream inflation portion 47, it is difficult for the valve body portions 71, 72 to be pushed out from the upstream inflation portion 47 to the downstream inflation portion 48 through the opening 65 compared to the fourth embodiment in which the extended joining portions 76 are not provided. The timing at which the two valve body portions 71, 72 separate from each other in the downstream inflation portion 48 (opening time of the pressure regulator valve 70) is delayed compared to the case where the extended joining portions 76 are not provided.

Thus, the fifth embodiment achieves advantages as follows in addition to the advantages of (1) to (10) as above.

(11) The extended joining portions 76 extend from the respective stress relaxation portions 75 to an opposite side from the second joining portions 63, and the extended overlap portions 74 are connected by these extended joining portions 76.

Therefore, the valve body portions 71, 72 are less likely to be deformed in comparison to the fourth embodiment due to the extended joining portions 76.

Upon the occupant restraint by the upstream inflation portion 47, it can be made more difficult for the valve body portions 71, 72 to be pushed out (be inverted) from the upstream inflation portion 47 to the downstream inflation portion 48 through the opening 65. As a result, the timing at which the two valve body portions 71, 72 separate from each other in the downstream inflation portion 48 (opening time of the pressure regulator valve 70) can further be delayed in comparison to the fourth embodiment where the extended joining portions 76 are not provided.

Sixth Embodiment

Next, a side airbag apparatus of the sixth embodiment will be described with reference to FIG. 15.

Figure 15:
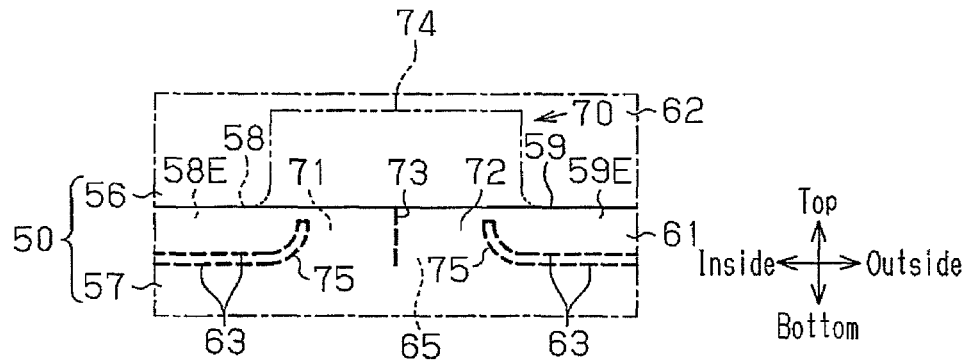
FIG. 15 is a partial rear view showing a pressure regulator valve of a side airbag apparatus of a sixth embodiment.

The sixth embodiment differs from the fourth embodiment in that an extended overlap portion 74 shown by broken line in which a long dash alternates with a pair of short dashes in FIG. 15 is omitted.

In other words, the sixth embodiment differs from the first embodiment in that stress relaxation portions 75 are added. That is, the stress relaxation portions 75 that relaxes stress applied to respective portions of second joining portions 63 adjacent to an opening 65 due to opening of a pressure regulator valve 70 are provided on the overlap portions 61. The portion among each of the second joining portions 63 that are adjacent to the opening 65 is formed in a curved shape in the overlap portions 61; more specifically, the portion is formed in a curved shape that bulges toward a non-overlap portion 62 of the overlap portions 61 (lower side in FIG. 15) and toward an inner side of the opening 65, and the stress relaxation portions 75 are configured by the curved-shape portions of the second joining portions 63.

The configurations other than the above are similar to the first embodiment. Therefore, elements identical to the first embodiment are given the same reference numerals, and redundant descriptions are omitted.

In the sixth embodiment configured as above, the stress relaxation portions 75 provided in the overlap portions 61 relaxes the stress applied to the portions of the second joining portions 63 adjacent to the opening 65. That is, the stress due to the opening of the pressure regulator valve 70 is received at the portions of the second joining portions 63 that are adjacent to the opening 65, which are in this case portions formed in the curved shape that bulges in the curvature shape toward the non-overlap portion 62 of the overlap portions 61 (lower side in FIG. 15) and toward the inner side of the opening 65. Since the stress is received at the wide portion formed in the curved shape, the occurrence of the stress due to the opening of the pressure regulator valve 70 accumulating at particular portions in the second joining portions 63 is unlikely to take place.

Thus, the sixth embodiment achieves advantages of (1) to (4) and (7) to (10) as above.

Seventh Embodiment

Next, a side airbag apparatus of the seventh embodiment will be described with reference to FIG. 16.

The seventh embodiment differs from the fifth embodiment (see FIG. 14) in that an extended overlap portion 74 extends from an entirety of an overlap portion 61 to a side separating away from second joining portions 63 (upper side in FIG. 16), whereas, in the fifth embodiment, the extended overlap portion 74 extends from only a center portion in a lateral direction (vehicle widthwise direction). That is, in the seventh embodiment, the extended overlap portion 74 is extended toward the lateral direction (vehicle widthwise direction) in comparison to the fifth embodiment.

The configurations other than the above are similar to the fifth embodiment. Therefore, elements identical to the fifth embodiment are given the same reference numerals, and redundant descriptions are omitted.

The seventh embodiment configured as above has valve body portion 71, 72 configured to be less likely to be deformed by the extended overlap portion 74 being extended in the lateral direction (vehicle widthwise direction), and further it is more difficult for the valve body portion 71, 72 to be pushed out (be inverted) to a downstream inflation portion 48 through an opening 65. Further, it is more difficult for the occurrence of the valve body portions 71, 72 being separated from each other after having been inverted (pressure regulator valve 70 being opened) to take place. Therefore, an opening time of the pressure regulator valve 70 is delayed for the elongation by the two extended overlap portions 74.

Thus, the seventh embodiment achieves advantages as follows in addition to the advantages of (1) to (11) as above.

Figure 16:
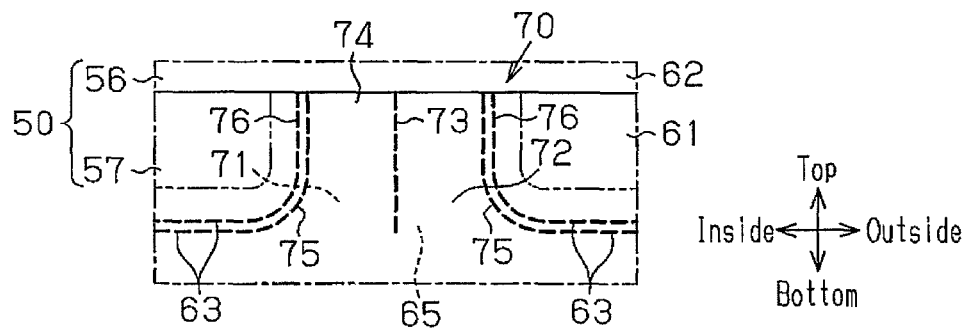
FIG. 16 is a partial rear view showing a pressure regulator valve of a side airbag apparatus of a seventh embodiment.

(12) The extended overlap portion 74 is provided to extend from the entirety of the overlap portion 61 and away from the second joining portions 63 (upper side in FIG. 16).

Therefore, the opening time of the pressure regulator valve 70 can be delayed in comparison to the fifth embodiment.

Eighth Embodiment

Figure 17:
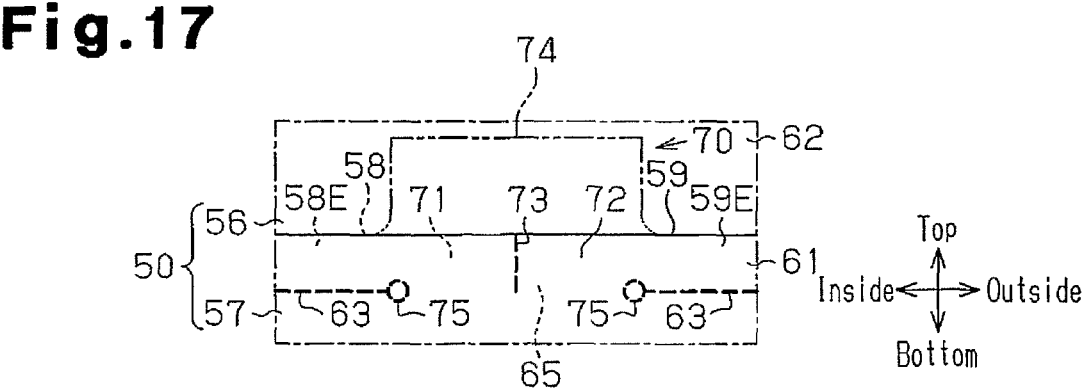
FIG. 17 is a partial rear view showing a pressure regulator valve of a side airbag apparatus of an eighth embodiment.

Next, a side airbag apparatus of the eighth embodiment will be described with reference to FIG. 17.

The eighth embodiment differs from the sixth embodiment in a configuration of stress relaxation portions 75. Specifically, in the eighth embodiment, a number of second joining portions 63 is changed from two (the sixth embodiment) to one. Further, a section of each second joining portion 63 adjacent to an opening 65 is formed in a round shape, and the stress relaxation portion 75 is configured by this portion.

The configurations other than the above are similar to the sixth embodiment. Therefore, elements identical to the sixth embodiment are given the same reference numerals, and redundant descriptions are omitted.

In the eighth embodiment configured as above, similar to the sixth embodiment, the stress relaxation portions 75 relax the stress applied to portions of the second joining portions 63 adjacent to the opening 65. However, due to the difference in the configuration of the stress relaxation portions 75, a degree by which the stress is relaxed differs from the sixth embodiment.

Thus, the eighth embodiment achieves advantages of (1) to (4) and (7) to (10) as above.

Ninth Embodiment

Figure 18:
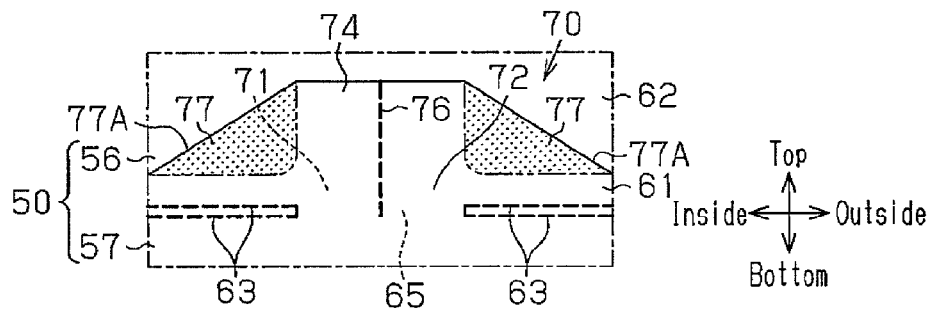
FIG. 18 is a partial rear view showing a pressure regulator valve of a side airbag apparatus of a ninth embodiment.

Next, a side airbag apparatus of the ninth embodiment will be described with reference to FIG. 18.

The ninth embodiment differs from the second embodiment in a shape of an extended overlap portion 74. In the ninth embodiment, auxiliary extended overlap portions 77 shown by dots in FIG. 18 are further provided on both sides in a direction along second joining portions 63 with the extended overlap portion 74 of the second embodiment as a core. Each of the auxiliary extended overlap portions 77 has a dimension (width) in a lateral direction (vehicle widthwise direction) that becomes narrow as it is distanced away from an overlap portion 61. Each of the auxiliary extended overlap portions 77 has an inclined edge 77A that approaches closer to the opposing auxiliary extended overlap portion 77 on a farther side from the overlap portion 61.

The configurations other than the above are similar to the second embodiment. Therefore, elements identical to the second embodiment are given the same reference numerals, and redundant descriptions are omitted.

In the ninth embodiment configured as above, the valve body portions 71, 72 is less likely to be deformed by connecting portions of the valve body portions 71, 72 with the overlap portions 61 being large due to the auxiliary extended overlap portions 77 being provided. For the auxiliary extended overlap portions 77, it is more difficult for the valve body portions 71, 72 to be pushed out (be inverted) to a downstream inflation portion 48 through the opening 65. Further, it is more difficult for the occurrence of the valve body portions 71, 72 being separated from each other after having been inverted (pressure regulator valve 70 being opened) to take place.

Thus, the ninth embodiment achieves advantages as follows in addition to the advantages of (1) to (6) as above.

(13) As for the direction along the second joining portions 63, the auxiliary extended overlap portions 77 extending out from the overlap portion 61 to the opposite direction from the second joining portions 63 are provided on both sides of the extended overlap portion 74 in the state of being connected to the extended overlap portions 74.

Figure 11:
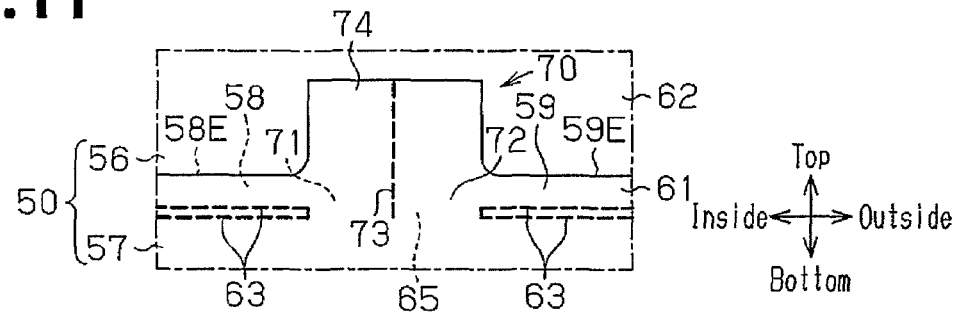
FIG. 11 is a partial rear view showing a pressure regulator valve of a side airbag apparatus of a second embodiment.

Therefore, the opening time of the pressure regulator valve 70 can further be delayed in comparison to the second embodiment, which only provides the extended overlap portions 74 (see FIG. 11).

Tenth Embodiment

Next, a side airbag apparatus of the tenth embodiment will be described with reference to FIG. 19.

The tenth embodiment differs from the ninth embodiment in that two auxiliary extended overlap portions 77 are connected by a pair of extended joining portions 76.

The extended joining portions 76 extend from respective second joining portions 63 from sides corresponding to an opening 65 and along inclined edges 77A of respective auxiliary extended overlap portions 77 to distal ends of the extended overlap portions 74. Accordingly, the respective extended joining portions 76 extend in directions that are inclined relative to the second joining portions 63. Further, in other words, an interval between the two extended joining portions 76 becomes smaller on a farther side from the overlap portion 61.

The configurations other than the above are similar to the ninth embodiment. Therefore, elements identical to the ninth embodiment are given the same reference numerals, and redundant descriptions are omitted.

The tenth embodiment configured as above achieves advantages of (1) to (6) and (13) as above.

Modifications of the Tenth Embodiment

The tenth embodiment may be modified as follows.

Figure 19:
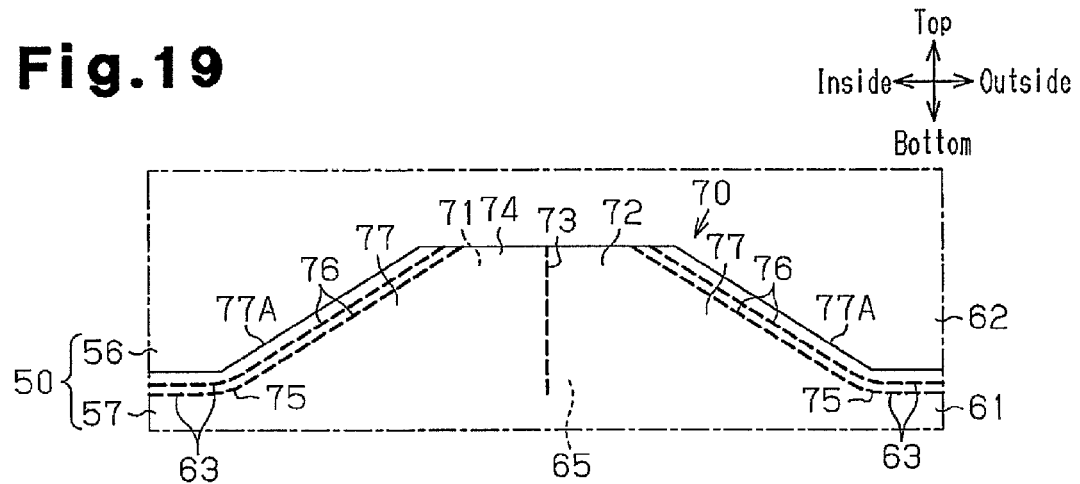
FIG. 19 is a partial rear view showing a pressure regulator valve of a side airbag apparatus of a tenth embodiment.

The respective extended joining portions 76 are not limited to those in a linear shape, but may be curved so as to bulge to a side by which entireties of the extended joining portions 76 separate away from the overlap portion 61 (upper side in FIG. 19), and contrary to this, they may curve so as to recess toward a side by which the entireties of the extended joining portions 76 approach the overlap portion 61 (lower side in FIG. 19).

Eleventh Embodiment

Figure 20:
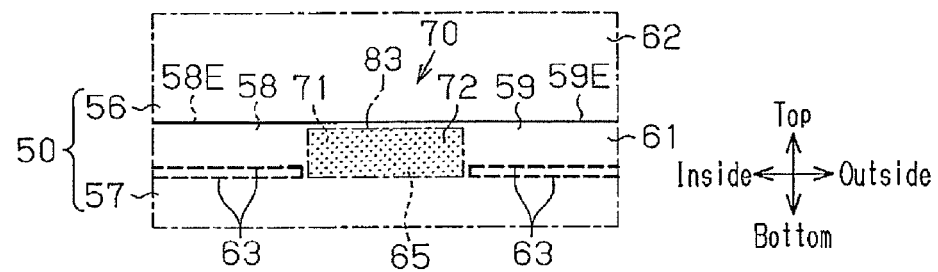
FIG. 20 is a partial rear view showing a pressure regulator valve of a side airbag apparatus of an eleventh embodiment.
Figure 21:
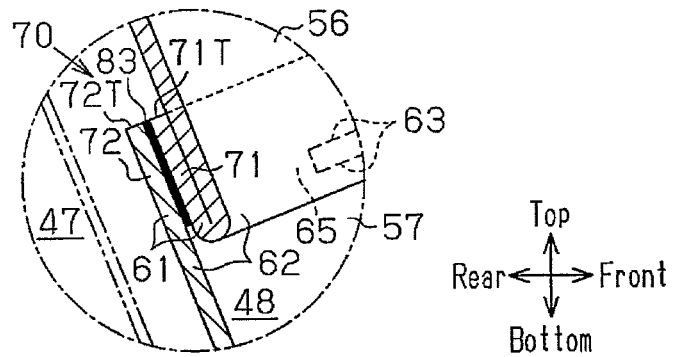
FIG. 21 is a partial cross-sectional side view showing the pressure regulator valve in the eleventh embodiment.

Next, a side airbag apparatus of the eleventh embodiment will be described with reference to FIG. 20 and FIG. 21.

The eleventh embodiment differs from the first embodiment in a configuration of a retaining portion (time changing apparatus). Specifically, in the eleventh embodiment, the retaining portion (time changing apparatus) is formed instead of the tear seam 73 between valve body portions 71, 72 in a state of being caused to approach each other so as to connect the valve body portions 71, 72, and is configured by an adhesive layer 83 that cancels the connection during a midpoint of an occupant restraint by an inflation portion 46. The adhesive layer 83 connects (adheres) the two valve body portions 71, 72 at a strength that is lower than other joining portions, for example, the peripheral joining portion 45, the first joining portions 54, 55, the second joining portions 63 and the like. The adhesive layer 83 is configured to be more prone to breaking than the other joining portions.

The configurations other than the above are similar to the first embodiment. Therefore, elements identical to the first embodiment are given the same reference numerals, and redundant descriptions are omitted.

In the eleventh embodiment configured as above, the adhesive layer 83 formed between the valve body portions 71, 72 in the state of being caused to approach each other acts to connect the two valve body portions 71, 72 by its adhering force.

The force of the adhesive layer 83 acting to connect the two valve body portions 71, 72 (adhering force) is larger than a force that acts to separate the two valve body portions 71, 72 in a period before an occupant restraint by an upstream inflation portion 47 and in a period until a midpoint of the occupant restraint during the occupant restraint. Therefore, the adhesive layer 83 is not broken, and the connection by the adhesive layer 83 is maintained.

In contrast, from the midpoint of the occupant restraint by the upstream inflation portion 47, the force that acts to separate the two valve body portions 71, 72 overwhelms the force that acts to connect the two valve body portions 71, 72 by the adhesive layer 83 (adhering force). Therefore, the adhesive layer 83 is broken, the connection (retaining) by the adhesive layer 83 is cancelled, and the force that acts to maintain the two valve body portions 71, 72 in a contacting state disappears.

Accordingly, during the occupant restraint by the upstream inflation portion 47, an opening time of a pressure regulator valve 70 is delayed by the period in which the two valve body portions 71, 72 are retained in the state of approaching each other by the adhesive layer 83. Accompanying this, a time when inflation gas G in the upstream inflation portion 47 starts to flow out to the downstream inflation portion 48 through the opening 65 is delayed.

Thus, the eleventh embodiment achieves an advantage of (4A) as follows instead of the above (4), in addition to the advantages of (1) to (3) as above.

(4A) The adhesive layer 83, which is formed between the two valve body portions 71, 72 in the state of being caused to approach each other and is broken from a midpoint of the occupant restraint by the upstream inflation portion 47, is formed as the retaining portion (time changing apparatus).

Therefore, the valve body portions 71, 72 can be retained in the state of being caused to approach each other, and the pressure regulator valve 70 can be retained in a closed state in the period before the occupant restraint by the upstream inflation portion 47 and in the period until the midpoint of the occupant restraint during the occupant restraint.

In contrast, the two valve body portions 71, 72 can be caused to separate (open the pressure regulator valve 70) from the midpoint of the occupant restraint by the upstream inflation portion 47.

Modifications of the Eleventh Embodiment

The eleventh embodiment may be modified as follows.

As the retaining portion (time changing apparatus), a sticking layer (not shown) may be provided instead of the adhesive layer 83. In this case, the sticking layer is formed between the two valve body portions 71, 72 that are in the state of being caused to approach each other, and the two valve body portions 71, 72 are connected by the sticking force thereof. The sticking layer continues to connect (stick together) the valve body portions 71, 72 until midpoint of the occupant restraint by the upstream inflation portion 47 without being broken. The sticking layer is broken from the midpoint of the occupant restraint, whereby the separation of the two valve body portions 71, 72 (opening of the pressure regulator valve 70) is possible. The connecting force of the sticking layer is smaller than the connecting force of the adhesive layer and enables exfoliation of two members to be connected. On the other hand, the connecting force of the adhesive layer is equal to the strength that the two members to be connected have, and is capable of preventing the exfoliation of the two members.

The adhesive layer 83 may be provided on entire surfaces of the valve body portions 71, 72, or may be provided only at parts thereof. The same applies to the case where the sticking layer is provided instead of the adhesive layer 83.

Twelfth Embodiment

Figure 22:
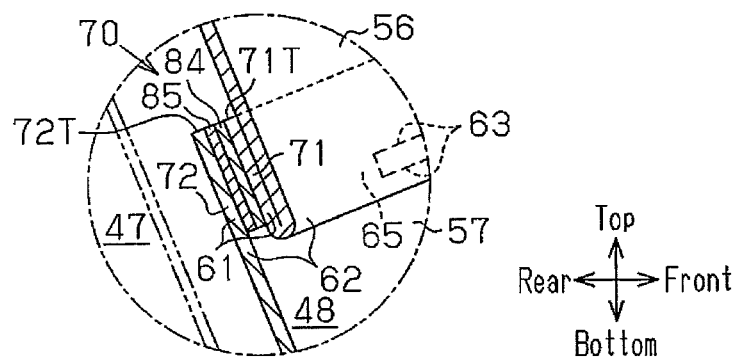
FIG. 22 is a partial cross-sectional side view showing a pressure regulator valve of a side airbag apparatus in a twelfth embodiment.

Next, a side airbag apparatus of the twelfth embodiment will be described with reference to FIG. 22.

The twelfth embodiment differs in a configuration of a retaining portion (time changing apparatus) from the first embodiment. Specifically, in the twelfth embodiment, the retaining portion (time changing apparatus) is configured, instead of the tear seam 73, of a hook-side fastener 84 attached to one of the two valve body portions 71, 72 and a loop-side fastener 85 attached to the other thereof, and which is capable of detachably attaching to the hook-side fastener 84.

The hook-side fastener 84 and the loop-side fastener 85 connect the two valve body portions 71, 72 in a state of being caused to approach each other, and cancel the connection from a midpoint of an occupant restraint by an upstream inflation portion 47. The hook-side fastener 84 and the loop-side fastener 85 connect the two valve body portions 71, 72 with a lower strength than other joining portions, for example, a peripheral joining portion 45, first joining portions 54, 55, second joining portions 63 and the like, and cancellation of the connection thereof is made easier than that of the other joining portions.

The configurations other than the above are similar to the first embodiment. Therefore, elements identical to the first embodiment are given the same reference numerals, and redundant descriptions are omitted.

In the twelfth embodiment configured as above, the connection of the two valve body portions 71, 72 is performed by the hook-side fastener 84 and the loop-side fastener 85 being connected to each other.

The force by which the hook-and-loop fasteners 84, 85 work to connect the two valve body portions 71, 72 is larger than the force that acts to separate the two valve body portions 71, 72 in the period before the occupant restraint by the upstream inflation portion 47 and in the period within the occupant restraint until the midpoint of the occupant restraint. Therefore, the hook-and-loop fasteners 84, 85 are not separated, and the connection by the hook-and-loop fasteners 84, 85 is maintained.

In contrast, from the midpoint of the occupant restraint by the upstream inflation portion 47, the force that acts to separate the two valve body portions 71, 72 overwhelms the force that acts to connect the two valve body portions 71, 72 by the hook-and-loop fasteners 84, 85. Therefore, the hook-and-loop fasteners 84, 85 are separated.

As a result, during the occupant restraint by the upstream inflation portion 47, an opening time of a pressure regulator valve 70 is delayed by the period during which the two valve body portions 71, 72 are retained in the state of approaching each other by the hook-and-loop fasteners 84, 85. Accompanying this, a time when inflation gas G in the upstream inflation portion 47 starts to flow out to the downstream inflation portion 48 through the opening 65 is delayed.

Thus, the twelfth embodiment achieves an advantage of (4B) as follows instead of the above (4), in addition to the advantages of (1) to (3) as above.

(4B) The hook-side fastener 84 attached to one of the two valve body portions 71, 72 and the loop-side fastener 85 attached to the other thereof, and which is capable of detachably attaching to the hook-side fastener 84 configure the retaining portion (time changing apparatus).

Therefore, the two valve body portions 71, 72 are retained in the state of being caused to approach each other in the period before the occupant restraint by the upstream inflation portion 47 and in the period within the occupant restraint until the midpoint of the occupant restraint so as to retain the pressure regulator valve 70 in a closed state.

In contrast, the two valve body portions 71, 72 can be caused to separate (open the pressure regulator valve 70) from the midpoint of the occupant restraint by the upstream inflation portion 47.

Thirteenth Embodiment

Figure 23:
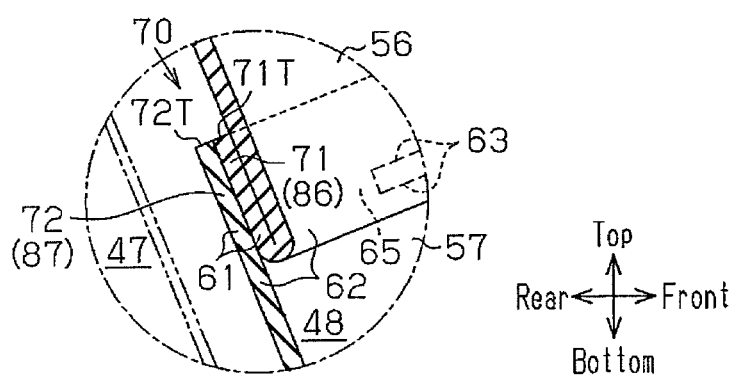
FIG. 23 is a partial cross-sectional side view showing a pressure regulator valve of a side airbag apparatus in a thirteenth embodiment.

Next, a side airbag apparatus of the thirteenth embodiment will be described with reference to FIG. 23.

The thirteenth embodiment differs from the first embodiment in a configuration of a retaining portion (time changing apparatus). Specifically, in the thirteenth embodiment, instead of the tear seam 73, the retaining portion (time changing apparatus) is configured by a first frictional portion 86 and a second frictional portion 87. The first frictional portion 86 is formed at least at a part of a valve body portion 71 on one side. The second frictional portion 87 is formed at least at a part of a valve body portion 72 on the other side under a condition of being at a section that opposes the first frictional portion 86. The second frictional portion 87 generates frictional force upon closing a pressure regulator valve 70 by making contact with the first frictional portion 86. In the thirteenth embodiment, an entirety of each of an upper fabric portion 56 and a lower fabric portion 57 configuring a dividing portion 50 is formed by a material having a high frictional coefficient, for example, rubber, elastomer, and the like. Further, a surface of the valve body portion 71 that faces the valve body portion 72 is configured as the first frictional portion 86, and a surface of the valve body portion 72 that faces the valve body portion 71 is configured as the second frictional portion 87.

The configurations other than the above are similar to the first embodiment. Therefore, elements identical to the first embodiment are given the same reference numerals, and redundant descriptions are omitted.

In the thirteenth embodiment configured as above, the first frictional portion 86 formed on the valve body portion 71 on the one side and the second frictional portion 87 formed on the valve body portion 72 on the other side act to keep the valve body portions 71, 72 to be in contact by contacting each other.

In a period before an occupant restraint by the upstream inflation portion 47 and in a period within the occupant restraint until a midpoint of the occupant restraint, the force by the two frictional portions 86, 87 acting to keep the valve body portions 71, 72 to be in the state of contacting each other is larger than a force that acts to separate the two valve body portions 71, 72. Therefore, the two frictional portions 86, 87 are not separated, and the contacted state of the two valve body portions 71, 72 is continued by the two frictional portions 86, 87.

In contrast, from the midpoint of the occupant restraint by the upstream inflation portion 47, the force that acts to separate the two valve body portions 71, 72 overwhelms the force by the two frictional portions 86, 87 acting to keep the valve body portions 71, 72 to be in the state of contacting each other, and the two frictional portions 86, 87 are separated.

Therefore, during the occupant restraint by the upstream inflation portion 47, an opening time of a pressure regulator valve 70 is delayed by the period in which the two valve body portions 71, 72 are retained in the state of contacting each other by the two frictional portions 86, 87. Accompanying this, a time when inflation gas G in the upstream inflation portion 47 starts to flow out to the downstream inflation portion 48 through the opening 65 is delayed.

Thus, the thirteenth embodiment achieves an advantage of (4C) as follows instead of the above (4), in addition to the advantages of (1) to (3) as above.

(4C) The retaining portion (time changing apparatus) is configured by the first frictional portion 86 formed at least at a part of the valve body portion 71 on the one side, and the second frictional portion 87 formed at least at a part of the valve body portion 72 on the other side, and that generates the frictional force upon closing the pressure regulator valve 70 by making contact with the first frictional portion 86.

Therefore, the valve body portions 71, 72 can be retained in the state of contacting each other, and the pressure regulator valve 70 can be retained in a closed state in the period before the occupant restraint by the upstream inflation portion 47 and in the period within the occupant restraint until the midpoint of the occupant restraint.

In contrast, the two valve body portions 71, 72 can be caused to separate (open the pressure regulator valve 70) from the midpoint of the occupant restraint by the upstream inflation portion 47.

Modifications of the Thirteenth Embodiment

The thirteenth embodiment may be modified as follows.

The first frictional portion 86 may be formed only at a part of the valve body portion 71. Similarly, the second frictional portion 87 may be formed only at a part of the valve body portion 72. In summary, areas of the two frictional portions 86, 87 in the valve body portions 71, 72 may be changed on condition that the second frictional portion 87 can generate the frictional force upon closing the pressure regulator valve 70 by making contact with the first frictional portion 86.

Fourteenth Embodiment

Next, a side airbag apparatus of the fourteenth embodiment will be described with reference to FIG. 24 to FIG. 26.

In the fourteenth embodiment, overlap portions 61 including the valve body portions 71, 72 are arranged on a downstream inflation portion 48 before inflation of an inflation portion 46. Further, stress relaxation portions 75 are provided on the overlap portions 61.

The configurations other than the above are similar to the first embodiment. Therefore, elements identical to the first embodiment are given the same reference numerals, and redundant descriptions are omitted.

In the fourteenth embodiment configured as above, the overlap portions 61 including the valve body portions 71, 72 operate somewhat different from the first embodiment.

A dividing portion 50 in a state of being folded in half is connected to both of corresponding fabric portions 43, 44 of an airbag 40 by first joining portions 54, 55 at each of an inner end 52 and an outer end 53, and is connected (sewn together) to the fabric portions 43, 44 by peripheral joining portions 45 at each end (upper end and lower end) in a direction along a folding line 51 (see FIG. 24A). Therefore, as shown in FIG. 25A, when the inflation of the upstream inflation portion 47 starts, the dividing portion 50 in the state of being folded in half is pulled. Tension is applied on the dividing portion 50 in a vertical direction (up and down direction) and in a lateral direction (vehicle widthwise direction), whereby the dividing portion 50 acts to shift to a tensed state.

Figure 26:
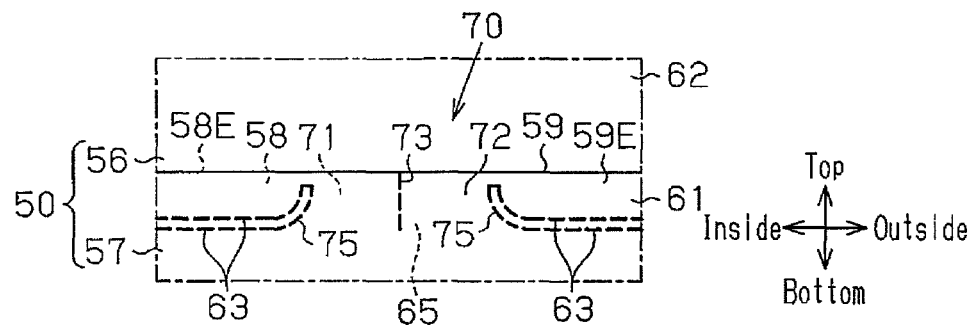
FIG. 26 is a partial rear view showing the pressure regulator valve of the fourteenth embodiment.

Similar to the first embodiment, in the fourteenth embodiment, in the dividing portion 50 in which a dimension L1 in the vertical direction (up and down direction) is longer than a dimension L2 in the lateral direction (vehicle widthwise direction), an opening 65 is provided along the lateral direction (vehicle widthwise direction: left and right direction in FIG. 26). See FIG. 8. According to this, in the dividing portion 50, stronger tension is likely to be applied in the lateral direction (vehicle widthwise direction) than in the vertical direction (up and down direction). Therefore, the opening 65 is prone to being closed according to a magnitude relationship of the tension as above.

Further, as shown in FIG. 24A, 24B, entireties of the overlap portions 61 are bent and are overlapped with a non-overlap portion 62 of the dividing portion 50, and further are connected to the corresponding fabric portions 43, 44 of the airbag 40 together with the inner end 52 and the outer end 53 of the dividing portion 50 by the first joining portions 54, 55 at the opposite ends in the direction along second joining portions 63 (lateral direction: vehicle widthwise direction). See FIG. 5. Not only to the dividing portion 50 upon when the upstream inflation portion 47 is inflated, the tension is applied also in the direction in which the opening 65 extends (lateral direction: vehicle widthwise direction) on the overlap portions 61 including the valve body portions 71, 72. Compared to a case in which the opposite ends of the overlap portions 61 are not connected to the fabric portions 43, 44 of the airbag 40 in the direction along the second joining portions 63 (lateral direction: vehicle widthwise direction), the interval between the valve body portions 71, 72 is more prone to be closed. Therefore, inflation gas in the upstream inflation portion 47 does not flow out easily to the downstream inflation portion 48 by flowing through the opening 65 and between the two valve body portions 71, 72.

Since the valve body portions 71, 72 are positioned on the downstream inflation portion 48, an occasion in which an internal pressure of the upstream inflation portion 47 is applied to the valve body portions 71, 72 from both sides in their overlapping direction, and the two valve body portions 71, 72 are in a self-sealed state does not occur. An occasion in which the overlap portions 61 including the two valve body portions 71, 72 being pressed against the non-overlap portion 62 of the dividing portion 50 by this internal pressure also does not occur.

While the inflation gas is supplied to the upstream inflation portion 47 in a state in which the valve body portions 71, 72 are closed, as shown in FIG. 25B, when the upstream inflation portion 47 deforms by being pressed by an external force due to an occupant restraint being applied, the internal pressure PI of the upstream inflation portion 47 rises and the dividing portion 50 is pressed toward a downstream inflation portion 48. Accompanying this pressing, the tension applied on the dividing portion 50 changes. With respect to upper fabric portions 56 connected to the fabric portions 43, 44 by the peripheral joining portions 45, tension in a direction approaching the peripheral joining portions 45, that is, tension directed upward is increased due to deformation of the upper fabric portions 56 toward the downstream inflation portion 48. As for lower fabric portions 57 connected to the fabric portions 43, 44 by the peripheral joining portions 45, tension in a direction approaching the peripheral joining portions 45, that is, tension directed downward is increased due to deformation of the lower fabric portions 57 toward the downstream inflation portion 48. According to the changes in the tension as above, the opening 65 in a slit shape is pulled in the vertical direction (up and down direction) and is opened. As a width W1 of the opening 65 in the vertical direction (up and down direction) enlarges, the valve body portion 71 on the upper side is pulled upward as shown by an arrow AU, and the valve body portion 72 on the lower side is pulled downward as shown by an arrow AL, whereby the overlapping portions of the two valve body portions 71, 72 gradually reduces as shown in FIG. 25C. As a result, the inflation gas G in the upstream inflation portion 47 flows out to the downstream inflation portion 48 by flowing through the opening 65 and between the two valve body portions 71, 72.

Accordingly, in the fourteenth embodiment, which arranges the overlap portions 61 including the valve body portions 71, 72 on the downstream inflation portion 48 before the inflation of the inflation portion 46 (upstream inflation portion 47), the pressure by the inflation gas G is not applied from both sides in the overlapping direction to the overlap portions 61 including the valve body portions 71, 72. Therefore, as is different from the first embodiment, the effects of causing the overlap portions 61 to be in the self-sealed state by causing them to make tight contact by the aforementioned pressure, and of pressing the overlap portions 61 against the non-overlap portion 62. Thus, an opening time of the pressure regulator valve 70 becomes earlier than that in the first embodiment.

However, in the fourteenth embodiment, the overlap portions 61 are folded along the second joining portion 63, and are overlapped on the non-overlap portion 62, and the opposite ends of the overlap portions 61 are connected to the corresponding fabric portions 43, 44 of the airbag 40 together with the non-overlap portion 62 in the direction along the second joining portions 63 (lateral direction: vehicle widthwise direction). Further, in the dividing portion 50 of which dimension L1 in the vertical direction (up and down direction) is longer than the dimension L2 in the lateral direction (vehicle widthwise direction), the opening 65 is provided along the lateral direction (vehicle widthwise direction), in which stronger tension is applied.

Therefore, when the upstream inflation portion 47 is inflated, not only the strong tension is applied to the dividing portion 50 in the direction in which the opening 65 extends (lateral direction: vehicle widthwise direction), but also the strong tension can be applied to the overlap portions 61 in the direction in which the opening 65 extends (lateral direction: vehicle widthwise direction). As a result, the valve body portions 71, 72 can be made to make tight contact with each other, so that the inflation gas G in the upstream inflation portion 47 is restricted from flowing out to the downstream inflation portion 48.

A force that acts to retain the valve body portions 71, 72 in the state of contacting each other by the tear seam 73 overwhelms a force that acts to separate the valve body portions 71, 72 in a period before the occupant restraint by the upstream inflation portion 47 and in a period within the occupant restraint until the midpoint of the occupant restraint. Therefore, the tear seam 73 is not broken, and the connection by the tear seam 73 is maintained. The two valve body portions 71, 72 are retained in the state of contacting each other, and the pressure regulator valve 70 is retained in the closed state.

In contrast, from the midpoint of the occupant restraint by the inflation portion 46, the force that works to separate the two valve body portions 71, 72 overwhelms the force that acts to retain the valve body portions 71, 72 in the state of contacting each other by the tear seam 73. The tear seam 73 is broken, the connection (retaining) by the tear seam 73 is cancelled, and the force that works to keep the two valve body portions 71, 72 in the contacting state disappears. The two valve body portions 71, 72 are thus capable of separating (the pressure regulator valve 70 is capable of opening).

Accordingly, during the occupant restraint by the upstream inflation portion 47, the opening time of the pressure regulator valve 70 is delayed by the period during which the two valve body portions 71, 72 are retained in the state of contacting each other by the tear seam 73. Accompanying this, a time when inflation gas G in the upstream inflation portion 47 starts to flow out to the downstream inflation portion 48 through the opening 65 is delayed.

Further, in the fourteenth embodiment, since the stress relaxation portions 75 are provided on the two overlap portions 61, the stress relaxation portions 75 relax the stress applied to portions of the second joining portions 63 adjacent to the opening 65.

Thus, according to the fourteenth embodiment, advantages of (1) to (4) and (7) to (10) as above can also be achieved.

Fifteenth Embodiment

Figure 27:
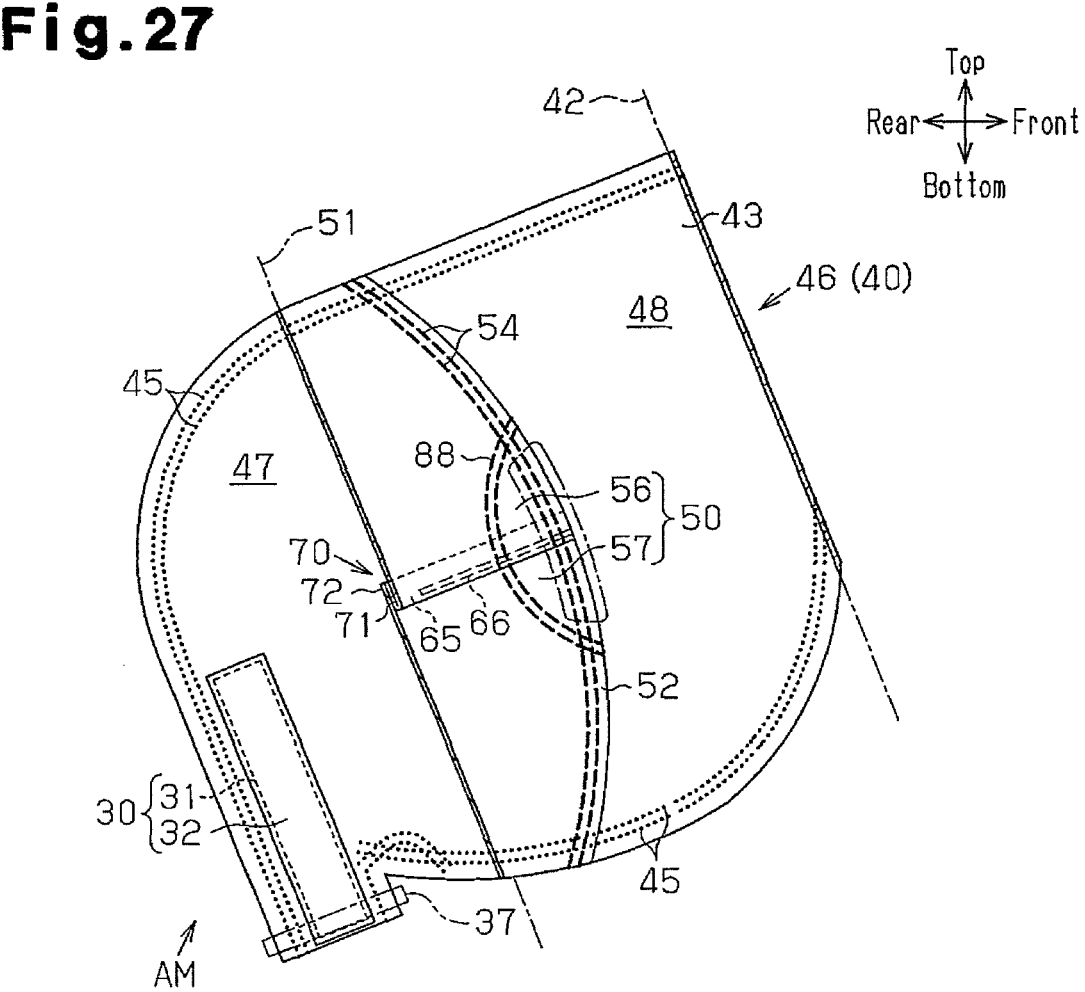
FIG. 27 is a cross-sectional side view of a side airbag apparatus of a fifteenth embodiment, showing an internal structure of an airbag module having an airbag in a non-inflated and deployed state.
Figure 28:
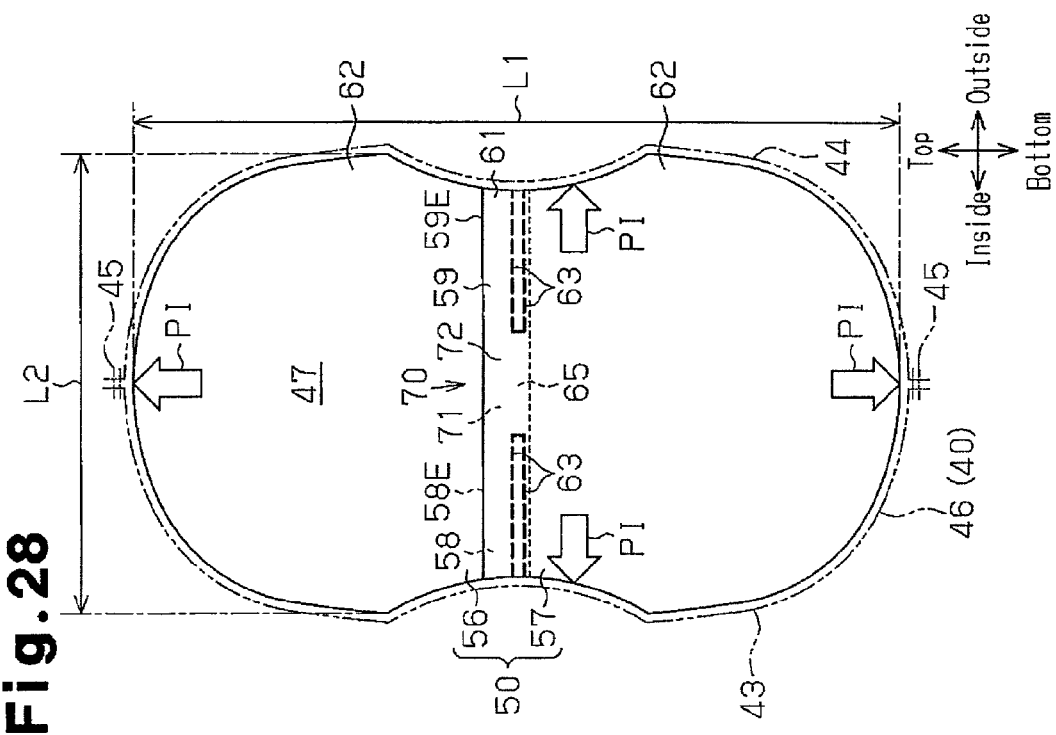
FIG. 28 is a rear view showing a state in which a dividing portion of the fifteenth embodiment is tensed.

Next, a side airbag apparatus of the fifteenth embodiment will be described with reference to FIG. 27 and FIG. 28.

Similar to the first embodiment, the fifteenth embodiment is on the premise of a side airbag apparatus that includes a dividing portion 50, which divides an inflation portion 46 into an upstream inflation portion 47 and a downstream inflation portion 48, and an opening 65, which is configured by a slit extending in a lateral direction (vehicle widthwise direction), when the dividing portion 50 is tensed.

Further, an inner end 52 and an outer end 53 of the dividing portion 50 configure a main portion of a peripheral portion of the dividing portion 50. The inner end 52 is connected to an inner fabric portion 43 of an airbag 40 by a first joining portion 54. The outer end 53 is connected to an outer fabric portion 44 of the airbag 40 by a first joining portion 55. This feature is also similar to the first embodiment. See FIG. 5.

In the fifteenth embodiment, the inner end 52 of the dividing portion 50 is connected to the inner fabric portion 43 by an auxiliary first joining portion 88 in addition to the first joining portion 54. As shown in FIG. 27, in an airbag module AM in which the airbag 40 is in a non-inflated and deployed state, the auxiliary first joining portion 88 is positioned at an intermediate portion in a vertical direction (up and down direction) of the airbag 40. Further, the auxiliary first joining portion 88 is curved so as to bulge toward a pressure regulator valve 70.

The auxiliary first joining portion 88 restrains deployment of the inner end 52 at a location inward in a lateral direction (vehicle widthwise direction) of the first joining portion 54 to the inner fabric portion 43 of the airbag 40 when the dividing portion 50 is tensed due to the inflation of the upstream inflation portion 47.

Although not shown, the outer end 53 of the dividing portion 50 is also connected to the outer fabric portion 44 by the auxiliary first joining portion 88 in addition to the first joining portion 55.

A time changing apparatus that changes the opening time of the pressure regulator valve 70 to a time different from the opening time solely dependent on the pressure regulator valve 70 upon the occupant restraint by the upstream inflation portion 47 is configured by the auxiliary first joining portions 88.

The configurations other than the above are similar to the first embodiment. Therefore, elements identical to the first embodiment are given the same reference numerals, and redundant descriptions are omitted.

In the fifteenth embodiment configured as above, before when the occupant is restrained upon the inflation of the upstream inflation portion 47, tension is applied on the dividing portion 50 in a vertical direction (up and down direction) and in a lateral direction (vehicle widthwise direction), whereby the dividing portion 50 acts to shift to a tensed state.

If the dividing portion 50 has a sufficiently long dimension in the vertical direction compared to in the lateral direction, in the dividing portion 50, stronger tension is more easily applied to the short direction (lateral direction) than in the long direction (vertical direction).

On the other hand, the dimension L1 of the dividing portion 50 in the vertical direction and the dimension L2 thereof in the lateral direction are determined by an outer shape of the dividing portion 50. The outer shape of the dividing portion 50 is determined by the first joining portions 54, 55 when at least the main portion of the peripheral portion of the dividing portion 50 is connected to the fabric portions 43, 44 of the airbag 40 only by the first joining portions 54, 55.

Further, in the fifteenth embodiment in which the auxiliary first joining portions 88 are provided, a part of the peripheral portion of the dividing portion 50 is connected to the fabric portions 43, 44 of the airbag 40 at at a location more inward in the lateral direction (vehicle widthwise direction) than the first joining portions 54, 55 when the dividing portion comes to be in the tensed state. Therefore, as shown in FIG. 28, the dimension L2 of the dividing portion 50 in the lateral direction is shorter than that in the case where the auxiliary first joining portions 88 are not provided. Therefore, stronger tension tends to be applied in the lateral direction than in the vertical direction on the dividing portion 50.

The opening 65 is closed by being pulled more strongly toward a closing direction (lateral direction) than in an opening direction (vertical direction). The valve body portions 71, 72 are pressed by the inflation gas in the upstream inflation portion 47 to contact each other.

As above, by the pressure regulator valve 70 closing, the flow of the inflation gas from the upstream inflation portion 47 to the downstream inflation portion 48 is restricted, and only the internal pressure of the upstream inflation portion 47 is increased.

On the other hand, when the airbag 40 is pressed against the occupant by the impact, the occupant primarily is restrained by the upstream inflation portion 47.

At this time, the upstream inflation portion 47 of the inflation portion 46 is pressed by the external force applied due to the occupant restraint and is deformed. Accompanying this, the tension that has been applied strongly in the lateral direction on the dividing portion 50 reduces. A difference in the tension between in the vertical direction and the lateral direction becomes smaller, the valve body portions 71, 72 are bent through the dividing portion 50, and the valve body portions 71, 72 separate from each other.

However, the degree of reduction of the tension in the lateral direction is smaller than that in the case where the auxiliary first joining portions 88 are not provided. Accompanying this, the difference in the tension between in the vertical direction and the lateral direction is larger than that in the case where the auxiliary first joining portions 88 are not provided. Therefore, it is more difficult for the valve body portions 71, 72 to open, and the opening time of the pressure regulator valve 70 is more delayed in comparison to the case where the auxiliary first joining portions 88 are not provided. Accompanying this, the outflow starting time of the inflation gas from the upstream inflation portion 47 to the downstream inflation portion 48 is delayed.

By the opening of the pressure regulator valve 70, the inflation gas in the upstream inflation portion 47 flows out to the downstream inflation portion 48 through the opening 65, the internal pressure in the upstream inflation portion 47 reduces, and an internal pressure of the downstream inflation portion 48 increases. The downstream inflation portion 48 is deployed and inflated, and the inflation portion 46 restrains the occupant by the downstream inflation portion 48 as well, in addition to the upstream inflation portion 47.

Thus, the fifteenth embodiment achieves advantages as follows in addition to the advantages of (1) and (2) as above.

(14) The auxiliary first joining portions 88 are provided, which restrains a part of an operation of the dividing portion 50 with respect to the airbag 40 at the inner side in the lateral direction (vehicle widthwise direction) more than the first joining portions 54, 55 when the dividing portion 50 comes to be in the tensed. The auxiliary first joining portions 88 are used as the time changing apparatus.

Therefore, the valve body portions 71, 72 are configured not to open so easily, and the opening time of the pressure regulator valve 70 can be more delayed in comparison to the case where the auxiliary first joining portions 88 are not provided.

Modifications of the Fifteenth Embodiment

The fifteenth embodiment may be modified as follows.

The auxiliary first joining portions 88 may be provided integrally to the first joining portions 54, 55. In this case, the auxiliary first joining portions 88 are formed continuously to the first joining portions 54, 55. In this case, the first joining portions 54, 55 have a configuration in which portions surrounded by a frame of a one-dot chain line in FIG. 27, that is, portions positioned between opposite ends of the auxiliary first joining portions 88 are omitted.

The fifteenth embodiment may be implemented by a side airbag apparatus having a plurality of dividing portions 50 in the inflation portion 46. In this case, the auxiliary first joining portions 88 are provided in at least one dividing portion 50.

Sixteenth Embodiment

Figure 29:
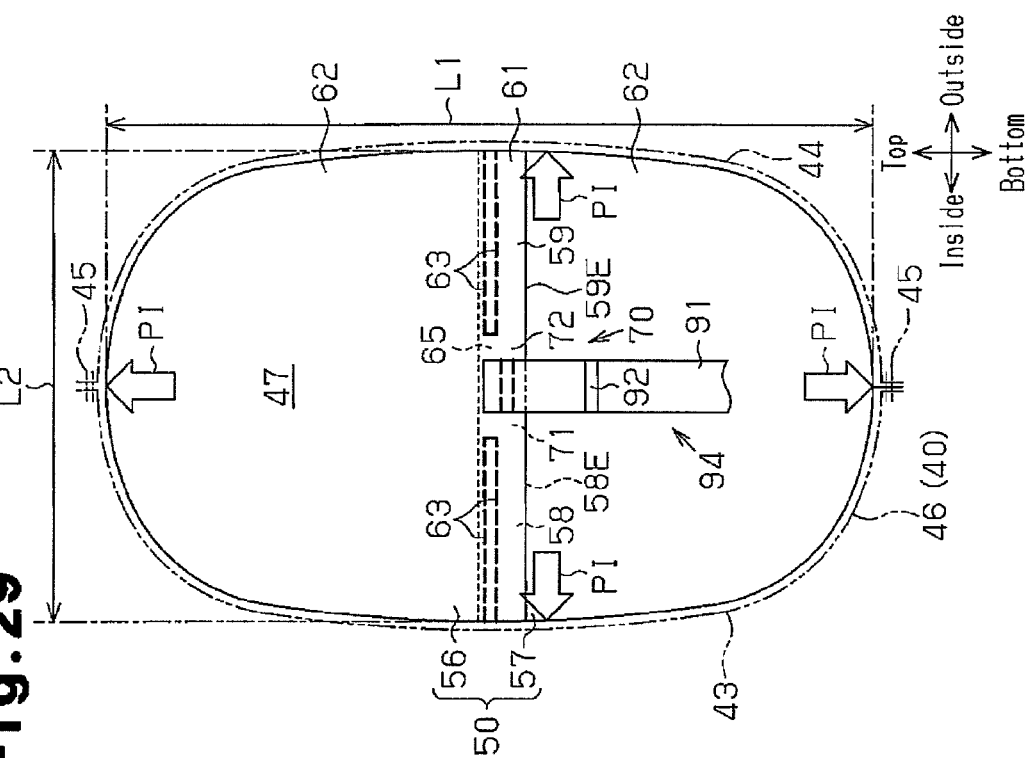
FIG. 29 is a partial rear view showing a state in which a dividing portion is tensed in a side airbag apparatus of a sixteenth embodiment.
Figure 30:
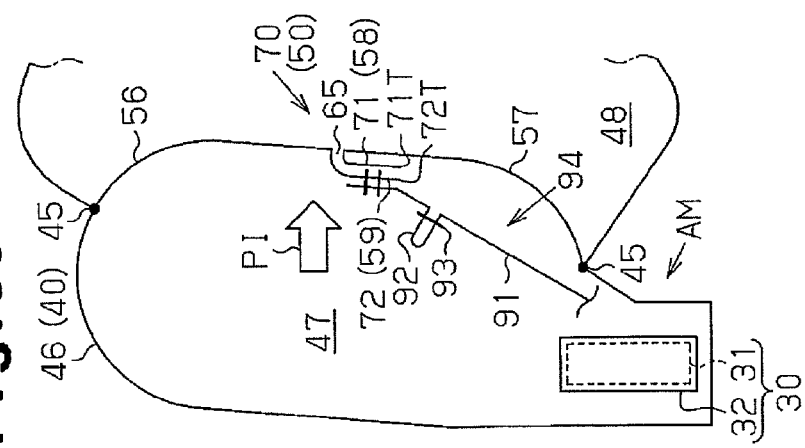
FIG. 30 is a cross-sectional side view schematically showing an internal structure of an airbag module of the sixteenth embodiment.

Next, a side airbag apparatus of the sixteenth embodiment will be described with reference to FIG. 29 and FIG. 30.

Similar to the first embodiment, the sixteenth embodiment is on the premise of having the following configuration.

A part of a wall portion of an inflation portion 46 is configured by a dividing portion 50.

The dividing portion 50 is configured by a pair of fabric portions (upper fabric portion 56, lower fabric portion 57) aligned in a vertical direction (up and down direction).

Parts of the two fabric portions 56, 57 are configured as a pair of overlap portions 61 configured by overlapping ends 58, 59 of the two fabric portions 56, 57 in a band shape extending in a lateral direction (vehicle widthwise direction).

The overlap portions 61 are connected by second joining portions 63 at boundary portions with a non-overlap portion 62 that is not overlapped, and are folded upward or downward with the second joining portions 63 as a fulcrum point (downward in the sixteenth embodiment).

An opening 65 is formed by the connection of the overlap portions 61 by the second joining portions 63 being cancelled in the dividing portion 50.

Portions of the two overlap portions 61 corresponding to the opening 65 are configured as the valve body portions 71, 72. The valve body portions 71, 72 are formed capable of displacing (inverted) to an outer side (toward the downstream inflation portion 48) of the upstream inflation portion 47 through the opening 65 upon opening of a pressure regulator valve 70.

In addition to the configuration on the premise as above, in the sixteenth embodiment, a restricting portion 94 is provided as a time changing apparatus. The restricting portion 94 is for restricting one of the valve body portions 71, 72 positioned on an upstream side (valve body portion 72) from being displaced to the outer side (downstream inflation portion 48) of the upstream inflation portion 47 until a midpoint of an occupant restraint by the upstream inflation portion 47. More specifically, a belt 91 is provided in the upstream inflation portion 47. One end of the belt 91 (each of upper ends in FIG. 29 and FIG. 30) is connected to the valve body portion 72 by means such as sewing. The other end of the belt 91 (each of lower ends in FIG. 29 and FIG. 30) is connected to a voluntary position of the wall portion of the upstream inflation portion 47 by means such as sewing. A part of the belt 91 is configured as a redundant portion 92 that comes to be in a state of being slack in the upstream inflation portion 47 before inflation of the upstream inflation portion 47. Further, a retaining portion 93 for retaining the redundant portion 92 in the slack state, and cancelling the retaining at the inflation of the upstream inflation portion 47 is provided.

The retaining portion 93 for example retains the redundant portion 92 in the slack state by connecting the redundant portion 92 folded in half at a boundary portion with the remainder of the belt 91. The retaining portion 93 connects the redundant portion 92 at a lower strength than other joining portions, for example a peripheral joining portion 45, first joining portions 54, 55, second joining portions 63 and the like. The retaining portion 93 is configured to be more prone to being broken than the other joining portions. The retaining portion 93 is formed by sewing the redundant portion 92 by using a sewing thread. Then, the restricting portion 94 is configured by the belt 91 having the redundant portion 92 and the retaining portion 93.

The configurations other than the above are similar to the first embodiment. Therefore, elements identical to the first embodiment are given the same reference numerals, and redundant descriptions are omitted.

In the sixteenth embodiment configured as above, the pair of overlap portions 61 is positioned inside the upstream inflation portion 47 before the occupant restraint by the upstream inflation portion 47. One of the two overlap portions 61 is positioned on the other upstream side (or downstream side). The one positioned on the downstream side (right side of FIG. 30) is folded downward, whereas the one positioned on the upstream side (left side in FIG. 30) is substantially not folded. The same applies to the valve body portion 71, 72 formed by the parts of the respective overlap portions 61. That is, the valve body portion 71 positioned on the downstream side is folded downward, and the valve body portion 72 positioned on the upstream side is substantially not folded.

The valve body portion 72 positioned on the upstream side can move at a greater degree than the valve body portion 71 positioned on the downstream side. This is because in the valve body portion 71 positioned on the downstream side, the state of being bent is a resistance of a displacement of the valve body portion 71.

In the opening of the pressure regulator valve 70, the two valve body portions 71, 72 are displaced to the outer side (toward the downstream inflation portion 48) of the upstream inflation portion 47 through the opening 65, whereas the valve body portion 72 positioned on the upstream side is more likely to be displaced to the downstream side than the valve body portion 71 positioned on the downstream side. In other words, a difference is generated in the likelihood of being displaced between the valve body portion 72 positioned on the upstream side and the valve body portion 71 positioned on the downstream side.

In this respect, by the restricting portion 94 being provided, the valve body portion 72 positioned on the upstream side within the two valve body portions 71, 72 is restricted from being displaced to the outer side (toward the downstream inflation portion 48) of the upstream inflation portion 47 until the midpoint of the occupant restraint by the upstream inflation portion 47. That is, the belt 91 in which the redundant portion 92 is retained in the slack state is tensed by the retaining portion 93, and the displacement of the valve body portion 72 to the downstream side is restricted. Accordingly, due to the restriction, a time at which the valve body portion 72 positioned on the upstream side is displaced is delayed. The difference in the likelihood of being displaced between the valve body portion 72 positioned on the upstream side and the valve body portion 71 positioned on the downstream side is made smaller.

The retaining portion 93 is broken during when the upstream inflation portion 47 is inflated and restrains the occupant. The retaining of the redundant portion 92 by the retaining portion 93 is cancelled by this breaking, the redundant portion 92 is extended, and the length of the belt 91 is elongated. The valve body portion 72 is pushed out to the downstream inflation portion 48 through the opening 65 together with the valve body portion 71 and is thereby inverted, and the pressure regulator valve 70 is opened.

Thus, the sixteenth embodiment achieves advantages as follows in addition to the advantages of (1) and (2) as above.

(15) The restricting portion 94 that restricts the valve body portion 72 positioned on the upstream side within the two valve body portions 71, 72 from displacing toward the downstream inflation portion 48 on the outer side from the upstream inflation portion 47 until the midpoint of the occupant restraint by the upstream inflation portion 47 is provided, and this is used as the time changing apparatus.

Thus, due to the restriction by the restricting portion 94, the time at which the valve body portion 72 positioned on the upstream side is displaced to the outer side (toward downstream inflation portion 48) of the upstream inflation portion 47 upon the opening of the pressure regulator valve 70 can be delayed. The difference in the likelihood of being displaced between the two valve body portions 71, 72 can be made smaller, the opening time of the pressure regulator valve 70 can be delayed, and the time when the inflation gas starts to flow out from the upstream inflation portion 47 can be delayed.

Seventeenth Embodiment

Figure 31:
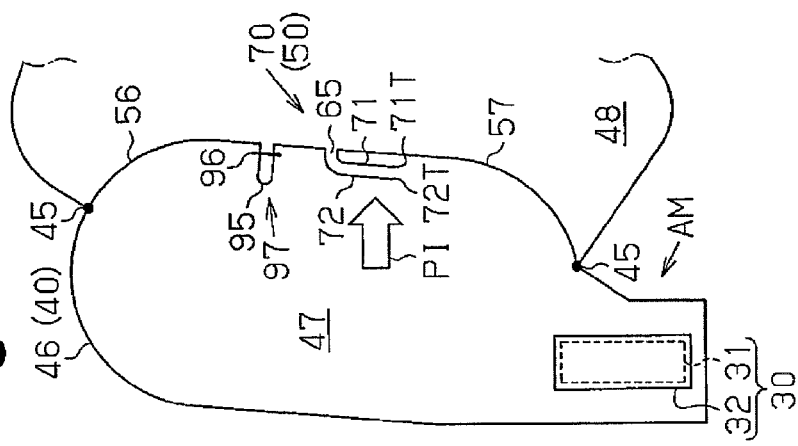
FIG. 31 is a cross-sectional side view schematically showing an internal structure of an airbag module in a side airbag apparatus of a seventeenth embodiment.

Next, a side airbag apparatus of the seventeenth embodiment will be described with reference to FIG. 31.

The seventeenth embodiment differs from the sixteenth embodiment in a configuration of a restricting portion that restricts displacement of a valve body portion 72. Specifically, a part of an upper fabric portion 56 of a dividing portion 50 is configured as a redundant portion 95 that is in a state of being slack within an upstream inflation portion 47 before inflation of the upstream inflation portion 47. Further, a retaining portion 96 for retaining the redundant portion 95 in the slack state and cancelling the retaining at the inflation of the upstream inflation portion 47 is provided. The retaining portion 96 retains the redundant portion 95 in the slack state for example by connecting the redundant portion 95 folded in half at a boundary portion with a remaining portion of the upper fabric portion 56. The retaining portion 96 connects the redundant portion 95 at a lower strength than other joining portions, for example a peripheral joining portion 45, first joining portions 54, 55, second joining portions 63 and the like. The retaining portion 96 is configured to be more prone to being broken than the other joining portions. The retaining portion 96 is formed by sewing the redundant portion 95 by using a sewing thread.

Further, a restricting portion 97 is configured by the redundant portion 95 and the retaining portion 96. Different from the sixteenth embodiment, no belt 91 is used.

The configurations other than the above are similar to the sixteenth embodiment. Therefore, elements identical to the sixteenth embodiment are given the same reference numerals, and redundant descriptions are omitted.

In the seventeenth embodiment configured as above, the redundant portion 95 is retained in the slack state by the retaining portion 96 until a midpoint of an occupant restraint by the upstream inflation portion 47. Although the upper fabric portion 56 and a lower fabric portion 57 of the dividing portion 50 are caused to be tensed in a spherical shape bulging toward a downstream inflation portion 48, the displacement of the upper fabric portion 56 is restricted by the redundant portion 95. Accompanying this, the valve body portion 72 is restricted from being displaced to an outer side of the upstream inflation portion 47 (toward the downstream inflation portion 48). Therefore restriction, the time when the valve body portion 72 on the upstream side is displaced to the outer side of the upstream inflation portion 47 (toward the downstream inflation portion 48) is delayed. The difference in the likelihood of being displaced between the valve body portion 72 on the upstream side and the valve body portion 71 on the downstream side is made smaller.

The retaining portion 96 is broken during when the occupant is restrained by the upstream inflation portion 47 being inflated. By this breaking, the retaining of the redundant portion 95 by the retaining portion 96 is cancelled. The redundant portion 95 is stretched, and due to that elongation, the upper fabric portion 56 is caused to be tensed further in the spherical shape bulging to the outer side of the upstream inflation portion 47 (toward the downstream inflation portion 48). The valve body portion 72 is pushed out (inverted) to a downstream inflation portion 48 through an opening 65 together with a valve body portion 71, and a pressure regulator valve 70 thereby opens.

Thus, according to the seventeenth embodiment, although the manner of the displacement restriction of the valve body portion 72 by the restricting portion 97 is different, advantages similar to (1), (2), and (15) as above are achieved.

Eighteenth Embodiment

Figure 32:
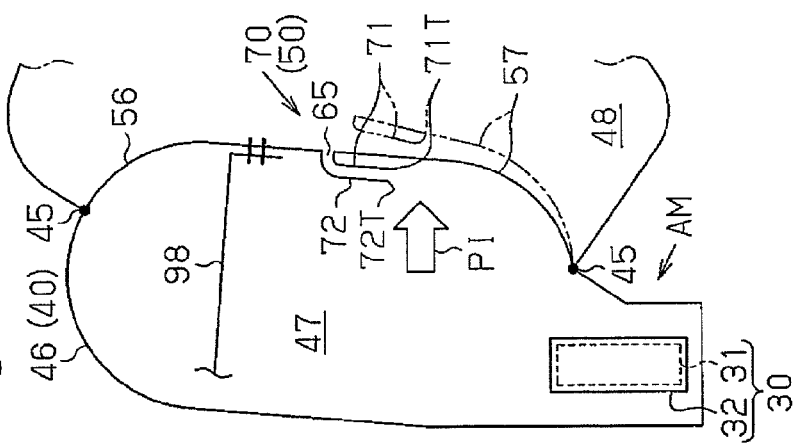
FIG. 32 is a cross-sectional side view schematically showing an internal structure of an airbag module in a side airbag apparatus of an eighteenth embodiment.
Figure 33:
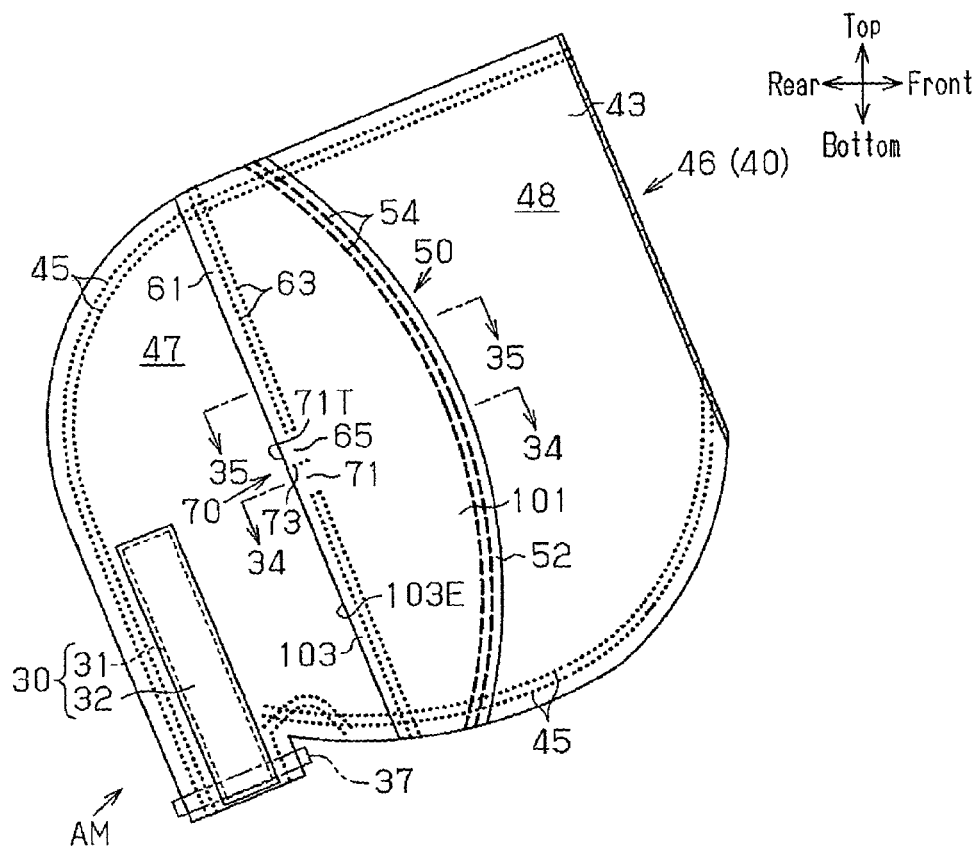
FIG. 33 is a cross-sectional side view of a side airbag apparatus of a nineteenth embodiment, showing an internal structure of an airbag module having an airbag in a non-inflated and deployed state.
Figure 34:
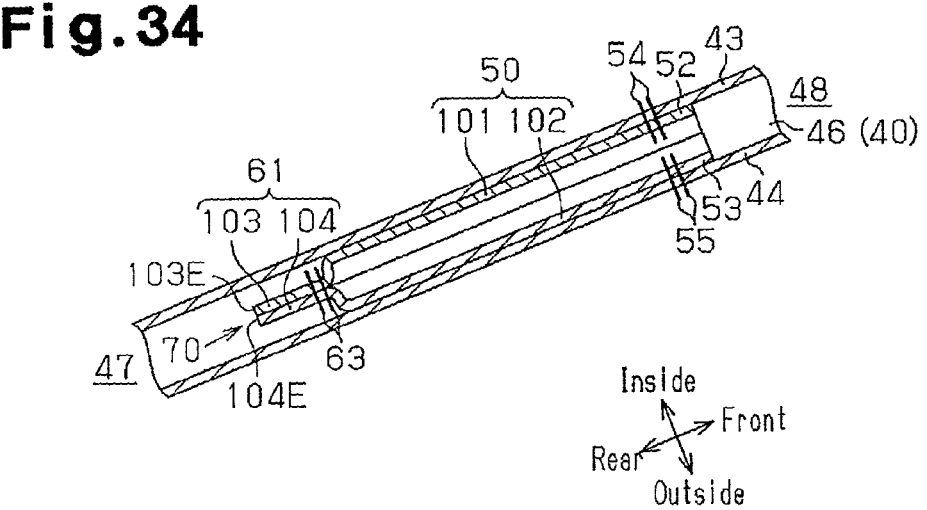
FIG. 34 is a partial cross-sectional view showing a cross-sectional structure of a dividing portion taken along line 34-34 in FIG. 33.
Figure 35:
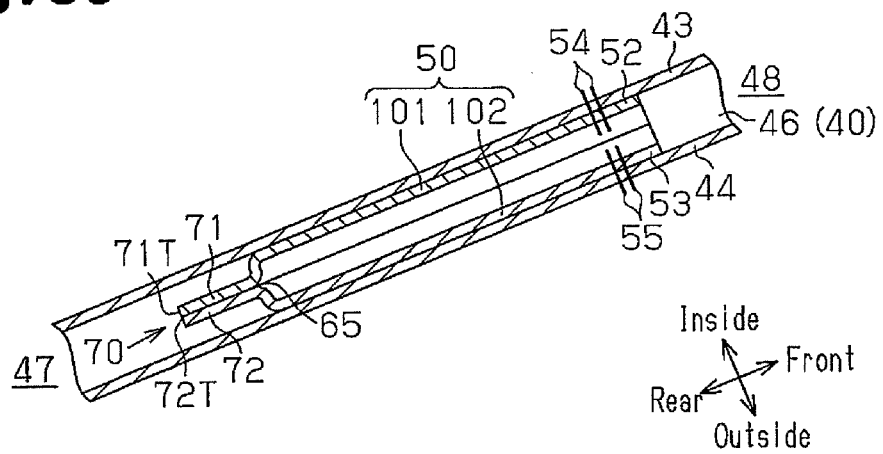
FIG. 35 is a partial cross-sectional view showing a cross-sectional structure of the dividing portion taken along line 35-35 in FIG. 33.
Figure 36:
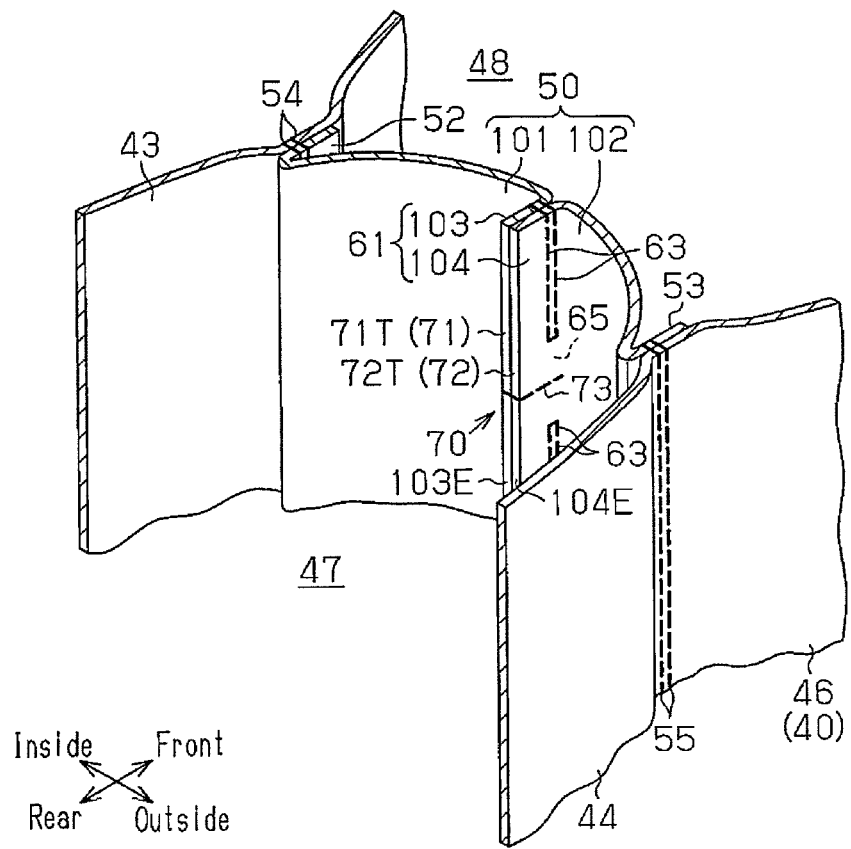
FIG. 36 is a partial perspective view showing a pressure regulator valve when the dividing portion is tensed in the nineteenth embodiment.

Next, a side airbag apparatus of the eighteenth embodiment will be described with reference to FIG. 32.

Among side airbag apparatuses, there are ones in which an upper fabric portion 56 and a lower fabric portion 57 configuring a dividing portion 50 are tensed to bulge toward a downstream inflation portion 48 at a same degree. In such cases, an opening 65 does not open easily due to the manners of tension of the upper fabric portion 56 and the lower fabric portion 57 being at the same degree, and there is a risk that valve body portions 71, 72 are not pushed out through the opening 65 easily (are not inverted easily).

Thus, in the eighteenth embodiment, a restricting portion is provided as a time changing apparatus. The restricting portion is for restricting one of the upper fabric portion 56 and the lower fabric portion 57 (which is herein the upper fabric portion 56) from displacing to the outer side of the upstream inflation portion 47 (toward the downstream inflation portion 48) from the midpoint of the occupant restraint. The belt 98 is used as a restricting portion and is arranged in the upstream inflation portion 47. One end of the belt 98 (right end in FIG. 32) is connected to the upper fabric portion 56 by means such as sewing. The other end of the belt 98 (left end in FIG. 32) is not shown but is connected to a portion of the wall portion of the upstream inflation portion 47 that is on an upstream side (position closer to the inflator 31) of the dividing portion 50 by means such as sewing.

The configurations other than the above are similar to the first embodiment. Therefore, elements identical to the first embodiment are given the same reference numerals, and redundant descriptions are omitted.

In the eighteenth embodiment configured as above, the belt 98 comes to be in the tensed state in the midpoint of the occupant restraint by the upstream inflation portion 47. By the belt 98, the upper fabric portion 56 is restricted from being tensed so as to bulge toward the downstream inflation portion 48 (being displaced to the outer side of the upstream inflation portion 47). No such restriction is performed for the lower fabric portion 57. The lower fabric portion 57 is tensed to bulge more largely toward the downstream inflation portion 48 than the upper fabric portion 56 as shown by a broken line in which a long dash alternates with a pair of short dashes in FIG. 32. Accordingly, since the manners of tension differ between the upper fabric portion 56 and the lower fabric portion 57, the opening 65 is easily opened. The two valve body portions 71, 72 are more easily pushed out (inverted) through the opening 65, and an opening time of a pressure regulator valve 70 becomes earlier compared to those in which the belt 98 (restricting portion) is not provided.

Thus, the eighteenth embodiment achieves advantages as follows in addition to the advantages of (1) and (2) as above.

(16) The restricting portion (belt 98) for restricting one of the upper fabric portion 56 and the lower fabric portion 57 configuring the dividing portion 50 from being displaced to the outer side of the upstream inflation portion 47 (toward the downstream inflation portion 48) from the midpoint of the occupant restraint by the upstream inflation portion 47 is provided, and is configured as the time changing apparatus.

Therefore, by the restriction by the belt 98, the opening 65 is made easier to open, the opening time of the pressure regulator valve 70 is made earlier, and an outflow starting time of the inflation gas can be made earlier.

Nineteenth Embodiment

Next, a side airbag apparatus of the nineteenth embodiment will be described with reference to FIG. 33 to FIG. 40.

Figure 37:
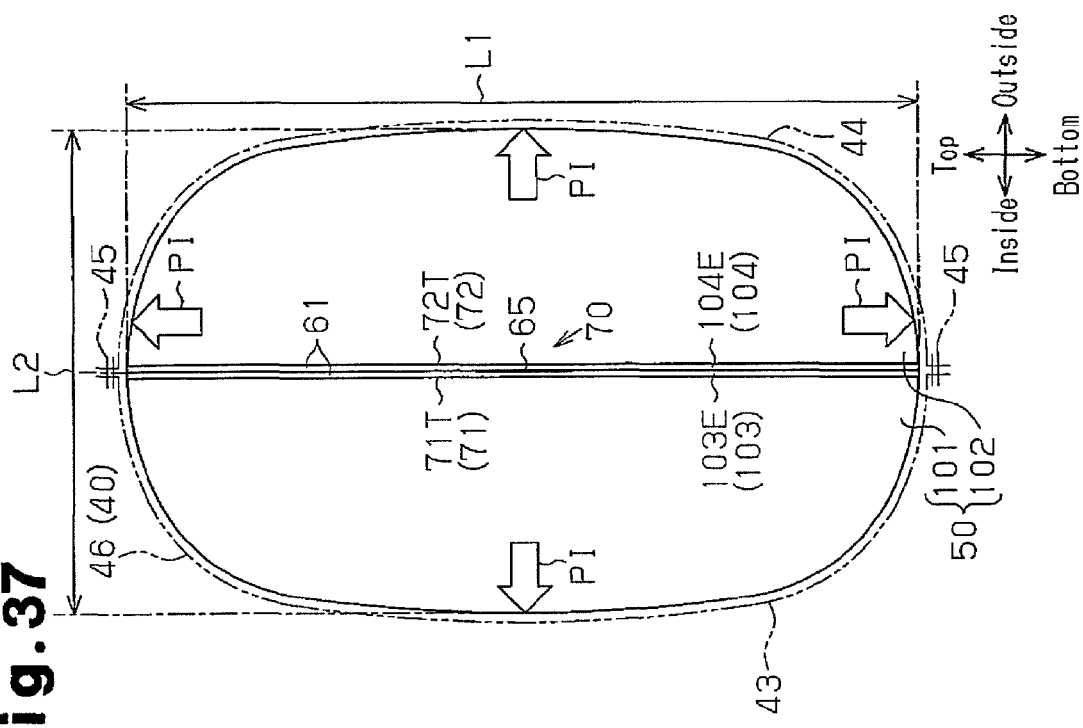
FIG. 37 is a rear view showing a state in which the dividing portion of the nineteenth embodiment is tensed.

As shown in FIG. 37, a dividing portion 50 in which a dimension L1 in a vertical direction is longer than a dimension L2 in a lateral direction (left and right direction in FIG. 37) when coming to be in a tensed state of the nineteenth embodiment is configured by two fabric portions (inner fabric portion 101, outer fabric portion 102) arranged in the lateral direction. As shown in FIG. 33 to FIG. 36, in the fabric portions 101, 102, ends 103, 104 thereof are overlapped in a narrow band shape in the vertical direction in a state in which end edges 103E, 104E of the ends 103, 104 are made to match. The fabric portions 101, 102 are connected to each other with a band-shaped overlap portion 61 by second joining portions 63 extending linearly in the vertical direction at a boundary portion with other portion (non-overlap portion). The second joining portions 63 are separated at a certain distance from the end edges 103E, 104E of the two fabric portions 101, 102.

A pressure regulator valve 70 is provided in the dividing portion 50. More specifically, the second joining portions 63 are released of their connection at parts thereof (center portion in the vertical direction in the nineteenth embodiment). At the center portion in the vertical direction, the second joining portions 63 that connect the fabric portions 101, 102 are not provided. The portions where the connection has been cancelled configure slit-shaped openings 65 that communicate the upstream inflation portion 47 and the downstream inflation portion 48.

In the overlap portion 61, portions corresponding to the opening 65 (proximal portions, more accurately, portions between the opening 65 and the end edges 103E, 104E) configure a pair of valve body portions 71, 72. The overlap portion 61 having the pair of valve body portions 71, 72 at parts thereof is arranged on the upstream inflation portion 47 before inflation of the inflation portion 46. Further, the opening 65 and the valve body portions 71, 72 are positioned at an intermediate portion of the dividing portion 50 in the vertical direction.

Further, the band-shaped overlap portion 61 is connected (sewn together) to the fabric portions 43, 44 of an airbag 40 at opposite ends in a direction along the second joining portions 63, that is, at an upper end and a lower end by the peripheral joining portion 45 described above, similar to the dividing portion 50 in the state of being folded in half. Different from the first embodiment, the overlap portion 61 is not folded to a non-overlap portion side.

Further, as a time changing apparatus that changes the opening time of the pressure regulator valve 70 upon the occupant restraint by the upstream inflation portion 47 to a time that is different from the opening time solely due to the pressure regulator valve 70, a retaining portion that retains the pressure regulator valve 70 in a closed state, and that cancels the retaining from the midpoint of the occupant restraint by the upstream inflation portion 47 is provided. The retaining portion is configured by a tear seam 73 that connects the valve body portions 71, 72 in the state of being caused to contact each other, and that is broken from the midpoint of the occupant restraint, similar to the first embodiment.

The configurations other than the above are similar to the first embodiment. Therefore, elements identical to the first embodiment are given the same reference numerals, and redundant descriptions are omitted.

In the nineteenth embodiment configured as above, when a motor vehicle receives impact by a side collision and the like and the inflation gas is supplied from an inflator 31, the upstream inflation portion 47 starts to inflate.

In an inflation portion 46, the dividing portion 50 in a state of being folded in half is arranged in a state of positioning the second joining portions 63 on an upstream side than an inner end 52 and an outer end 53. Further, the dividing portion 50 is connected to the corresponding fabric portions 43, 44 of the airbag 40 by first joining portions 54, 55 respectively at the inner end 52 and the outer end 53. Further, the dividing portion 50 is connected to the fabric portions 43, 44 by the peripheral joining portions 45 respectively at opposite ends (upper end and lower end) in a direction along the second joining portions 63 (see FIG. 33). Therefore, when the inflation of the upstream inflation portion 47 is started as above, the dividing portion 50 in the state of being folded in half is pulled. Tension in a direction along the second joining portions 63 (vertical direction: up and down direction) and in an orthogonally intersecting direction (lateral direction: vehicle widthwise direction) is applied to the dividing portion 50 (see FIG. 37). By this tension, the dividing portion 50 comes to be in the tensed state (see FIG. 36).

In the nineteenth embodiment, in the dividing portion 50 satisfying a relationship of L1>L2, the opening 65 is provided to extend in the vertical direction (up and down direction) (see FIG. 37). On the other hand, in the dividing portion 50, stronger tension tends to be applied in a direction with a smaller dimension (lateral direction: vehicle widthwise direction) than in a direction with a larger dimension (vertical direction: up and down direction). Therefore, by the above magnitude relationship of the tension, there is a risk that the opening 65 might be opened.

Figure 38:
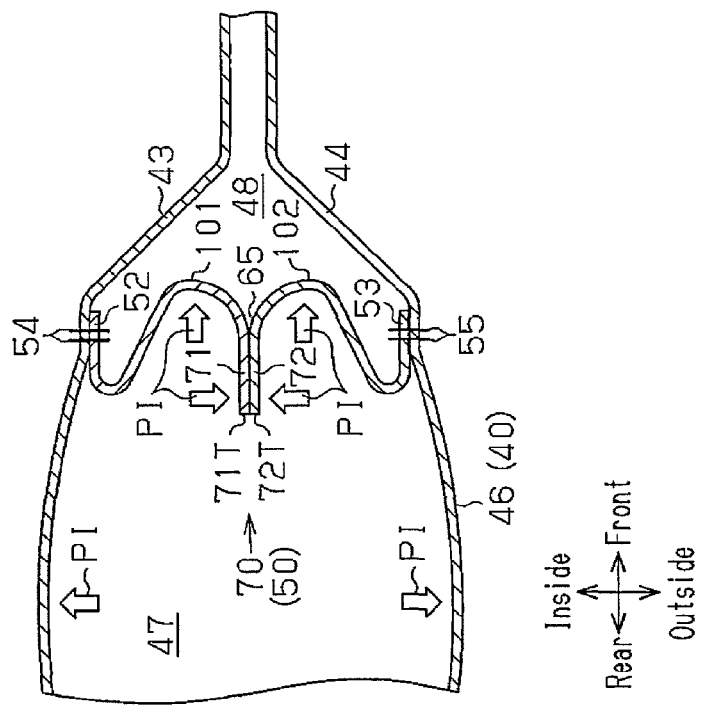
FIG. 38 is a partial cross-sectional plan view schematically showing how the pressure regulator valve closes in an upstream inflation portion during inflation in the nineteenth embodiment.

However, as shown in FIG. 38, as to the overlap portions 61 including the valve body portions 71, 72 positioned on the upstream inflation portion 47, the internal pressure PI of the upstream inflation portion 47 that rises due to the supply of the inflation gas is applied from both sides in an overlapping direction of the overlap portions 61 (both sides in the vehicle widthwise direction: up and down direction of FIG. 38). The valve body portions 71, 72 come to be in a self-sealed state of making tight contact with each other. The dividing portion 50 completely divides the inflation portion 46 into the upstream inflation portion 47 and the downstream inflation portion 48 except at the portion of the pressure regulator valve 70. Therefore, the inflation gas in the upstream inflation portion 47 is restricted from flowing out to the downstream inflation portion 48 from between the two valve body portions 71, 72 and through the opening 65, as well as through other portions.

Figure 39:
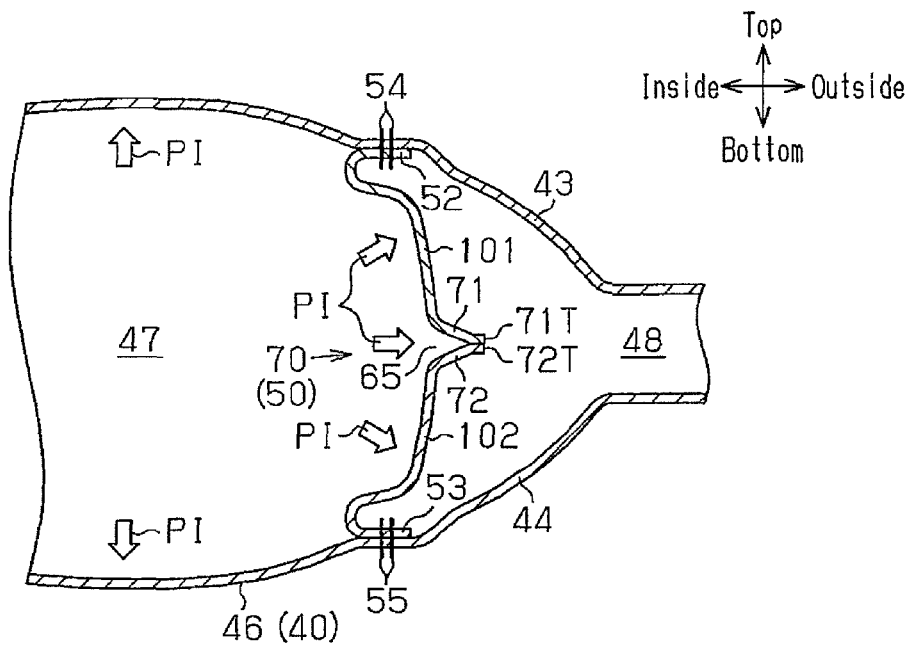
FIG. 39 is a partial cross-sectional plan view schematically showing how the valve body portions are inverted and closed in a downstream inflation portion in the nineteenth embodiment.

When the inflation of the upstream inflation portion 47 progresses due to the supply of the inflation gas, as shown in FIG. 39, the overlap portions 61 are pushed out toward the downstream inflation portion 48 through the opening 65 (valve body portion 71, 72 are inverted) only at the valve body portion 71, 72 by the increased internal pressure PI of the upstream inflation portion 47. At this time, even if the opening 65 is pulled and expanded in the lateral direction (vehicle widthwise direction) by the dividing portion 50 being tensed, the valve body portions 71, 72 act to maintain the closed state by making contact at their distal ends 71T, 72T. That is, by the dividing portion 50 being tensed, a force acts on the opening 65 and the valve body portions 71, 72 to open the same. This force is the largest at the opening 65, becomes smaller as the distance from the opening 65 increases, and is the minimum at the distal ends 71T, 72T of the valve body portions 71, 72. As a result, the pressure regulator valve 70 maintains the closed state, and the inflation gas in the upstream inflation portion 47 is still restricted from flowing out to the downstream inflation portion 48 through the opening 65 and between the valve body portions 71, 72.

Figure 40:
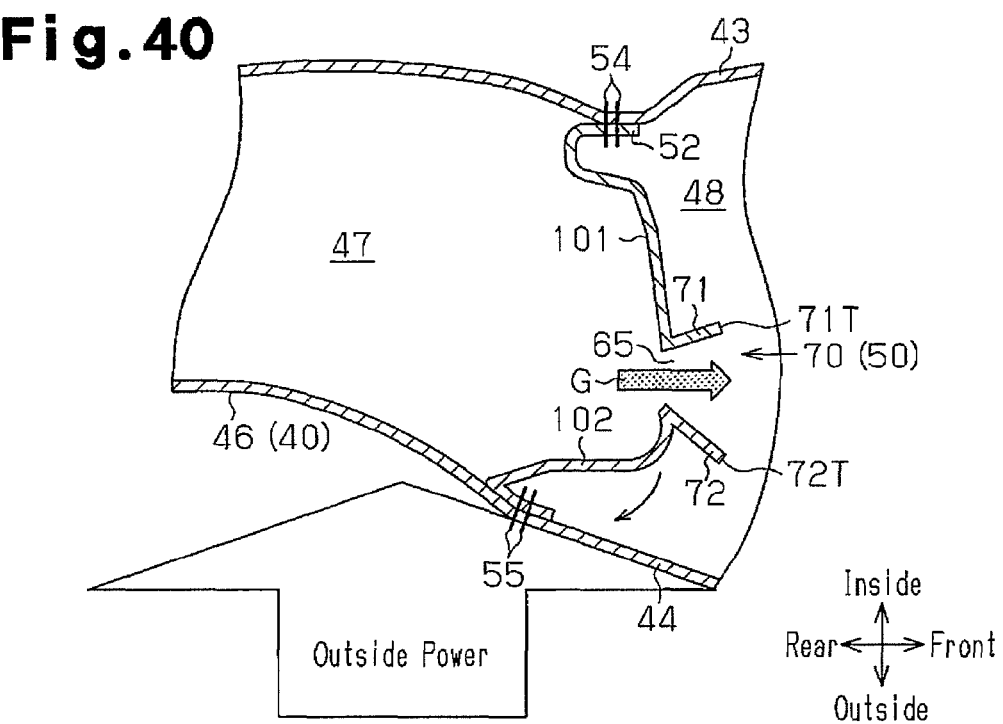
FIG. 40 is a partial cross-sectional plan view schematically showing how the pressure regulator valve opens in the downstream inflation portion by an external force generated by occupant restraint in the nineteenth embodiment.

Further, as shown in FIG. 40, upon the restraint of the occupant, when an external force by the entering body side portion 11 is applied and the upstream inflation portion 47 is pressed (collapsed) and deformed from the outer side, tension applied to the dividing portion 50 reduces. By this reduction, the tension applied to the opening 65 is decreased. Further, accompanying the deformation of the upstream inflation portion 47, with the internal pressure of the upstream inflation portion 47 further increasing, the dividing portion 50 is pressed toward the downstream inflation portion 48, and the tension applied to the dividing portion 50 changes.

Under such a circumstance, the opening 65 is opened by the increase in the internal pressure of the upstream inflation portion 47. Further, the valve body portion 71 and the valve body portion 72 are displaced to the sides separating away from each other (outer side and inner side). By these deformations, when the distal ends 71T, 72T are separated from each other, and the pressure regulator valve 70 comes to be in an opened state, the inflation gas G in the upstream inflation portion 47 starts to flow out to the downstream inflation portion 48 through the opening 65 and between the two valve body portions 71, 72 as shown by an arrow in FIG. 40.

Incidentally, upon the occupant restraint by the upstream inflation portion 47, the pressure regulator valve 70 is opened as above, however, the time when it is opened is changed by the time changing apparatus.

That is, in the period before the occupant restraint by the upstream inflation portion 47 and in the period within the occupant restraint until the midpoint of the occupant restraint, the force that acts to retain the valve body portions 71, 72 in the state of contacting each other by the tear seam 73 overwhelms the force that acts to separate the valve body portions 71, 72. Therefore, the tear seam 73 is not broken, and the connection by the tear seam 73 is maintained. The two valve body portions 71, 72 are retained in the state of contacting each other, and the pressure regulator valve 70 is retained in the closed state.

In contrast, from the midpoint of the occupant restraint by the upstream inflation portion 47, the force that works to separate the two valve body portions 71, 72 overwhelms the force that acts to retain the valve body portions 71, 72 in the state of contacting each other by the tear seam 73. The tear seam 73 is broken, the connection (retaining) by the tear seam 73 is cancelled, and the force that works to keep the two valve body portions 71, 72 in the contacting state disappears. The two valve body portions 71, 72 are thus capable of separating (the pressure regulator valve 70 is capable of opening).

During the occupant restraint by the upstream inflation portion 47, the opening time of the pressure regulator valve 70 is delayed by the period during which the two valve body portions 71, 72 are retained in the state of contacting each other by the tear seam 73. Accompanying this, a time when inflation gas G in the upstream inflation portion 47 starts to flow out to the downstream inflation portion 48 through the opening 65 is delayed.

Thus, the nineteenth embodiment achieves advantages of (1) to (4) as above.

Further, in the nineteenth embodiment, as for the dividing portion 50 satisfying a relationship of L1>L2, tension in the direction along the opening 65 (vertical direction: up and down direction) cannot be expected as much as in the first embodiment in which the opening 65 is provided along the lateral direction (vehicle widthwise direction), since the opening 65 is provided along the vertical direction (up and down direction).

However, the nineteenth embodiment is similar to the first embodiment in that the overlap portions 61 including the valve body portions 71, 72 are arranged on the upstream inflation portion 47 before the inflation of the upstream inflation portion 47. Accordingly, the internal pressure PI of the upstream inflation portion 47 can be applied from both sides in the overlapping direction of the overlap portions 61.

As a result, the valve body portions 71, 72 are caused to make tight contact with each other, and the self-sealed state in which the flow of the inflation gas G between the two valve body portions 71, 72 is restricted is assumed, and the inflation gas G in the upstream inflation portion 47 can be restricted from flowing out to the downstream inflation portion 48.

Twentieth Embodiment

Next, a side airbag apparatus of the twentieth embodiment will be described with reference to FIG. 41 and FIG. 42.

The twentieth embodiment differs from the nineteenth embodiment in a configuration of a pressure regulator valve 70.

Figure 41:
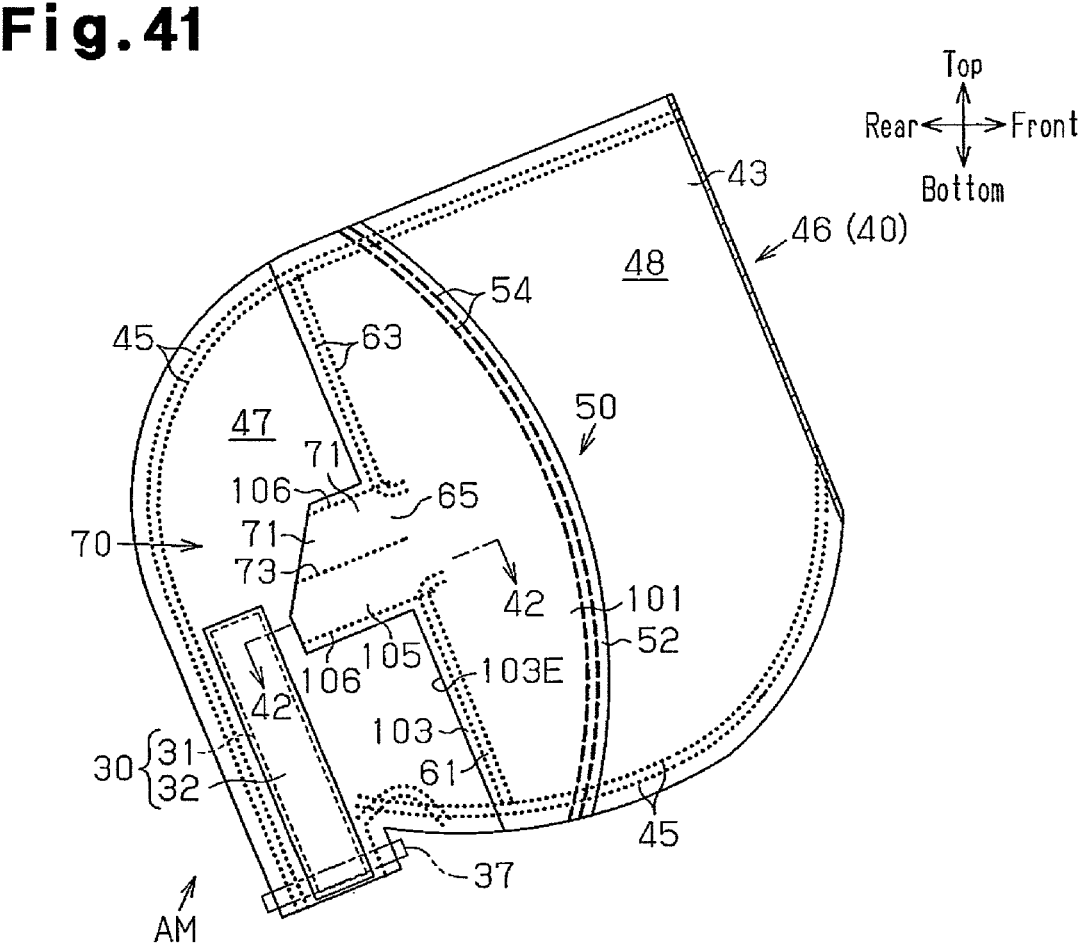
FIG. 41 is a cross-sectional side view of a side airbag apparatus of a twentieth embodiment, showing an internal structure of an airbag module having an airbag in a non-inflated and deployed state.
Figure 42:
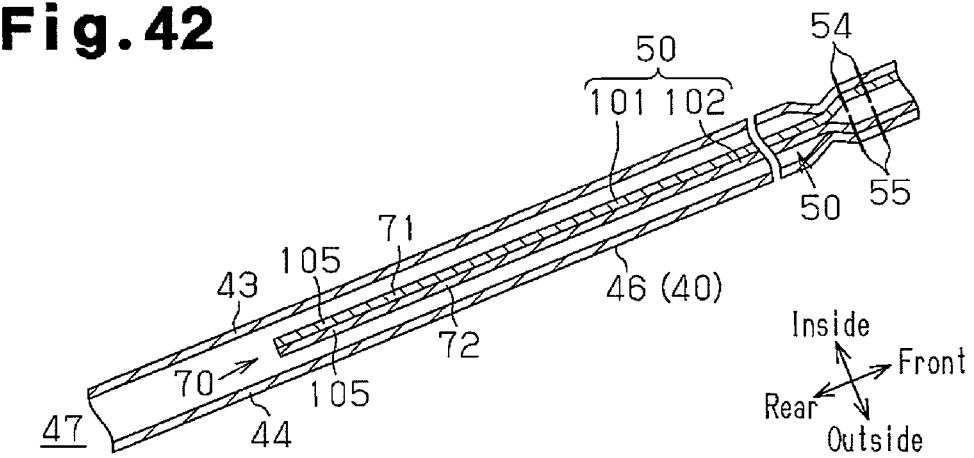
FIG. 42 is a partial cross-sectional view showing a cross-sectional structure of a dividing portion taken along line 42-42 in FIG. 41.

Specifically, in each of overlap portions 61, an extended overlap portion 105 extends from a center portion in a vertical direction (up and down direction) toward an upstream side (left side in FIG. 41). The extended overlap portions 105 are positioned at portions opposing an opening 65, and valve body portions 71, 72 are elongated to the upstream side by the respective extended overlap portions 105. These extended overlap portions 105 are overlapped in an upstream inflation portion 47 similar to the overlap portions 61.

Further, by a tear seam 73 being extended to distal ends of the extended overlap portions 105, the two extended overlap portions 105 are connected by the tear seam 73. The tear seam 73 is elongated by the respective extended overlap portions 105.

Further, the extended overlap portions 105 are connected by a pair of extended joining portions 106 provided at opposite ends (upper end and lower end) in the vertical direction (up and down direction). Each of the extended joining portions 106 extends from an end of a corresponding second joining portion 63 that faces an opening 65 to the upstream side. Each of the extended joining portions 106 is extended to the distal end of the extended overlap portion 105.

The configurations other than the above are similar to the nineteenth embodiment. Therefore, elements identical to the nineteenth embodiment are given the same reference numerals, and redundant descriptions are omitted.

According to the twentieth embodiment configured as above, the two valve body portions 71, 72 are elongated by the extended overlap portions 105 being provided. For the lengthened portions, it is more difficult for the valve body portions 71, 72 to be pushed out to a downstream inflation portion 48 through the opening 65 (more unlikely to be inverted). Further, it is more difficult for the occurrence of the valve body portions 71, 72 being separated from each other after having been inverted (pressure regulator valve 70 being opened) to take place. Therefore, an opening time of the pressure regulator valve 70 is delayed by the two extended overlap portions 105.

Further, by the tear seam 73 being elongated, strength by which the tear seam 73 connects the two valve body portions 71, 72 is increased. Therefore, a time when the tear seam 73 is broken is delayed by the tear seam 73 having been elongated. As a result, the time when the valve body portions 71, 72 are pushed out (inverted) to the downstream inflation portion 48 through the opening 65 and the valve body portions 71, 72 separate from each other (opening time of the pressure regulator valve 70) is further delayed.

Further, since the extended joining portions 106 are provided, the extended overlap portions 105 are more resistant to deformation. Therefore, it is more difficult for the valve body portions 71, 72 to be pushed out from the upstream inflation portion 47 to the downstream inflation portion 48 through the opening 65. The time when the valve body portions 71, 72 separate from each other in the downstream inflation portion 48 (opening time of the pressure regulator valve 70) is delayed even further.

Thus, the twentieth embodiment achieves the advantages of (1) to (4) as above, and has further advantages of further delaying the opening time of the pressure regulator valve 70 in comparison to the nineteenth embodiment.

Twenty-First Embodiment

Next, a side airbag apparatus of the twenty-first embodiment will be described with reference to FIG. 43 and FIG. 44.

In the twenty-first embodiment, an outflow amount changing apparatus that changes an amount of inflation gas flowing out from an upstream inflation portion 47 upon an occupant restraint by the upstream inflation portion 47 to an outflow amount different from an outflow amount in a case where the inflation gas passes through only an opening 65 is provided instead of the time changing apparatus.

Specifically, in the twenty-first embodiment, a dividing portion 50 that divides an inflation portion 46 into the upstream inflation portion 47 and a downstream inflation portion 48 includes an upper fabric portion 56 and a lower fabric portion 57 as aforementioned, and further includes a fabric portion 107 below the lower fabric portion 57. The lower fabric portion 57 and the fabric portion 107 are connected to each other by second joining portions 63 similar to the upper fabric portion 56 and the lower fabric portion 57. Further, an auxiliary opening 108 that communicates the upstream inflation portion 47 and the downstream inflation portion 48 is provided between the lower fabric portion 57 and the fabric portion 107. The auxiliary opening 108 is formed by cancelling the connection by the second joining portions 63, similar to the opening 65. Further, in the lower fabric portion 57 and the fabric portion 107, in a peripheral portion of the opening 65, similar to a pressure regulator valve 70, an auxiliary pressure regulator valve 109 including a pair of valve body portions 71, 72 is provided. The auxiliary pressure regulator valve 109 operates similarly to the pressure regulator valve 70. That is, the auxiliary pressure regulator valve 109 closes before the occupant restraint by the upstream inflation portion 47, and restricts the inflation gas in the upstream inflation portion 47 from flowing out to the downstream inflation portion 48 through the auxiliary opening 108. Further, the auxiliary pressure regulator valve 109 cancels the restriction by opening in response to a change in a tensed state of the dividing portion 50 caused by an external force applied due to the restraint upon the occupant restraint by the upstream inflation portion 47. Moreover, the outflow amount changing apparatus is configured by the auxiliary opening 108 and the auxiliary pressure regulator valve 109. A tear seam 73 is not provided in the pressure regulator valve 70 and the auxiliary pressure regulator valve 109.

The configurations other than the above are similar to the first embodiment. Therefore, elements identical to the first embodiment are given the same reference numerals, and redundant descriptions are omitted.

According to the twenty-first embodiment configured as above, both the pressure regulator valve 70 and the auxiliary pressure regulator valve 109 are closed before the occupant restraint by the upstream inflation portion 47, and the inflation gas in the upstream inflation portion 47 is restricted from flowing out of both the opening 65 and the auxiliary opening 108. Therefore, an internal pressure of the upstream inflation portion 47 is increased, and the upstream inflation portion 47 is deployed and inflated at a side of an occupant. The upstream inflation portion 47 is pressed against the occupant, whereby the occupant is restrained, and an impact from a side transmitted to the occupant is relaxed by the upstream inflation portion 47.

Upon the occupant restraint by the upstream inflation portion 47, the tensed state of the dividing portion 50 is changed by the external force applied due to the restraint, and the pressure regulator valve 70 and the auxiliary pressure regulator valve 109 are opened. By the opening of the pressure regulator valve 70, the outflow restriction of the inflation gas by the pressure regulator valve 70 is cancelled. By the opening of the auxiliary pressure regulator valve 109, the outflow restriction of the inflation gas by the auxiliary pressure regulator valve 109 is cancelled. By the restriction cancellation of both elements, the inflation gas in the upstream inflation portion 47 is allowed to flow out to the downstream inflation portion 48 through the opening 65 and the auxiliary opening 108.

Due to the inflation gas flowing out through the auxiliary opening 108 by the auxiliary pressure regulator valve 109 being opened, the inflation gas flowing out from the upstream inflation portion 47 upon the occupant restraint by the upstream inflation portion 47 is increased.

The twenty-first embodiment achieve the following advantages.

(17) The outflow amount changing apparatus is provided, and the amount of the inflation gas flowing out from the upstream inflation portion 47 upon the occupant restraint by the upstream inflation portion 47 is changed to the outflow amount different from the outflow amount in the case where the inflation gas passes through only the opening 65.

Therefore, by the change in the outflow amount (manner of outflow) of the inflation gas from the upstream inflation portion 47, the speed by which the internal pressure of the upstream inflation portion 47 decreases during the occupant restraint can be changed more suitably for restraining and protecting the occupant P, and a performance to restrain and protect the occupant P by an airbag 40 is improved.

(18) The outflow amount changing apparatus is configured by the auxiliary opening 108 provided at a different section from the opening 65 by the dividing portion 50, and the auxiliary pressure regulator valve 109 provided at a different section from the pressure regulator valve 70 by the dividing portion 50.

Therefore, the outflow amount of the inflation gas from the upstream inflation portion 47 to the downstream inflation portion 48 can be increased by opening the auxiliary pressure regulator valve 109 in addition to the pressure regulator valve 70 upon the occupant restraint by the upstream inflation portion 47. The internal pressure of the upstream inflation portion 47 upon the occupant restraint can be reduced faster than in those that do not have the auxiliary opening 108 and the auxiliary pressure regulator valve 109 provided.

Twenty-Second Embodiment

Next, a side airbag apparatus of the twenty-second embodiment will be described with reference to FIG. 45.

Side airbag apparatuses of the aforementioned first to twenty-first embodiments are for restraining and protecting a region from the thorax PT to the shoulder PS of the occupant, however, a side airbag apparatus of the twenty-second embodiment is for protecting a region from a lumbar region PP to the shoulder PS of the occupant P. Complying with this, in the twenty-second embodiment, an airbag 40 is made larger and in a different shape than that in the first to twenty-first embodiments.

Specifically, by connecting fabric portions 43, 44 by a peripheral joining portion 45, an inflation portion 46 for being deployed and inflated at a side of the region from the lumbar region PP to the shoulder PS of the occupant P and protecting the occupant P in this region by restraining the occupant P from an impact is formed.

A part of the peripheral joining portion 45 (portion surrounded by a frame of a one-dot chain line in FIG. 45) is configured by a division joining portion 111. The division joining portion 111 is protruding backward from front ends of the fabric portions 43, 44 at a portion that is somewhat lower than a center portion of the fabric portions 43, 44 in a vertical direction (up and down direction). By this division joining portion 111, the inflation portion 46 is divided into two chambers in the vertical direction (up and down direction).

A part of the inflation portion 46, which is the chamber on the upper side of the division joining portion 111, is divided by a dividing portion 50 into an upstream inflation portion 47, to which inflation gas from an inflator 31 is supplied, and a downstream inflation portion 48 adjacent to a front side of the upstream inflation portion 47 and to which the inflation gas is supplied from the upstream inflation portion 47 through an opening 65 and a pressure regulator valve 70. The upstream inflation portion 47 is a portion for restraining and protecting the shoulder PS by deploying and inflating at the side of the shoulder PS of the occupant P seated in a vehicle seat 12. The downstream inflation portion 48 is a portion for restraining and protecting the thorax PT by deploying and inflating at the side of the thorax PT of the occupant P seated in the vehicle seat 12.

Further, the remainder of the inflation portion 46, which is the chamber on the lower side of the division joining portion 111, is not divided and is configured as a lumbar region-protecting inflation portion 112. The lumbar region-protecting inflation portion 112 is a portion for restraining and protecting the lumbar region PP by deploying and inflating at the side of the lumbar region PP of the occupant P seated in the vehicle seat 12 and is communicated with the upstream inflation portion 47 in a state of being shut off from the downstream inflation portion 48.

Figure 45:
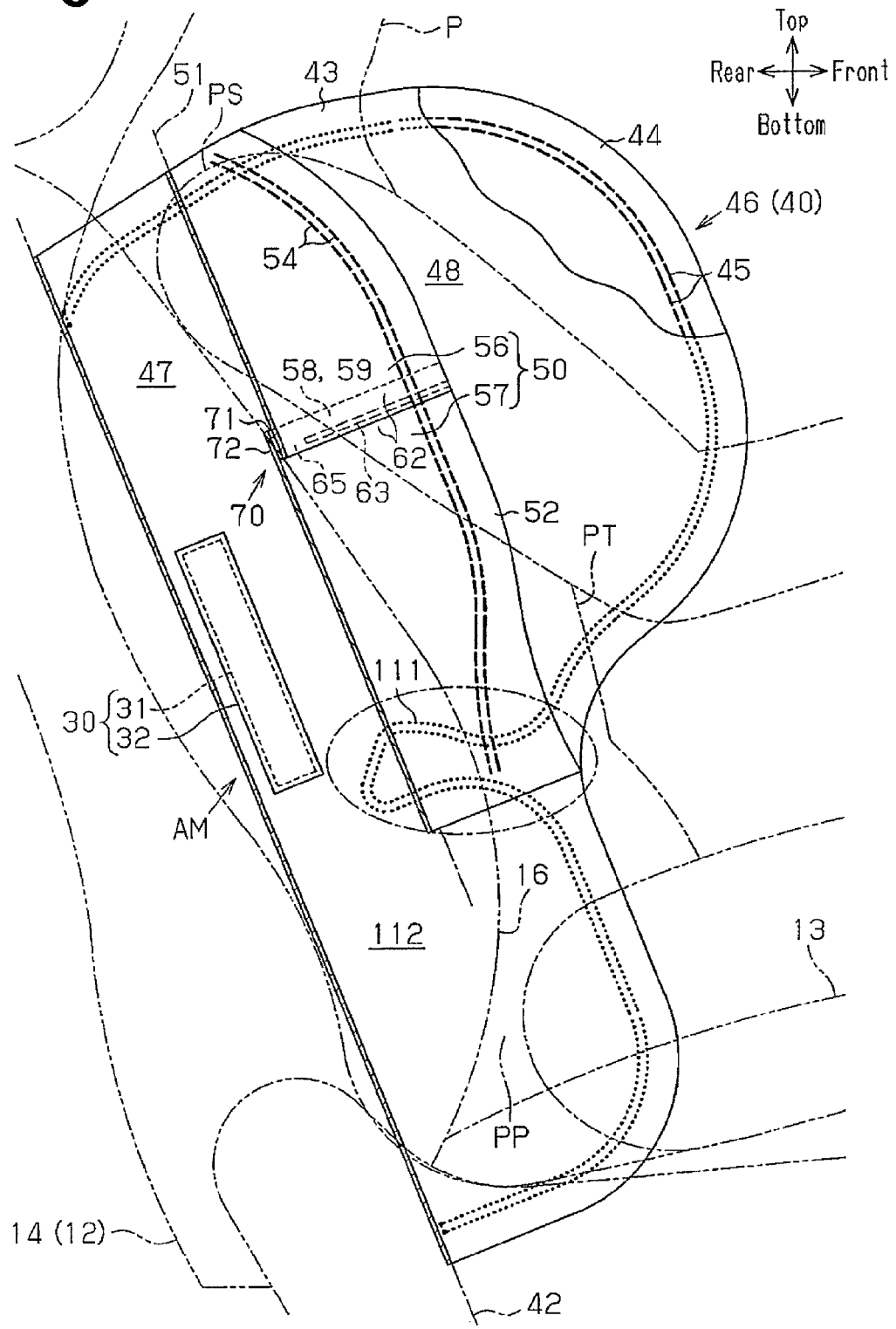
FIG. 45 is a partial cross-sectional side view of a side airbag apparatus of a twenty-second embodiment, showing an internal structure of an airbag module having an airbag in a non-inflated and deployed state together with a part of an outer fabric portion of the airbag, a vehicle seat and an occupant.

In FIG. 45, in order to illustrate the inner fabric portion 43 as well, a large part of the outer fabric portion 44 is illustrated in a state of being cut away.

The configurations other than the above are similar to the first embodiment. Therefore, elements identical to the first embodiment are given the same reference numerals, and redundant descriptions are omitted.

In the twenty-second embodiment configured as above, when the impact is applied from the side of the vehicle seat 12, the inflation gas is supplied to the upstream inflation portion 47 that is a part of the inflation portion 46. Further, the inflation gas is also supplied to the lumbar region-protecting inflation portion 112 communicated with the upstream inflation portion 47. Therefore, the upstream inflation portion 47 and the lumbar region-protecting inflation portion 112 start to inflate among the inflation portion 46.

The pressure regulator valve 70 closes before an occupant restraint by the upstream inflation portion 47. The inflation gas in the upstream inflation portion 47 is restricted from flowing to the downstream inflation portion 48 through the opening 65, and an internal pressure of the upstream inflation portion 47 is increased. Further, an internal pressure of the lumbar region-protecting inflation portion 112 communicated with the upstream inflation portion 47 also increases.

Therefore, compared to a case in which the lumbar region-protecting inflation portion 112 is not provided, a portion within the inflation portion 46 that can be restraining and protecting the occupant with high internal pressure expands.

Upon the occupant restraint by the upstream inflation portion 47, the pressure regulator valve 70 cancels the above restriction by opening in response to the change in the tensed state of the dividing portion 50 by an external force applied due to the restraint. When the flow of the inflation gas from the upstream inflation portion 47 to the downstream inflation portion 48 is allowed, the internal pressures of the upstream inflation portion 47 and the lumbar region-protecting inflation portion 112 are decreased, and an internal pressure of the downstream inflation portion 48 increases. The downstream inflation portion 48 is deployed and inflated, and the inflation portion 46 starts to restrain the occupant not only by the upstream inflation portion 47 and the lumbar region-protecting inflation portion 112 but also by the downstream inflation portion 48 as well.

Thus, in the twenty-second embodiment in which the lumbar region-protecting inflation portion 112 is provided in addition to the upstream inflation portion 47 and the downstream inflation portion 48, the advantages of (1) to (4) as above are achieved.

Instead of the first embodiment, configurations of the second to twenty-first embodiments may be implemented by being combined with the configuration of the twenty-second embodiment. In such cases, in a side airbag apparatus in which the lumbar region-protecting inflation portion 112 is provided in addition to the upstream inflation portion 47 and the downstream inflation portion 48, advantages similar to the second to twenty-first embodiments are achieved.

Twenty-Third Embodiment

Next, a side airbag apparatus of the twenty-third embodiment will be described with reference to FIG. 46 and FIG. 47.

In the twenty-third embodiment, an inflation portion 46 is not divided by a dividing portion 50, and is configured by one chamber. The inflation portion 46 occupies a large portion of an airbag 40. The airbag 40 being formed by connecting an inner fabric portion 43 and an outer fabric portion 44 to be in a bag shape is as described earlier. The inner fabric portion 43 and the outer fabric portion 44, as well as peripheral joining portions 45 connecting them in the bag shape configure a wall portion of the inflation portion 46. At a front portion of the wall portion, an opening 113 that communicates inside and outside of the inflation portion 46 is provided.

The connection of the inner fabric portion 43 and the outer fabric portion 44 by the peripheral joining portions 45 is cancelled at a front end of the inflation portion 46. In other words, at the front portion of the inflation portion 46, the peripheral joining portion 45 for connecting the inner fabric portion 43 and the outer fabric portion 44 is not provided. Accordingly, the portion where the peripheral joining portion 45 is not provided is configured as the opening 113.

Further, in the twenty-third embodiment, a time changing apparatus that changes a time when inflation gas starts to flow out through the opening 113 upon an occupant restraint by the inflation portion 46 to a time that is different from an outflow starting time in a case where the inflation gas flows out from the opening 113 without being obstructed by the wall portion is provided. The time changing apparatus configures a part of the wall portion, and is configured by a lid portion 114 that covers the opening 113. The lid portion 114 is formed of a sheet material having elasticity. The lid portion 114 is formed somewhat larger than the opening 113 in a not-stretched state. The lid portion 114 is connected in an airtight state by means such as sewing, adhesion and the like to a peripheral portion of the opening 113.

Figure 46:
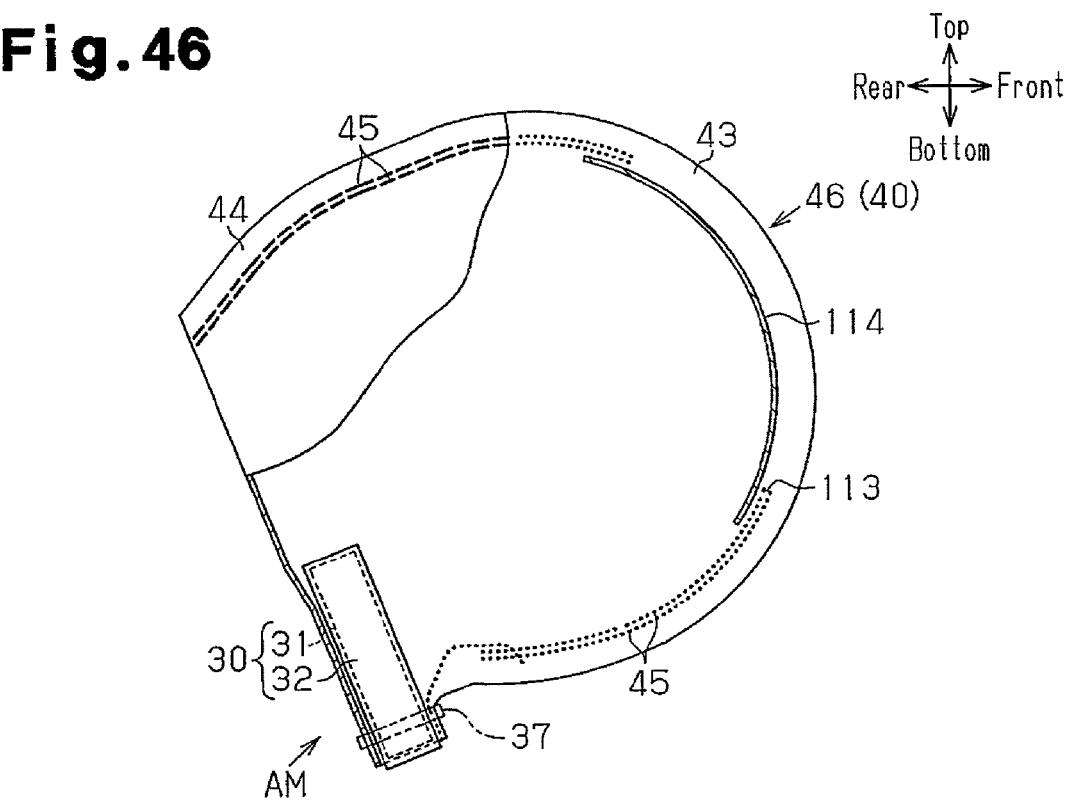
FIG. 46 is a cross-sectional side view of a side airbag apparatus of a twenty-third embodiment, showing an internal structure of an airbag module having an airbag in a non-inflated and deployed state together with a part of an outer fabric portion of the airbag.
Figure 47:
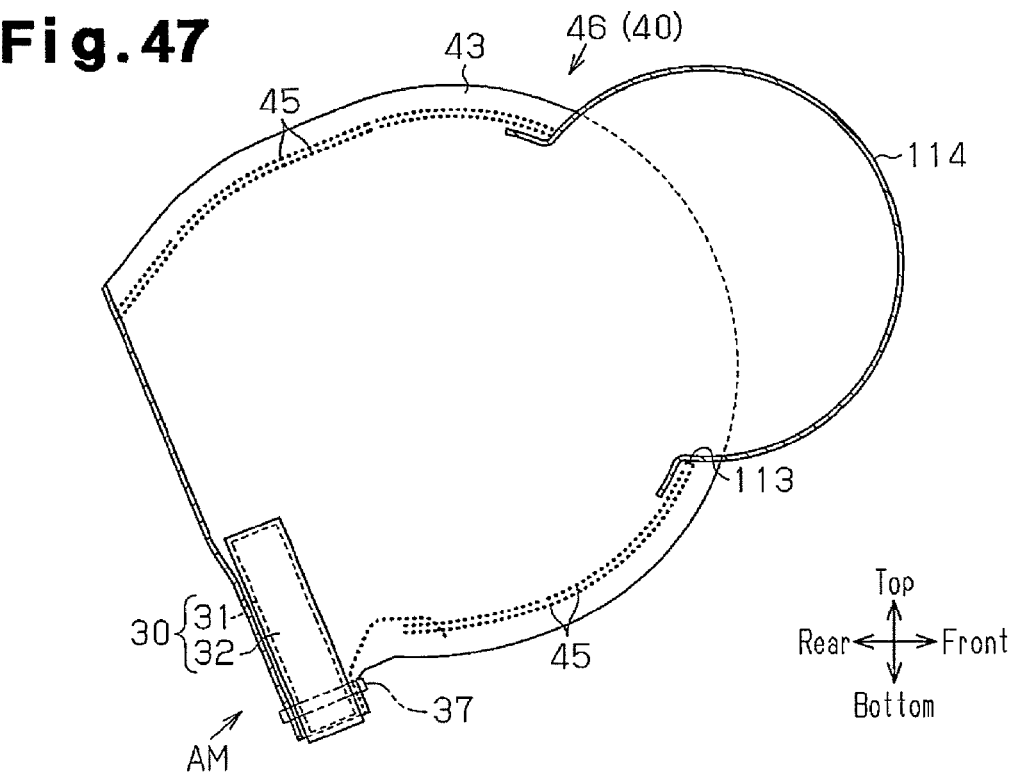
FIG. 47 is a cross-sectional side view showing how a lid portion is extended and inflated outward of an inflation portion upon an occupant restraint by the inflation portion in the twenty-third embodiment.

In FIG. 46, in order to illustrate the inner fabric portion 43 as well, a large part of the outer fabric portion 44 is illustrated in a state of being cut away.

The configurations other than the airbag 40 of a side airbag apparatus, that is, an inflator assembly 30 and the like are similar to the first embodiment. Therefore, elements identical to the first embodiment are given the same reference numerals, and redundant descriptions are omitted.

In the twenty-third embodiment configured as above, the inflation gas is supplied to the inflation portion 46 in response to an impact from a side of a vehicle seat 12. Although the opening 113 is provided at the wall portion of the inflation portion 46, the inflation gas in the inflation portion 46 flowing out therefrom is restricted due to the lid portion 114 covering the opening 113. Since the inflation gas stays in the inflation portion 46, an internal pressure of the inflation portion 46 increases. However, the internal pressure of the inflation portion 46 before the occupant restraint by the inflation portion 46 is not as high as during the occupant restraint, whereby the lid portion 114 is not stretched, or is stretched only scarcely even if it did. Thus, the inflation gas does not flow out through the opening 113, or flows out only scarcely even if it did.

By the increase in the internal pressure of the inflation portion 46, the inflation portion 46 is deployed and inflated at the side of an occupant. The inflation portion 46 is pressed against the occupant, whereby the occupant is restrained, and an impact from a side transmitted to the occupant is reduced by the inflation portion 46.

Upon the occupant restraint by the inflation portion 46, the internal pressure of the inflation portion 46 further increases by an external force applied due to the restraint. By this internal pressure, as shown in FIG. 47, the lid portion 114 is stretched from a midpoint of the occupant restraint to bulge to outer side of the inflation portion 46. A state that is similar to when the opening 113 has been opened is assumed, and a part of the inflation gas in the inflation portion 46 starts to flow out into the inflated lid portion 114 through the opening 113.

Therefore, compared to those in which the opening 113 is not covered by the lid portion 114, an outflow starting time of the inflation gas through the opening 113 is delayed.

The twenty-third embodiment achieves the following advantages.

(19) The time changing apparatus is provided so as to change the time when the inflation gas starts to flow out through the opening 113 upon the occupant restraint by the inflation portion 46 is configured to be changed to the time that is different from the outflow starting time in the case where the inflation gas flows out from the opening 113 without being obstructed by the wall portion.

Therefore, the outflow starting time of the inflation gas from the inflation portion 46 (manner of outflow) can be changed more suitable for restraining and protecting the occupant P, and a performance of restraining and protecting the occupant P by the airbag 40 is improved.

(20) The time changing apparatus is configured by the lid portion 114 formed from the sheet material having elasticity and that closes the opening 113.

Therefore, during the occupant restraint by the inflation portion 46, the time when the inflation gas starts to flow out through the opening 113 is delayed by the period during which the opening 113 is closed by the lid portion 114 in the not-stretched state, and the internal pressure of the inflation portion 46 can be increased.

Thus, it is effective in a case where the performance to protect the occupant is desired to be improved by delaying the outflow starting time of the inflation gas from the inflation portion 46 and increasing the internal pressure of the inflation portion 46.

Modifications of the Twenty-Third Embodiment

The twenty-third embodiment may be modified as follows.

The opening 113 may be provided in either of an inner fabric portion 43 and an outer fabric portion 44.

A plurality of openings 113 may be provided at a plurality of positions on the wall portion of the inflation portion 46.

Twenty-Fourth Embodiment

Figure 48:
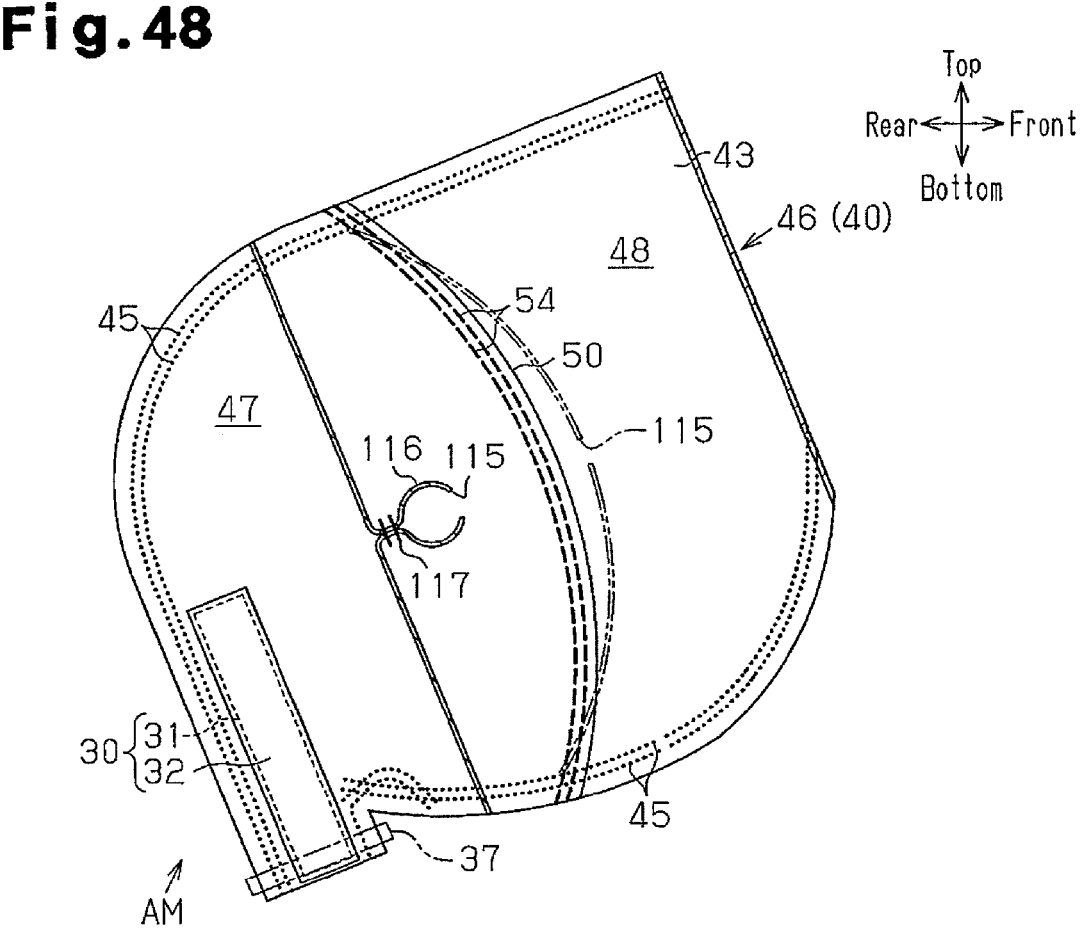
FIG. 48 is a cross-sectional side view of a side airbag apparatus of a twenty-fourth embodiment, showing an internal structure of an airbag module having an airbag in a non-inflated and deployed state.

Next, a side airbag apparatus of the twenty-fourth embodiment will be described with reference to FIG. 48.

In the twenty-fourth embodiment, an inflation portion 46 is divided by a dividing portion 50 into an upstream inflation portion 47 and a downstream inflation portion 48 adjacent to a front side of the upstream inflation portion 47. The dividing portion 50 configures a part of a wall portion of the upstream inflation portion 47 and a part of a wall portion of the downstream inflation portion 48. An opening 115 is provided at a part of the dividing portion 50. A pressure regulator valve 70 is not provided in a side airbag apparatus.

The part of the dividing portion 50 where the opening 115 is included is configured as a redundant portion 116 that is in a slack state outside the upstream inflation portion 47 (within the downstream inflation portion 48) before inflation of the upstream inflation portion 47. In the dividing portion 50, a retaining portion that retains the redundant portion 116 in the slack state while in a state of being isolated from the upstream inflation portion 47, and that cancels the retaining due to the an occupant restraint by the upstream inflation portion 47.

The retaining portion is for example configured by a joining portion 117 that connects the redundant portion 116 pinched into a spherical shape at a boundary portion with remaining portions of the dividing portion 50. The joining portion 117 connects the redundant portion 116 at a lower strength than other joining portions, for example peripheral joining portions 45, first joining portions 54, 55, and the like. The joining portion 117 is configured to be more prone to being broken than the other joining portions. The joining portion 117 is formed by sewing the redundant portion 116 using sewing threads. Further, by the redundant portion 116 and the joining portion 117, a time changing apparatus that changes a time when inflation gas starts to flow out through the opening 115 upon the occupant restraint by the upstream inflation portion 47 to a time different from an outflow starting time in a case where the inflation gas flows out from the opening 115 without being obstructed by the wall portion is configured.

The configurations other than the above are similar to the first embodiment. Therefore, elements identical to the first embodiment are given the same reference numerals, and redundant descriptions are omitted.

In the twenty-fourth embodiment configured as above, when an impact is applied from a side of a vehicle seat 12, the inflation gas is supplied to the upstream inflation portion 47 in response to the impact. An internal pressure of the upstream inflation portion 47 is low before the occupant restraint by the upstream inflation portion 47, and the joining portion 117 is not broken thereby. The redundant portion 116 configured by the part of the dividing portion 50 including the opening 115 is retained in the slack state by the joining portion 117. At this time, the opening 115 provided in the redundant portion 116 comes to be in the state of being isolated from the remainder of the dividing portion 50, and the inflation gas in the upstream inflation portion 47 is restricted from flowing out to the downstream inflation portion 48 through the opening 115. Therefore, the internal pressure of the upstream inflation portion 47 is increased, and the upstream inflation portion 47 is deployed and inflated at the side of the occupant. The upstream inflation portion 47 is pressed against the occupant, whereby the occupant is restrained, and the impact from a side transmitted to the occupant is reduced by the upstream inflation portion 47.

Upon the occupant restraint by the upstream inflation portion 47, the internal pressure of the upstream inflation portion 47 increases by the external force applied due to the restraint in comparison to the time before the occupant restraint. The joining portion 117 is broken in a midpoint of the occupant restraint by the upstream inflation portion 47. By this breaking, the retaining of the redundant portion 116 by the joining portion 117 is cancelled. The slack state of the redundant portion 116 is resolved, whereby the redundant portion 116 is stretched, and the redundant portion 116 that is a part of the dividing portion 50 and the remainder of the dividing portion 50 are linked to each other so as to configure one surface. As shown in FIG. 48 by a broken line in which a long dash alternates with a pair of short dashes, the opening 115 comes to be in a state of being opened in the dividing portion 50, and the inflation gas in the upstream inflation portion 47 starts to flow out to the downstream inflation portion 48 through the opening 115.

Therefore, in the occupant restraint by the upstream inflation portion 47, the time when the inflation gas starts to flow out through the opening 115 from the upstream inflation portion 47 is delayed by the period during which the redundant portion 116 is retained in the slack state by the joining portion 117 (retaining portion). Accompanying this, the internal pressure of the upstream inflation portion 47 is increased.

Thus, the twenty-fourth embodiment achieves advantages as follows in addition to the advantage of (19) as above.

(21) The redundant portion 116 is configured by the part of the dividing portion 50 including the opening 115. The joining portion 117 is provided to retain the redundant portion 116 in the slack state in the state of being isolated from the remainder of the dividing portion 50 before the occupant restraint by the upstream inflation portion 47 and that cancels the retaining at the occupant restraint by the upstream inflation portion 47. Then, these redundant portion 116, and joining portion 117 (retaining portion) are configured as the time changing apparatus.

Therefore, the time when the inflation gas starts to flow out through the opening 115 can be delayed more in comparison to the case where the inflation gas flows out from the opening 115 without being obstructed by the wall portion.

Thus, it is effective in a case where a performance to protect the occupant is desired to be improved by delaying the time when the inflation gas starts to flow out from the upstream inflation portion 47.

Modifications of the Twenty-Fourth Embodiment

The twenty-fourth embodiment may be modified as follows.

The inflation portion 46 does not necessarily need to be divided by the dividing portion 50, that is, may be configured by one chamber. In this case, the wall portion of the inflation portion 46 is configured by the inner fabric portion 43 and the outer fabric portion 44.

However, a part of the wall portion (inner fabric portion 43 and outer fabric portion 44) is formed of a different member from the remainder of the wall portion. Further, the aforementioned part is connected to the remainder of the wall portion by the first joining portion provided in the peripheral portion of the part. Further, the redundant portion 116 and the joining portion 117 (retaining portion) are provided at the part.

The above modification can be adapted to the twenty-fifth embodiment to be described below.

Twenty-Fifth Embodiment

Figure 49:
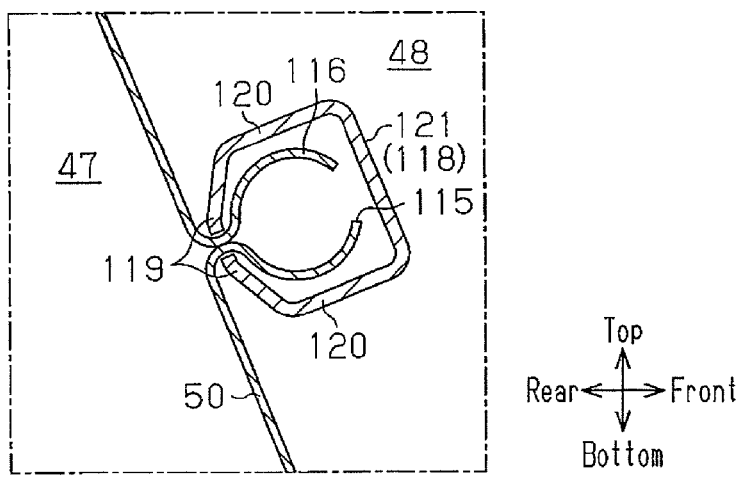
FIG. 49 is a partial cross-sectional side view showing a redundant portion and a clip (retaining portion) in a side airbag apparatus of a twenty-fifth embodiment.

Next, a side airbag apparatus of the twenty-fifth embodiment will be described with reference to FIG. 49.

In the twenty-fifth embodiment, a retaining portion is configured by a clip 118 provided detachably attached to a dividing portion 50 instead of the joining portion 117. The clip 118 includes a pair of gripping portions 120 including claw portions 119 at their respective distal ends, and a connecting portion 121 that connects base ends of the two gripping portions 120.

The clip 118 connects by gripping a pinched redundant portion 116 at a boundary portion with the remainder of the dividing portion 50 by the claw portions 119, and retains the redundant portion 116 in a slack state. The clip 118 retains the redundant portion 116 at a lower strength than other joining portions, for example, peripheral joining portions 45, first joining portions 54, 55, and the like. The clip 118 is set to cancel the retaining in a midpoint of an occupant restraint by an upstream inflation portion 47 by the gripping portions 120 being elastically deformed.

The configurations other than the above are similar to the twenty-fourth embodiment. Therefore, elements identical to the twenty-fourth embodiment are given the same reference numerals, and redundant descriptions are omitted.

In the twenty-fifth embodiment configured as above, an internal pressure of the upstream inflation portion 47 is low before the occupant restraint by the upstream inflation portion 47, and the redundant portion 116 configured by the part of the dividing portion including an opening 115 is gripped by the gripping portions 120 of the clip 118, and is retained in the slack state. At this time, the opening 115 provided in the redundant portion 116 comes to be in an isolated state from the remainder of the dividing portion 50, and the inflation gas in the upstream inflation portion 47 entering the redundant portion 116 and flowing out to the downstream inflation portion 48 through the opening 115 are restricted.

Upon the occupant restraint by the upstream inflation portion 47, the internal pressure of the upstream inflation portion 47 increases by the external force applied due to the restraint in comparison to the time before the occupant restraint. The two gripping portions 120 of the clip 118 are caused to elastically deform in a direction separating away from each other in the midpoint of the occupant restraint by the upstream inflation portion 47, and the clip 118 separated from the redundant portion 116. The retaining of the redundant portion 116 by the clip 118 is cancelled. The slack state of the redundant portion 116 is resolved and stretched, and the redundant portion 116 that is a part of the dividing portion 50 and the remainder of the dividing portion 50 are linked to each other so as to configure one surface. The opening 115 comes to be in an opened state in the dividing portion 50 tensed in a planar shape, and the inflation gas starts to flow out to outside the upstream inflation portion 47 (downstream inflation portion 48) through the opening 115.

Therefore, similar to the twenty-fourth embodiment, in the occupant restraint by the upstream inflation portion 47, the time when the inflation gas starts to flow out through the opening 115 from the upstream inflation portion 47 is delayed by the period during which the redundant portion 116 is retained in the slack state by the clip 118 (retaining portion).

Thus, according to the twenty-fifth embodiment, although the configuration of the retaining portion is different, the advantages similar to the twenty-fourth embodiment, that is, (19) and (21) as above are achieved.

Twenty-Sixth Embodiment

Next, a side airbag apparatus of the twenty-sixth embodiment will be described with reference to FIG. 50 and FIGS. 51A and 51B.

In the twenty-sixth embodiment, a dividing portion 50 that divides an inflation portion 46 into an upstream inflation portion 47 and a downstream inflation portion 48 is formed by one sheet of woven fabric 124 configured by weaving a warp 122 and a weft 123 in directions that orthogonally intersect each other. In this woven fabric 124, a gap portion 125 surrounded by a pair of adjacent warps 122 and a pair of adjacent wefts 123 configures an opening in the dividing portion 50. A pressure regulator valve 70 is not provided in a side airbag apparatus.

Further, in the twenty-sixth embodiment, an outflow amount changing apparatus that changes an amount of inflation gas that flows out from the upstream inflation portion 47 in accordance with a change in an internal pressure of the upstream inflation portion 47 upon when the upstream inflation portion 47 restrains an occupant is provided. In the twenty-sixth embodiment, as the woven fabric 124, a woven fabric of a type that enlarges the gap portion 125 by causing a woven state of the warp 122 and the weft 123 to change (displacing woven textures) upon when a pressure is applied is used. The outflow amount changing apparatus is configured by the woven fabric 124.

Figure 50:
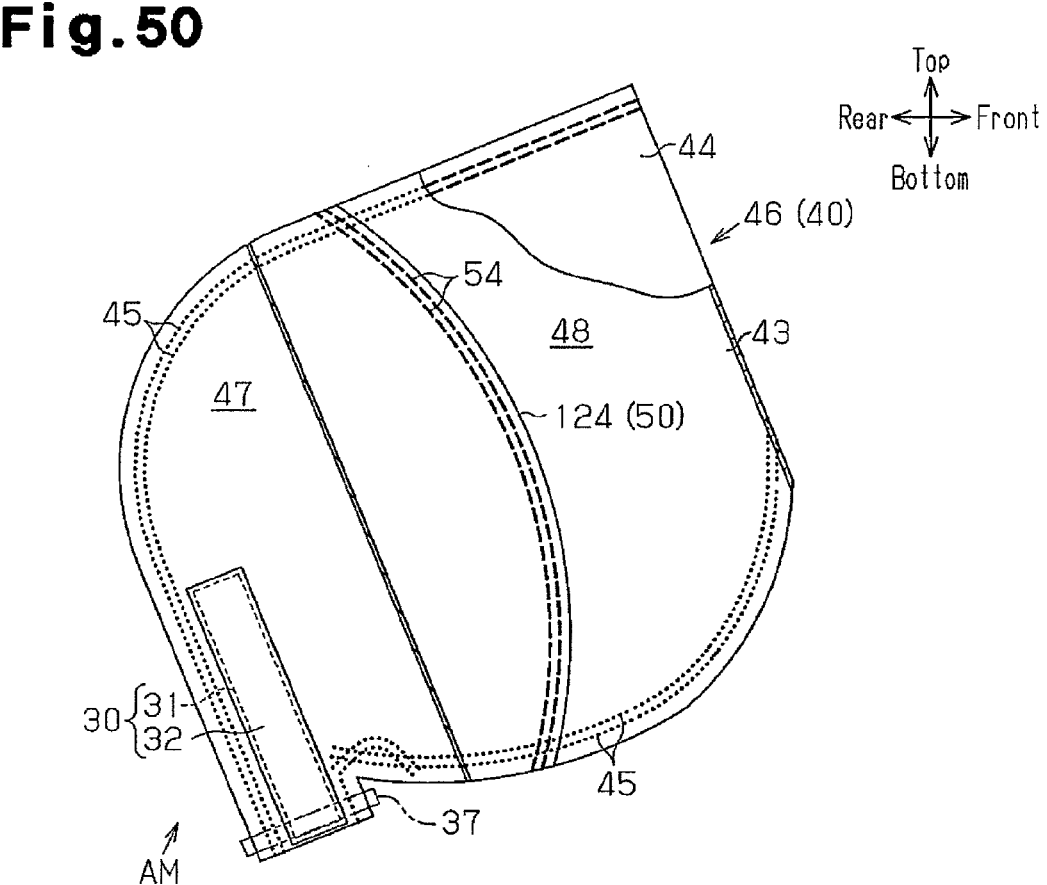
FIG. 50 is a cross-sectional side view of a side airbag apparatus of a twenty-sixth embodiment, showing an internal structure of an airbag module having an airbag in a non-inflated and deployed state together with a part of an outer fabric portion of the airbag.

In FIG. 50, in order to illustrate the inner fabric portion 43 as well, a large part of the outer fabric portion 44 is illustrated in a state of being cut away.

The configurations other than the above are similar to the first embodiment. Therefore, elements identical to the first embodiment are given the same reference numerals, and redundant descriptions are omitted.

Figure 51A:
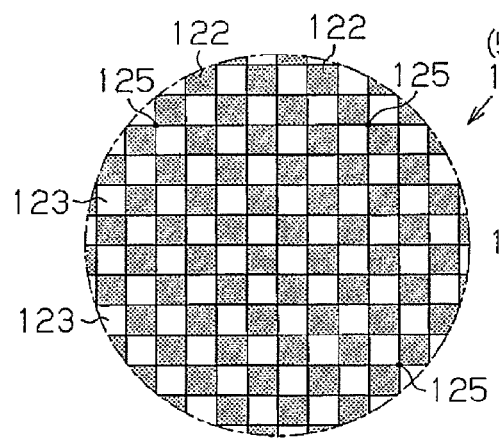
FIGS. 51A, 51B are partial front views showing how a woven fabric configuring a dividing portion of the twenty-sixth embodiment changes a size of a gap portion before and after an occupant restraint.
Figure 51B:
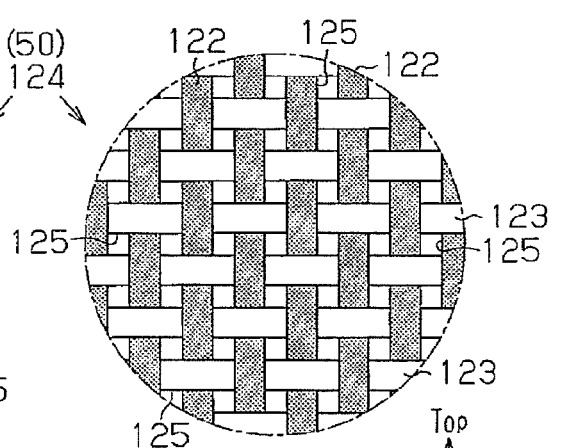

In the twenty-sixth embodiment configured as above, as shown in FIG. 51A, an opening configured by the gap portion 125 of the woven fabric 124 is in a closed state or in a contracted state before the occupant restraint by the upstream inflation portion 47, whereby the inflation gas in the upstream inflation portion 47 is restricted from flowing out through the gap portion 125 (opening). Therefore, an internal pressure of the upstream inflation portion 47 is increased, and the upstream inflation portion 47 is deployed and inflated at a side of an occupant. The upstream inflation portion 47 is pressed against the occupant, whereby the occupant is restrained, and the impact from a side transmitted to the occupant is reduced by the upstream inflation portion 47.

Upon the occupant restraint by the upstream inflation portion 47, the internal pressure of the upstream inflation portion 47 further increases by an external force applied due to the restraint. As shown in FIG. 51B, the woven state of the warp 122 and the weft 123 changes in the woven fabric 124 from a midpoint of the occupant restraint. Each gap portion 125 (opening) is enlarged, and larger amount of the inflation gas flows out from the upstream inflation portion 47 to the downstream inflation portion 48 through these gap portions 125 (openings). By this increased outflow of the inflation gas, the internal pressure of the upstream inflation portion 47 decreases quickly.

The twenty-sixth embodiment achieves the following advantages.

(22) The outflow amount changing apparatus is provided, and the amount of the inflation gas flowing out from the upstream inflation portion 47 upon the occupant restraint by the upstream inflation portion 47 is changed in accordance with the change in the internal pressure of the upstream inflation portion 47.

Therefore, by the change in the outflow amount (manner of outflow) of the inflation gas from the upstream inflation portion 47, a speed by which the internal pressure of the upstream inflation portion 47 decreases during the occupant restraint can be changed more suitably for restraining and protecting the occupant P, and a performance to restrain and protect the occupant P by an airbag 40 is improved.

(23) As the woven fabric forming the dividing portion 50, the woven fabric 124 that enlarges the gap portions 125 by changing the woven state of the warp 122 and the weft 123 by the internal pressure of the upstream inflation portion 47 that rises due to the occupant restraint by the upstream inflation portion 47 is used, and the outflow amount changing apparatus is configured by this woven fabric 124.

Therefore, by causing the woven state of the warp 122 and the weft 123 to change and enlarging the gap portions 125, the inflation gas flowing out from the upstream inflation portion 47 to the downstream inflation portion 48 can be increased. It is effective for cases in which an occupant protection performance is desired to be increased by causing a large amount of inflation gas to flow out from the upstream inflation portion 47 upon the occupant restraint, and causing the internal pressure of the upstream inflation portion 47 to be decreased quickly.

Modifications of the Twenty-Sixth Embodiment

The twenty-sixth embodiment may be modified as follows.

The woven fabric 124 in which the gap portions 125 are enlarged by the woven state of the warp 122 and the weft 123 being changed (woven texture being displaced) by pressure may only be used as a part of the dividing portion 50.

The inflation portion 46 does not necessarily need to be divided by the dividing portion 50, that is, may be configured by one chamber. In this case, the wall portion of the inflation portion 46 is configured by the inner fabric portion 43 and the outer fabric portion 44.

However, a part of the wall portion (inner fabric portion 43 and outer fabric portion 44) is formed of a different member from the remainder of the wall portion. Further, the aforementioned part is connected to the remainder of the wall portion by the first joining portion provided in the peripheral portion of the part. Further, the woven fabric 124 in which the gap portions 125 are enlarged by the woven state of the warp 122 and the weft 123 being changed (woven texture being displaced) is used at least as a part of the inner fabric portion 43 and the outer fabric portion 44.

Twenty-Seventh Embodiment

Next, a side airbag apparatus of the twenty-seventh embodiment will be described with reference to FIG. 52.

In the twenty-seventh embodiment, an inflation portion 46 is divided by a dividing portion 50 into an upstream inflation portion 47 and a downstream inflation portion 48. When an airbag 40 is in a non-inflated and deployed state, the dividing portion 50 is overlapped in a lateral direction (vehicle widthwise direction) by being folded in half along a folding line 51 extending in a vertical direction (up and down direction). The dividing portion 50 in this state is arranged in the upstream inflation portion 47 in a state in which the folding line 51 is positioned on an upstream side of an inner end 52 and an outer end 53.

The dividing portion 50 configures a part of a wall portion of the upstream inflation portion 47. The dividing portion 50 includes an opening 126 formed of holes such as a round hole and the like. Including this opening 126, at least a peripheral portion of the opening 126 is configured by a stretching portion 127 having elasticity. In the twenty-seventh embodiment, an entirety of the dividing portion 50 is configured by the stretching portion 127. The stretching portion 127 is formed of a sheet having elasticity such as rubber, elastomer, and the like. An outflow amount changing apparatus that changes an amount of inflation gas that flows out from the upstream inflation portion 47 in accordance with a change in an internal pressure of the upstream inflation portion 47 upon when the upstream inflation portion 47 restrains an occupant is configured by this stretching portion 127.

A vent hole 128 for discharging excessive inflation gas in the downstream inflation portion 48 is formed at a part of a wall portion of the downstream inflation portion 48, for example on an outer fabric portion 44 of the airbag 40.

Figure 52:
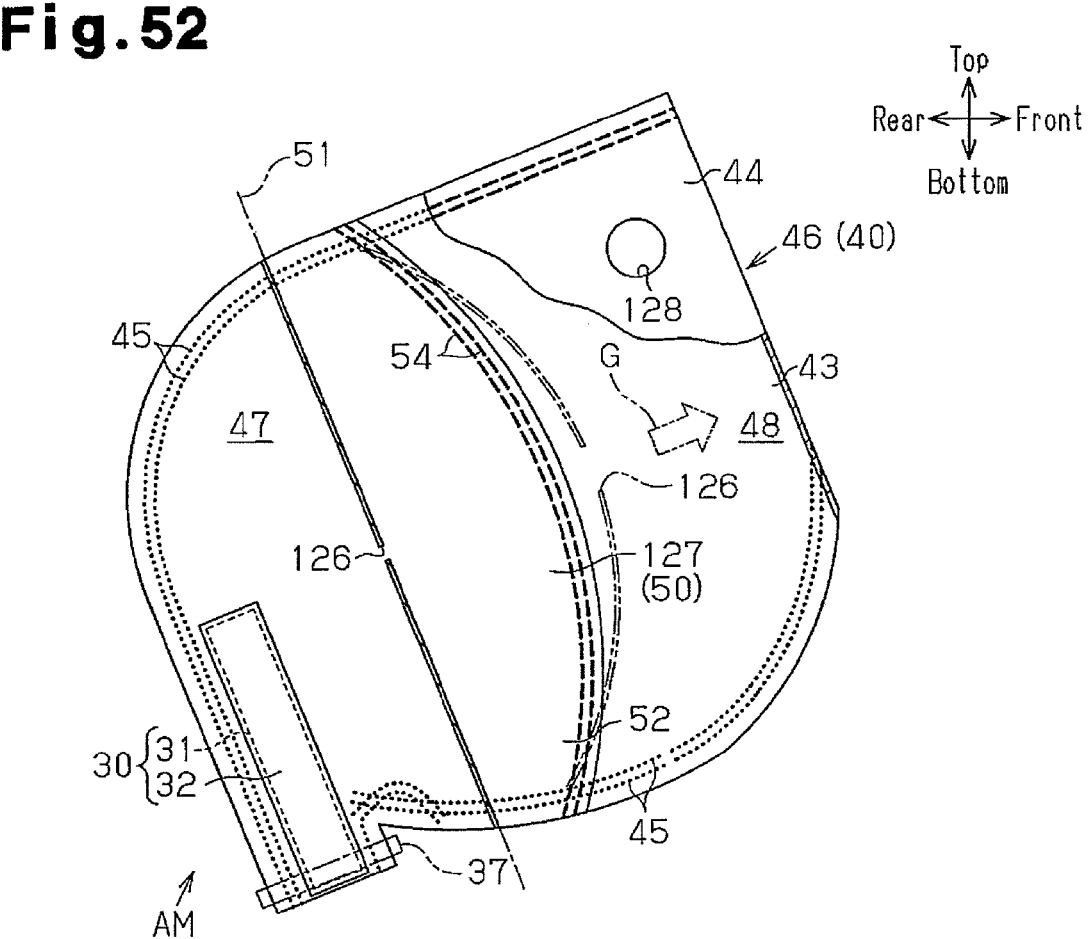
FIG. 52 is a cross-sectional side view of a side airbag apparatus of a twenty-seventh embodiment, showing an internal structure of an airbag module having an airbag in a non-inflated and deployed state together with a part of an outer fabric portion of the airbag.

In FIG. 52, in order to illustrate the inner fabric portion 43 as well, a large part of the outer fabric portion 44 is illustrated in a state of being cut away.

The configurations other than the above are similar to the twenty-sixth embodiment. Therefore, elements identical to the twenty-sixth embodiment are given the same reference numerals, and redundant descriptions are omitted.

In the twenty-seventh embodiment configured as above, the inflation gas is supplied to the upstream inflation portion 47 in response to an impact from a side of a vehicle seat 12. An internal pressure of the upstream inflation portion 47 is low before the occupant restraint by the upstream inflation portion 47, and the stretching portion 127 (dividing portion 50) does not extend, or scarcely extends even if it did. Therefore, an opening area of the opening 126 is small, and the inflation gas flowing out from the upstream inflation portion 47 to the downstream inflation portion 48 through the opening 126 is scarce.

An internal pressure of the upstream inflation portion 47 is increased, and the upstream inflation portion 47 is deployed and inflated at a side of an occupant. The upstream inflation portion 47 is pressed against the occupant, whereby the occupant is restrained, and the impact from a side transmitted to the occupant is reduced by the upstream inflation portion 47.

Upon the occupant restraint by the upstream inflation portion 47, the internal pressure of the upstream inflation portion 47 increases by an external force applied due to the restraint. From a midpoint of the occupant restraint, the stretching portion 127 (dividing portion 50) is stretched, the opening 126 is enlarged, and the opening area thereof becomes large. The inflation gas in the upstream inflation portion 47 flows through the opening 126, and it is easy for the inflation gas to flow out to outside of the upstream inflation portion 47. Larger amount of inflation gas flows out from the upstream inflation portion 47 to the downstream inflation portion 48 through the opening 126.

Further, a larger amount of inflation gas flows out from the upstream inflation portion 47 to the downstream inflation portion 48 than would if the stretching portion 127 were not provided around the opening 126 and if the opening 126 did not change its size (does not become large) before and after the occupant restraint.

By the inflow of the inflation gas, the downstream inflation portion 48 is deployed and inflated at a later time than the upstream inflation portion 47 and restrains and protects the occupant. The excessive inflation gas in the upstream inflation portion 47 is discharged to the outside of the inflation portion 46 through the vent hole 128.

Thus, the twenty-seventh embodiment achieves advantages as follows instead of (23) as above, in addition to the advantage of (22) as above.

(24) The dividing portion 50 configuring a part of the wall portion of the upstream inflation portion 47 and including the opening 126 is configured by the stretching portion 127 formed from the sheet having elasticity, and this stretching portion 127 is configured as the outflow amount changing apparatus.

Therefore, the larger amount of inflation gas can be flowed out from the upstream inflation portion 47 to the downstream inflation portion 48 upon the occupant restraint by the upstream inflation portion 47.

More inflation gas is caused to flow out during the occupant restraint than before the occupant restraint, and it is effective in cases in which the reduction of the internal pressure of the upstream inflation portion 47 and the increase in the internal pressure of the downstream inflation portion 48 are desired to be performed at an early stage.

Twenty-Eighth Embodiment

Figure 53:
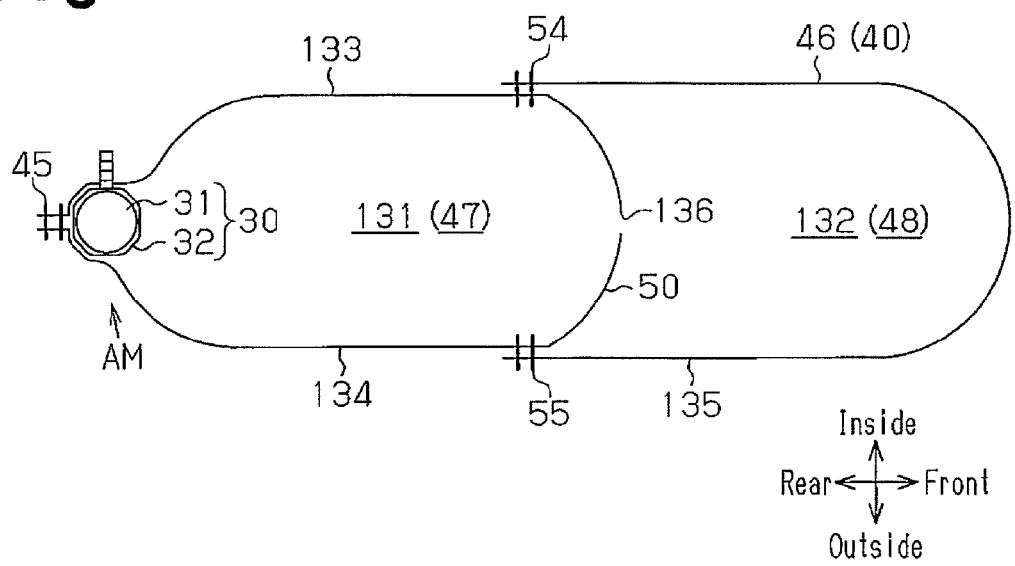
FIG. 53 is a cross-sectional plan view of a side airbag apparatus of a twenty-eighth embodiment showing a schematic configuration of an inside of an airbag module with an airbag deployed and inflated.

Next, a side airbag apparatus of the twenty-eighth embodiment will be described with reference to FIG. 53 and FIG. 55.

In the twenty-eighth embodiment, an outflow amount changing apparatus that changes an amount of inflation gas that flows out from a portion when an occupant P is restrained by the portion that is inflated among an inflation portion 46 to an outflow amount different from an outflow amount in a case where the inflation gas passes through only an opening is provided.

Specifically, an airbag 40 includes a rear-side inflation portion 131 in which an inflator assembly 30 is arranged, and a front-side inflation portion 132 arranged adjacent to a front side of the rear-side inflation portion 131. The inflation portion 46 is configured by these rear-side inflation portion 131 and front-side inflation portion 132. The rear-side inflation portion 131 is formed by connecting peripheral portions of an inner fabric portion 133 and an outer fabric portion 134 in a bag shape by a peripheral joining portion 45. The rear-side inflation portion 131 configures an upstream inflation portion 47 as aforementioned.

The front-side inflation portion 132 is formed by connecting a bag portion 135 of which rear end is opened to the inner fabric portion 133 and the outer fabric portion 134 by first joining portions 54, 55 provided at a peripheral portion of the rear end. Further, within the upstream inflation portion 47, a portion covered by the bag portion 135 is configured as a dividing portion 50. The front-side inflation portion 132 is configured by the dividing portion 50 and the bag portion 135. The front-side inflation portion 132 configures a downstream inflation portion 48 as aforementioned.

A dimension L1 of the dividing portion 50 in a vertical direction is set larger than a dimension L2 of the dividing portion 50 in a lateral direction. The dividing portion 50 is provided with an opening 136 formed of a slit extending in the lateral direction while the dividing portion 50 is in a tensed state. The opening 136 is provided at a portion (which is herein a center portion) with the largest external force applied due to an occupant restraint by the upstream inflation portion 47 in the vertical direction, as a specific opening.

Further, at a portion different from the opening 136 of the dividing portion 50, auxiliary openings 137 formed of slits extending in the lateral direction while the dividing portion 50 is in the tensed state are provided. In the twenty-eighth embodiment, a plurality of the auxiliary openings 137 is provided respectively in a region above the opening 136 in the dividing portion 50, and in a region below the opening 136 thereof. All of the auxiliary openings 137 are provided at portions that are offset from the portion (center portion) with the largest external force applied due to the occupant restraint by the upstream inflation portion 47 in the vertical direction (up and down direction). These opening 136 and auxiliary openings 137 are arranged at regular intervals in the vertical direction. Further, two among the plurality of auxiliary openings 137 are arranged at an upper end and a lower end of the dividing portion 50. Further, the outflow amount changing apparatus is configured by the auxiliary openings 137.

The configurations other than the above are similar to the twenty-sixth embodiment. Therefore, elements identical to the twenty-sixth embodiment are given the same reference numerals, and redundant descriptions are omitted.

In the twenty-eighth embodiment configured as above, inflation gas is supplied to the upstream inflation portion 47 (rear-side inflation portion 131) in response to an impact from a side to a vehicle seat 12, and the upstream inflation portion 47 (rear-side inflation portion 131) starts to inflate. Before restraining an occupant during the inflation of the upstream inflation portion 47 (rear-side inflation portion 131), tension is applied to the dividing portion 50 in the vertical direction and in the lateral direction, whereby the dividing portion 50 acts to become tensed in a spherical shape bulging toward a downstream side (toward the downstream inflation portion 48 and the front-side inflation portion 132).

Since the dividing portion 50 has a sufficiently long dimension in the vertical direction compared to that in the lateral direction, in the dividing portion 50, stronger tension is more easily applied to the short direction (lateral direction) of the dimension L2 than in the long direction (vertical direction) of the dimension L1.

The opening 136 and the auxiliary openings 137 formed of the slits extending in the lateral direction with the dividing portion 50 in the tensed state are more forcefully pulled in a closing direction (lateral direction) than in an opening direction (vertical direction), and thereby close. The flow of the inflation gas from the upstream inflation portion 47 (rear-side inflation portion 131) to the downstream inflation portion 48 (front-side inflation portion 132) is restricted by these opening 136 and auxiliary openings 137. The inflation gas in the upstream inflation portion 47 (rear-side inflation portion 131) does not flow out through the opening 136 and the auxiliary openings 137, or only scarcely flows out even if it did. Therefore, an internal pressure of the upstream inflation portion 47 (rear-side inflation portion 131) increases, and the upstream inflation portion 47 (rear-side inflation portion 131) is deployed and inflated at a side of the occupant.

As above, the occupant is restrained by the upstream inflation portion 47 (rear-side inflation portion 131) of which internal pressure has been increased being pressed against the occupant. At such an occasion, the upstream inflation portion 47 (rear-side inflation portion 131) is pressed and deformed by the external force applied due to the occupant restraint. Accompanying this, the tension that has been applied strongly in the lateral direction on the dividing portion 50 is decreased. A difference in the tension between in the vertical direction and in the lateral direction becomes smaller, and it is easier for the opening 136 and the auxiliary openings 137 to open.

Since the opening 136 that has been specified as the specific opening is provided at the portion (center portion) with the largest external force applied due to the occupant restraint in the vertical direction by the upstream inflation portion 47 (rear-side inflation portion 131), the largest external force among the external force transmitted to the dividing portion 50 is transmitted to the opening 136 (specific opening). The tension that has been applied to the opening 136 (specific opening) in the lateral direction decreases by a large degree. The difference in the tension applied to the opening 136 (specific opening) between in the vertical direction and in the lateral direction further becomes smaller. It is even easier for the opening 136 (specific opening) to open, and a large amount of inflation gas flows out therefrom.

Further, since all of the auxiliary openings 137 are provided at the portions that are offset from the portion (center portion) with the largest external force applied due to the occupant restraint by the upstream inflation portion 47 in the vertical direction, the difference in the tension in the vertical direction and in the lateral direction does not become so small at the aforementioned portions (portions offset from the center portion). It is difficult for the auxiliary openings 137 to open, and the amount of inflation gas flowing out therefrom is not as great as with the opening 136.

Especially, among the auxiliary openings 137, ones positioned at the upper end and the lower end of the dividing portion 50 are more likely to approach and adhere to a wall portion (bag portion 135) of the downstream inflation portion 48 (front-side inflation portion 132) before being deployed and inflated than the other ones. Therefore, the respective auxiliary openings 137 at the upper end and the lower end come to be in a state of being closed by the bag portion 135, and it is difficult for the inflation gas to flow out.

By the opening 136 and the auxiliary openings 137 respectively opening from a midpoint of the occupant restraint, the outflow of the inflation gas through the opening 136 and the auxiliary openings 137 is possible. Compared to a case in which the auxiliary openings 137 are not provided and the inflation gas passes through only the opening 136, larger amount of inflation gas flows out from the upstream inflation portion 47 (rear-side inflation portion 131) to the downstream inflation portion 48 (front-side inflation portion 132) through the opening 136 and the auxiliary openings 137.

By this outflow, compared to the case in which the auxiliary openings 137 are not provided and the inflation gas passes through only the opening 136, the internal pressure of the upstream inflation portion 47 (rear-side inflation portion 131) decreases quickly, and an internal pressure of the downstream inflation portion 48 (front-side inflation portion 132) increases quickly. The downstream inflation portion 48 (front-side inflation portion 132) is deployed and inflated, and the inflation portion 46 restrains the occupant by the downstream inflation portion 48 (front-side inflation portion 132) as well in addition to the upstream inflation portion 47 (rear-side inflation portion 131).

The twenty-eighth embodiment achieves the following advantages.

(25) The outflow amount changing apparatus is provided, and the amount of the inflation gas flowing out from the upstream inflation portion 47 (rear-side inflation portion 131) upon the occupant restraint by the upstream inflation portion 47 (rear-side inflation portion 131) is changed to an outflow amount that is different from an outflow amount in the case of the inflation gas flowing only through the opening 136.

Therefore, by the change in the outflow amount (manner of outflow) of the inflation gas from the upstream inflation portion 47 (rear-side inflation portion 131), a speed by which the internal pressure of the upstream inflation portion 47 (rear-side inflation portion 131) decreases upon the occupant restraint is changed suitably for restraining and protecting the occupant P, and a performance to restrain and protect the occupant P by the airbag 40 is improved.

Figure 54:
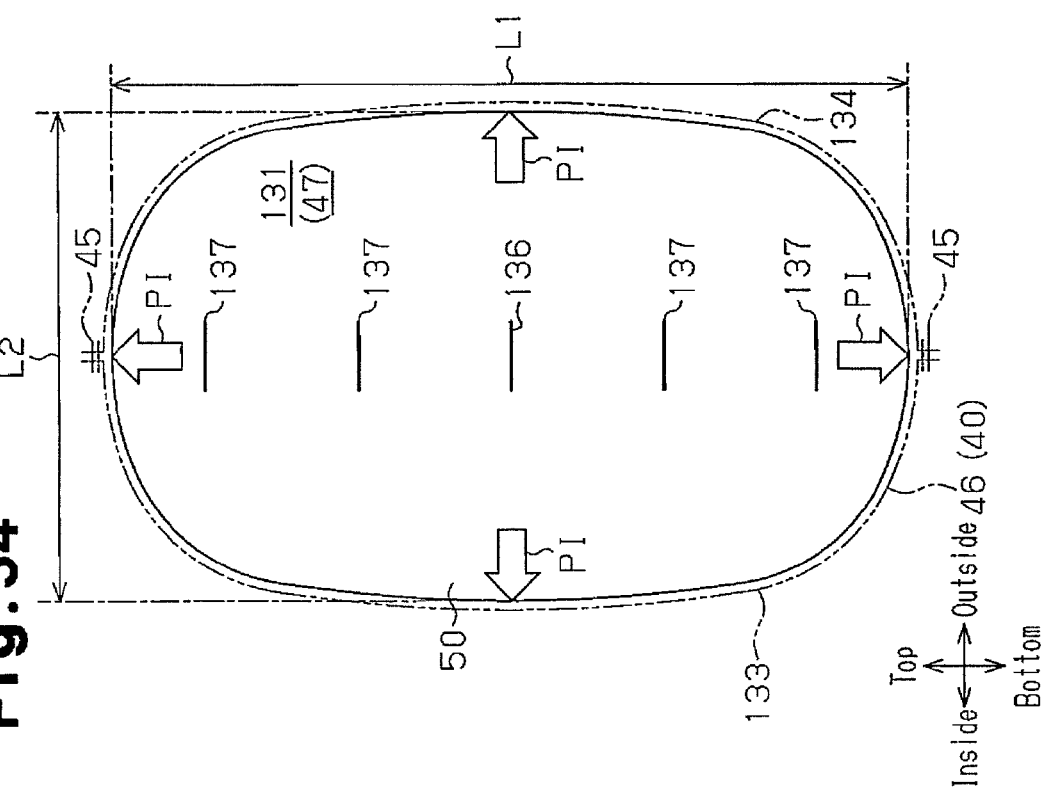
FIG. 54 is a rear view showing a state in which a dividing portion of the twenty-eighth embodiment is tensed.

(26) The opening 136 and the auxiliary openings 137 formed of the slits extending in the lateral direction with the dividing portion 50 in the tensed state are provided on the dividing portion 50, and the outflow amount changing apparatus is configured by the auxiliary openings 137 (FIG. 54).

Therefore, upon the occupant restraint by the upstream inflation portion 47 (rear-side inflation portion 131), a larger amount of the inflation gas can flow out from the upstream inflation portion 47 (rear-side inflation portion 131) to the downstream inflation portion 48 (front-side inflation portion 132) than in the case where only the opening 136 is provided. It is effective for a case in which larger amount of the inflation gas is caused to flow out upon the occupant restraint to desirably decrease the internal pressure of the upstream inflation portion 47 (rear-side inflation portion 131) and increase the internal pressure of the downstream inflation portion 48 (front-side inflation portion 132) at an early stage.

Figure 55:
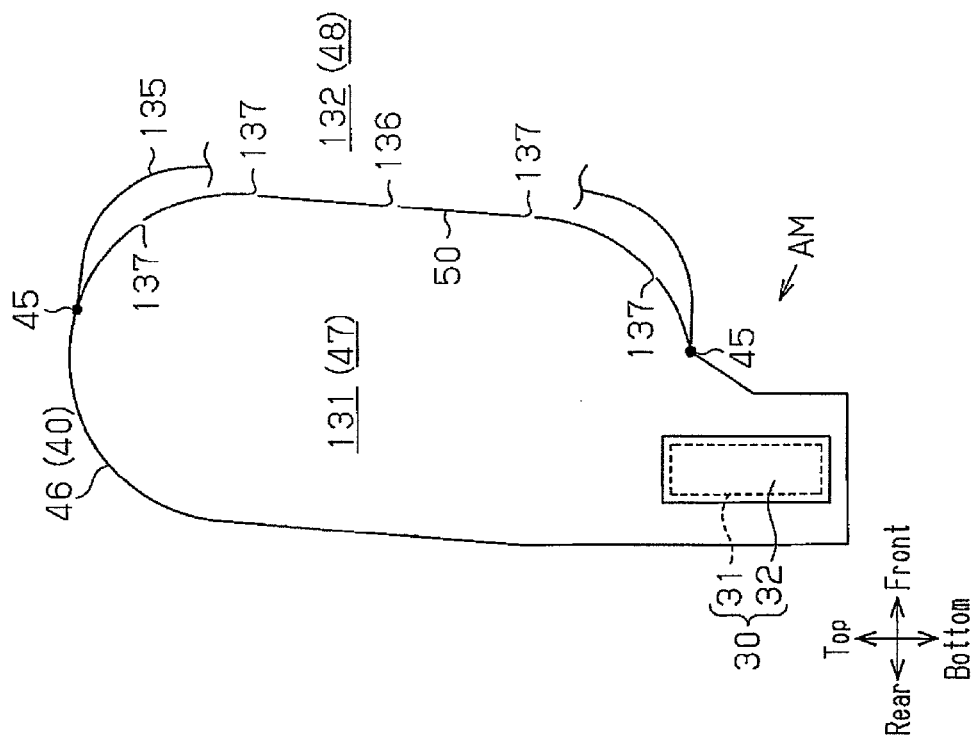
FIG. 55 is a partial cross-sectional side view schematically showing an internal structure of the airbag module having an upstream inflation portion inflated in the twenty-eighth embodiment.

(27) The opening 136 is specified as the specific opening, and is provided at the portion (center portion) with the largest external force applied due to the occupant restraint in the vertical direction by the upstream inflation portion 47 (rear-side inflation portion 131) (FIG. 54 and FIG. 55).

Therefore, the opening 136 (specific opening) is caused to open more easily, and even a larger amount of inflation gas can be caused to flow out. Compared to a case in which the opening 136 (specific opening) is not provided at the portion satisfying the above condition in the vertical direction, the internal pressure of the upstream inflation portion 47 (rear-side inflation portion 131) can quickly be decreased.

Thus, it is effective for a case in which the internal pressure of the upstream inflation portion 47 (rear-side inflation portion 131) is higher than a suitable value before the occupant restraint, and the inflation gas is desired to be flowed out at an early stage. As a circumstance in which the internal pressure of the upstream inflation portion 47 (rear-side inflation portion 131) is higher than the suitable value before the occupant restraint, for example a case in which a large type with much ejection amount of the inflation gas is used as the inflator 31 may be exemplified.

Modifications of the Twenty-Eighth Embodiment

The twenty-eighth embodiment may be modified as follows.

Dividing portions 50 may be provided at a plurality of positions in the inflation portion 46, and the inflation portion 46 may be divided into three or more chambers. In this case, the opening 136 is provided to each dividing portion 50, however, the auxiliary openings 137 may be provided in at least one of the dividing portions 50.

At least one of the opening 136 and the auxiliary openings 137 may be provided at a plurality of positions in the lateral direction.

Twenty-Ninth Embodiment

Next, a side airbag apparatus of the twenty-ninth embodiment will be described with reference to FIG. 56.

The twenty-ninth embodiment differs from the twenty-eighth embodiment in an arrangement manner of an opening 136 and auxiliary openings 137 in a dividing portion 50.

Specifically, for both the opening 136 and the auxiliary openings 137, they are provided at portions offset from a portion with the largest external force applied due to the occupant restraint in a vertical direction by an upstream inflation portion 47 (rear-side inflation portion 131). In the twenty-ninth embodiment, a center portion in the vertical direction is assumed as the portion where the largest external force is applied, and the opening 136 is provided at the portion that is offset upward from the center portion. Further, the auxiliary openings 137 are provided at two portions that are offset upward from the opening 136 and downward from the center portion. Further, two among the plurality of auxiliary openings 137 are arranged at an upper end and a lower end of the dividing portion 50. Further, the outflow amount changing apparatus is configured by the auxiliary openings 137.

The configurations other than the above are similar to the twenty-eighth embodiment. Therefore, elements identical to the twenty-eighth embodiment are given the same reference numerals, and redundant descriptions are omitted.

In the twenty-ninth embodiment configured as above, since all of the opening 136 and the auxiliary openings 137 are provided at the portions offset from the portion where the largest external force is applied due to the occupant restraint by the upstream inflation portion 47 in the vertical direction, it is difficult for the largest external force among the external force transmitted to the dividing portion 50 to be transmitted to the opening 136 and the auxiliary openings 137. The tension that has been applied to the opening 136 and the auxiliary openings 137 in a lateral direction decreases at a small degree. A difference in the tension applied to the opening 136 and the auxiliary openings 137 in the vertical direction and in the lateral direction does not become so small. It does not become so easy for the opening 136 and the auxiliary openings 137 to open, and inflation gas flowing out therefrom does not become large. Compared to a case in which all of the opening 136 and the auxiliary openings 137 are not provided at the portions satisfying the above condition in the vertical direction, the internal pressure of the upstream inflation portion 47 (rear-side inflation portion 131) decreases slowly.

Thus, the twenty-ninth embodiment achieves advantages as follows instead of (27) as above, in addition to the advantages of (25) and (26) as above.

(28) The opening 136 and the auxiliary openings 137 are provided at the portions offset from the portion where the largest external force is applied due to the occupant restraint by the upstream inflation portion 47 in the vertical direction.

Therefore, the difference in the tension between in the vertical direction and in the lateral direction is caused not to be so small, it is made difficult for the opening 136 and the auxiliary openings 137 to open, and the inflation gas flowing out therefrom can be made so as not to be so large.

Thus, it is effective for a case in which the internal pressure of the upstream inflation portion 47 before the occupant restraint is lower than a suitable value, and the inflation gas is desired to flow out slowly. As a circumstance in which the internal pressure of the upstream inflation portion 47 (rear-side inflation portion 131) before the occupant restraint is lower than the suitable value, for example, a case in which a small type inflator 31 with small ejection amount of the inflation gas is used may be exemplified.
Modifications of the Twenty-Ninth Embodiment The twenty-ninth embodiment may be modified as follows.

A plurality of at least one of the opening 136 and the auxiliary openings 137 may be provided in the lateral direction.

Thirtieth Embodiment

Figure 58:
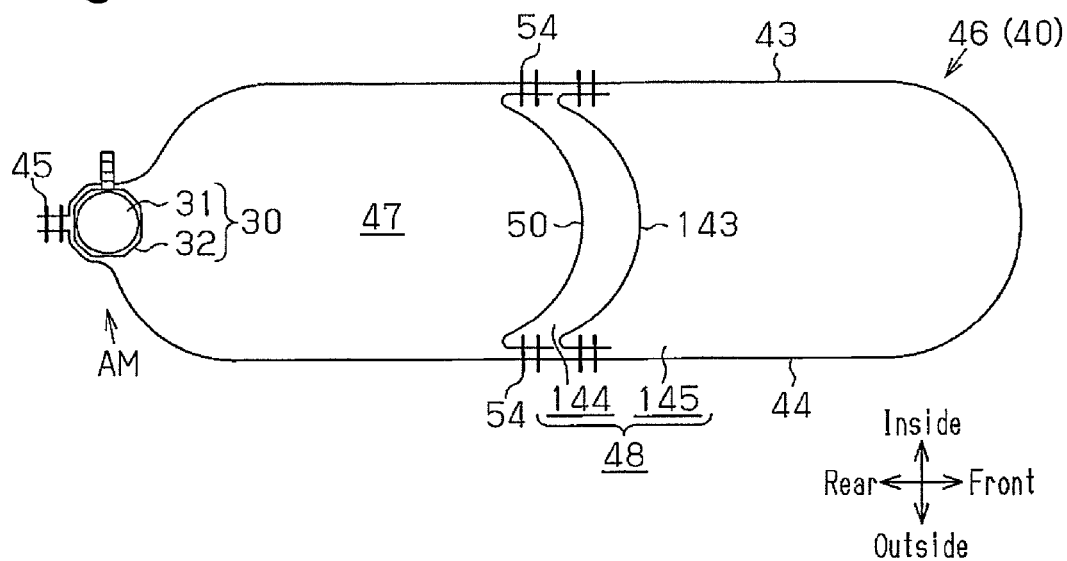
FIG. 58 is a cross-sectional plan view schematically showing an internal structure of the airbag module having both an upstream inflation portion and a downstream inflation portion inflated in the thirtieth embodiment.

Next, a side airbag apparatus of the thirtieth embodiment will be described with reference to FIG. 57 and FIG. 58.

In the thirtieth embodiment, an inflation portion 46 is divided by a dividing portion 50 into an upstream inflation portion 47 and a downstream inflation portion 48. When an airbag 40 is in a non-inflated and deployed state, the dividing portion 50 is overlapped in a lateral direction (vehicle widthwise direction) by being folded in half along a folding line 51 extending in a vertical direction (up and down direction).

In the dividing portion 50, an opening 142 formed of a slit extending in a lateral direction (vehicle widthwise direction) in a tensed state of the dividing portion 50. The opening 142 is provided in a state of crossing over the folding line 51 at a center portion in a lateral direction (vehicle widthwise direction).

Further, the downstream inflation portion 48 is divided into two inflation portions by an auxiliary dividing portion 143. In order to distinguish these inflation portions a portion adjacent to the upstream inflation portion 47 will be termed a primary downstream inflation portion 144, and a portion not adjacent thereto will be termed a secondary downstream inflation portion 145. When the airbag 40 is in a non-inflated and deployed state, the auxiliary dividing portion 143 is overlapped in the lateral direction (vehicle widthwise direction) by being folded in half along a folding line 146 extending in the vertical direction (up and down direction).

In the auxiliary dividing portion 143, an auxiliary opening 147 configured by a slit extending in the lateral direction (vehicle widthwise direction) in a tensed state of the auxiliary dividing portion 143 is provided. The auxiliary opening 147 is provided in a state of crossing over the folding line 146 at a center portion in the lateral direction (vehicle widthwise direction). Further, the auxiliary opening 147 is provided at a portion that is offset from a portion that is downstream in a flowing direction of inflation gas flowing through the opening 142 in regards to the vertical direction (up and down direction), that is, at a higher portion than the opening 142 in this case.

Further, the outflow amount changing apparatus is configured by the auxiliary dividing portion 143 and the auxiliary opening 147.

The configurations other than the above are similar to the twenty-eighth embodiment. Therefore, elements identical to the twenty-eighth embodiment are given the same reference numerals, and redundant descriptions are omitted.

In the thirtieth embodiment configured as above, when the inflation gas is supplied to the upstream inflation portion 47 in response to the impact from the side to a vehicle seat 12, an internal pressure of the upstream inflation portion 47 increases, and the upstream inflation portion 47 is deployed and inflated at a side of the occupant. The upstream inflation portion 47 is pressed against the occupant, whereby the occupant is restrained, and an impact from a side applied to the occupant is reduced by the upstream inflation portion 47.

At this time, the inflation gas in the upstream inflation portion 47 flowing out to the primary downstream inflation portion 144 is restricted by the dividing portion 50 and the opening 142. Further, the inflation gas flowing out from the primary downstream inflation portion 144 to the secondary downstream inflation portion 145 is restricted by the auxiliary dividing portion 143 and the auxiliary opening 147. Thus, both the inflation gas that flows out from the upstream inflation portion 47 to the primary downstream inflation portion 144 and the inflation gas that flows out from the primary downstream inflation portion 144 to the secondary downstream inflation portion 145 are scarce. As a result, the inflation gas that flows out from the upstream inflation portion 47 to the secondary downstream inflation portion 145 is scarce.

Upon the occupant restraint by the upstream inflation portion 47, since the internal pressure of the upstream inflation portion 47 increases by the external force applied due to the restraint, it is easy for the inflation gas in the upstream inflation portion 47 to flow out to the primary downstream inflation portion 144 through the opening 142. Further, it is easy for the inflation gas in the primary downstream inflation portion 144 to flow out to the secondary downstream inflation portion 145 through the auxiliary opening 147.

Thus, upon the occupant restraint by the upstream inflation portion 47, the inflation gas that flows out from the upstream inflation portion 47 to the secondary downstream inflation portion 145 is decreased due to the addition of the restriction on the flow of the inflation gas by the auxiliary dividing portion 143 and the auxiliary opening 147. Compared to a case in which the auxiliary dividing portion 143 and the auxiliary opening 147 are not provided and the inflation gas passes through only the opening 142, the internal pressure of the upstream inflation portion 47 decreases slowly.

Further, at a section that is to be on the downstream side in the flowing direction of inflation gas flowing through the opening 142 of the dividing portion 50, a section in the auxiliary dividing portion 143 where the auxiliary opening 147 is not provided is positioned thereat. Therefore, the auxiliary dividing portion 143 becomes a resistance for the inflation gas that has flowed out from the upstream inflation portion 47 to the primary downstream inflation portion 144 through the opening 142 of the dividing portion 50. The inflation gas that has flowed out through the opening 142 changes its flowing direction by colliding with the auxiliary dividing portion 143. After having flowed along the auxiliary dividing portion 143, the inflation gas flows out to the secondary downstream inflation portion 145 through the auxiliary opening 147. Thus, compared to a case in which the auxiliary opening 147 is provided at the section that is to be the downstream side in the flowing direction of inflation gas flowing through the opening 142 in the auxiliary dividing portion 143, it is difficult for the inflation gas to flow out through the auxiliary opening 147. As a result, the inflation gas flowing out from the upstream inflation portion 47 to the secondary downstream inflation portion 145 is further decreased. Further, the internal pressure of the upstream inflation portion 47 decreases even more slowly.

Thus, the thirtieth embodiment achieves advantages as follows in addition to the advantage of (25) as above.

(29) The auxiliary dividing portion 143, which divides the inside of the downstream inflation portion 48 into the primary downstream inflation portion 144 and the secondary downstream inflation portion 145, and the auxiliary opening 147 provided in the auxiliary dividing portion 143 configure the outflow amount changing apparatus.

Therefore, with the addition of the flow restriction on the inflation gas by the auxiliary dividing portion 143 and the auxiliary opening 147, the inflation gas flowing out from the upstream inflation portion 47 to the secondary downstream inflation portion 145 can be made less.

(30) The auxiliary opening 147 is provided at the portion that is offset from the portion that is on the front side in the flowing direction of inflation gas flowing in the opening 142 of the dividing portion 50 in the auxiliary dividing portion 143.

Therefore, the inflation gas is caused more unlikely to flow out through the auxiliary opening 147, and the inflation gas flowing out from the upstream inflation portion 47 to the secondary downstream inflation portion 145 can be made even less.

Modifications of the Thirtieth Embodiment

The thirtieth embodiment may be modified as follows.

The auxiliary opening 147 may be provided at a section that is on the downstream side in the flowing direction of inflation gas flowing through the opening 142 of the dividing portion 50 in the auxiliary dividing portion 143. Even in this case, the flow restriction on the inflation gas by the auxiliary dividing portion 143 and the auxiliary opening 147 is applied to some extent. Therefore, the effect of decreasing the inflation gas flowing out from the upstream inflation portion 47 to the secondary downstream inflation portion 145 is achieved.

A plurality of the auxiliary dividing portions 143 having the auxiliary opening 147 (combinations of the auxiliary opening 147 and the auxiliary dividing portion 143) may be provided in the downstream inflation portion 48. In this case, if the auxiliary opening 147 of the auxiliary dividing portion 143 positioned on a downstream side is provided at a portion offset from a portion that is on the downstream side in the flowing direction of inflation gas flowing in the auxiliary opening 147 of the auxiliary dividing portion 143 on an upstream side, the inflation gas flowing out from the upstream inflation portion 47 can further be decreased.

Thirty-First Embodiment

Figure 59:
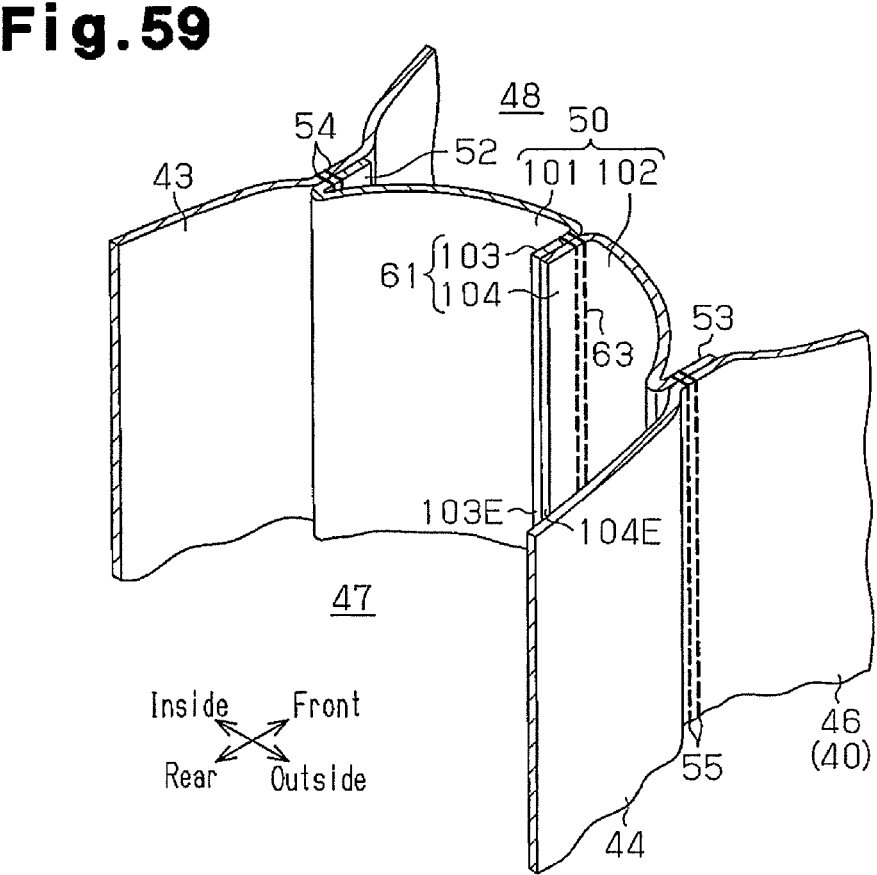
FIG. 59 is a partial perspective view showing a state in which a dividing portion is tensed in a side airbag apparatus of a thirty-first embodiment.

Next, a side airbag apparatus of the thirty-first embodiment will be described with reference to FIG. 59 and FIGS. 60A and 60B.

In the thirty-first embodiment, an inflation portion 46 is divided by a dividing portion 50 into an upstream inflation portion 47 and a downstream inflation portion 48. The dividing portion 50 is configured by a pair of fabric portions (inner fabric portion 101, and outer fabric portion 102) arranged in a lateral direction (vehicle widthwise direction). The dividing portion 50 configures a part of a wall portion of the upstream inflation portion 47.

In both fabric portions 101, 102, ends 103, 104 are overlapped in a narrow band shape in a vertical direction (up and down direction) in a state in which end edges 103E, 104E of these ends 103, 104 being made to match. The two fabric portions 101, 102 are connected by a second joining portion 63 provided at a boundary portion of a band-shaped overlap portion 61 and other portions (non-overlap portion). The second joining portion 63 is configured by a plurality of joining portions 148 provided at sections separated from one another in the vertical direction (up and down direction), and the two ends 103, 104 are intermittently connected by these joining portions 148. As shown in FIG. 60A, the second joining portion 63 is formed by sewing opposite ends 103, 104 by sewing threads, that is, by interlacing a needle thread 149 and a bobbin thread 150.

By this second joining portion 63, passages 151 through which inflation gas flows is provided between adjacent joining portions 148 in the second joining portion 63 between the two ends 103, 104. More specifically, the joining portions 148 are configured by interlacing portions where the needle thread 149 and the bobbin thread 150 are interlaced. Further, the passages 151 are configured between the adjacent joining portions 148 (portion K shown by hatching in FIGS. 60A and 60B). The upstream inflation portion 47 and the downstream inflation portion 48 are communicated through the plurality of passages 151.

A cross-sectional shape of each portion K changes according to a filled state of the inflation gas in the upstream inflation portion 47. The cross-sectional shape of each portion K is thus flat as shown in FIG. 60A when the inflation gas is not filled in the upstream inflation portion 47, and each passage 151 comes to be in a closed state. In FIG. 60A, the relationship of the ends 103, 104, the needle thread 149, the bobbin thread 150, and the like is depicted schematically. In fact, the ends 103, 104 are in a state of making tight contact with each other or in a state similar thereto. Contrary to this, when the inflation gas is filled in the upstream inflation portion 47, the cross-sectional shape of the portions K is thus substantially round as shown in FIG. 60B, and each passage 151 comes to be in an opened state.

A passage area of the passages 151 depends on an interval between joining portions 148 (interlaced portions) (stitch length: pitch P1). The passage area becomes smaller as the pitch P1 becomes shorter, and an ability to discharge inflation gas is lost when the pitch P1 becomes excessively short. To the contrary, the passage area becomes larger as the pitch P1 becomes longer, and the ability to discharge the inflation gas becomes higher, whereas the strength to connect opposite ends 103, 104 (connecting strength) decreases. Therefore, in setting the pitch P1, it is desired to be set to a value by which the discharging ability of the inflation gas G and the connecting strength can both be satisfied.

Further, the passage area of the passages 151 is influenced also by a tensile strength of at least one of the needle thread 149 and the bobbin thread 150. In a case with stitches with high tensile strength, the passage area of the passages 151 tends to be small.

One of the plurality of passages configures an opening 152, and the remainder configures auxiliary openings 153.

Further, the outflow amount changing apparatus is configured by these auxiliary openings 153.

The configurations other than the above are similar to the twenty-eighth embodiment. Therefore, elements identical to the twenty-eighth embodiment are given the same reference numerals, and redundant descriptions are omitted.

In the thirty-first embodiment configured as above, when the inflation gas is supplied to the upstream inflation portion 47 in response to an impact from a side to a vehicle seat 12, an internal pressure of the upstream inflation portion 47 rises and the upstream inflation portion 47 is deployed and inflated at a side of an occupant. Accompanying this, the dividing portion 50 comes to be in a tensed state. At this time, the inflation gas spreads open opposite ends 103, 104 at the passages 151 (opening 152 and auxiliary openings 153). The opening 152 and the respective auxiliary openings 153 are opened. In addition to the opening 152, the auxiliary openings 153 configured between the adjacent joining portions 148 function as passages for the inflation gas in the upstream inflation portion 47 to flow out to the downstream inflation portion 48. Therefore, a part of the inflation gas in the upstream inflation portion 47 is capable of flowing out to the downstream inflation portion 48 through the opening 152 and the auxiliary openings 153 despite being before an occupant restraint. However, before the occupant restraint, since the internal pressure of the upstream inflation portion 47 is not as high as during the occupant restraint, the inflation gas that flows out from the upstream inflation portion 47 through the opening 152 and the auxiliary openings 153 is scarce.

Then, the upstream inflation portion 47 of which internal pressure has been increased is pressed against the occupant, whereby the occupant is restrained, and the impact from a side transmitted to the occupant is reduced by the upstream inflation portion 47.

Upon the occupant restraint by the upstream inflation portion 47, since the internal pressure of the upstream inflation portion 47 increases by the external force applied due to the restraint, it is easy for the inflation gas in the upstream inflation portion 47 to flow out to the downstream inflation portion 48 through the opening 152 and the auxiliary opening 153. For the addition of the outflow of the inflation gas by the auxiliary openings 153, the inflation gas flowing out from the upstream inflation portion 47 increases.

By the outflow of the inflation gas from the upstream inflation portion 47 to the downstream inflation portion 48, the internal pressure of the upstream inflation portion 47 decreases, and an internal pressure of the downstream inflation portion 48 increases. At this time, compared to a case in which the auxiliary openings 153 are not provided, the internal pressure of the upstream inflation portion 47 decreases quickly. The downstream inflation portion 48 is deployed and inflated, and the inflation portion starts to restrain the occupant not only at the upstream inflation portion 47 but also at the downstream inflation portion 48.

Thus, the thirty-first embodiment achieves advantages as follows in addition to the advantage of (25) as above.

(31) The dividing portion 50 that divides the inflation portion 46 into the upstream inflation portion 47 and the downstream inflation portion 48 is configured by the pair of fabric portions (inner fabric portion 101 and outer fabric portion 102). The inner fabric portion 101 and the outer fabric portion 102 are intermittently connected by the plurality of joining portions 148 provided at the portions apart from each other in the vertical direction (up and down direction). Each interval between the pair of overlap portions 61 and between the adjacent joining portions 148 is configured as the passage for the inflation gas. One of such passages is configured as the opening 152, and the remainder thereof are configured as the auxiliary openings 153. Further, these auxiliary openings 153 configure the outflow amount changing apparatus.

Therefore, with the addition of the outflow of the inflation gas through the auxiliary openings 153 upon the occupant restraint by the upstream inflation portion 47, the inflation gas flowing out from the upstream inflation portion 47 can be increased.

Modifications of the Thirty-First Embodiment

The thirty-first embodiment may be modified as follows.

The second joining portion 63 may be formed by intermittently adhering the two fabric portions 101, 102 instead of sewing. In this case, adhering portions by the adhesive in the pairs of overlap portions 61 are the joining portion 148.

The inflation portion 46 does not necessarily need to be divided by the dividing portion 50, that is, may be configured by one chamber. In this case, a part of a wall portion of the inflation portion 46 is configured by the inner fabric portion 43 and the outer fabric portion 44, as well as the inner fabric portion 101 and the outer fabric portion 102. Further, the inner fabric portion 101 and the outer fabric portion 102 are connected to the inner fabric portion 43 and the outer fabric portion 44 by first joining portions provided at a peripheral portion thereof.

A plurality of dividing portions 50 may be provided in the inflation portion 46, and each dividing portion 50 may be provided with the opening 152 and the auxiliary openings 153.

The dividing portion 50 configuring a part of the wall portion of the upstream inflation portion 47 may be configured by three or more fabric portions arranged in the lateral direction (vehicle widthwise direction). In this case, the adjacent fabric portions in the dividing portion are intermittently connected by a plurality of joining portions provided at portions separated from one another.

Thirty-Second Embodiment

Figure 62:
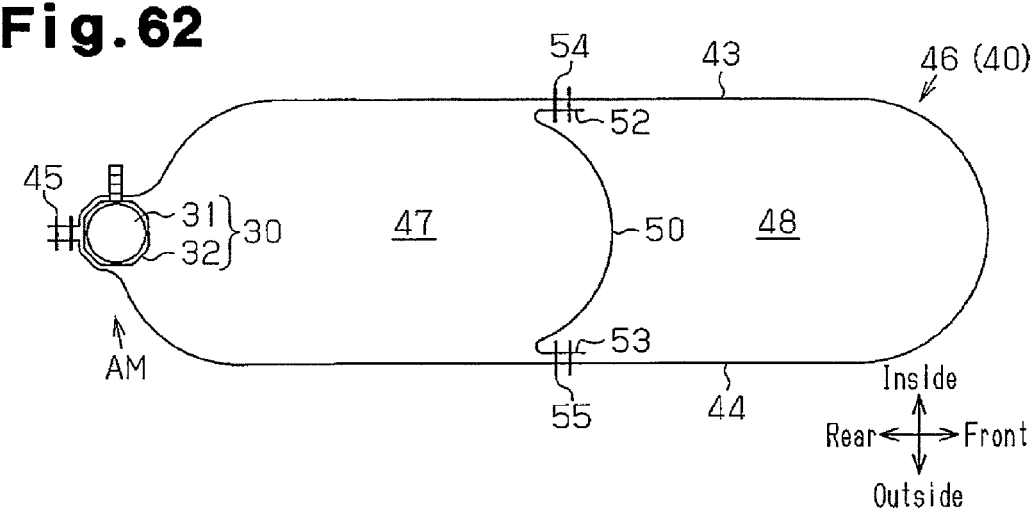
FIG. 62 is a cross-sectional plan view schematically showing a joining portion of a dividing portion with an airbag by a first joining portion in the airbag module in which an inflation portion is deployed and inflated in the thirty-second embodiment.

Next, a side airbag apparatus of the thirty-second embodiment will be described with reference to FIG. 61 to FIG. 63.

In the thirty-second embodiment, an inflation portion 46 is divided by a dividing portion 50 into an upstream inflation portion 47 and a downstream inflation portion 48. When an airbag 40 is in a non-inflated and deployed state, the dividing portion 50 is overlapped in a lateral direction (vehicle widthwise direction) by being folded in half along a folding line 51 extending in a vertical direction (up and down direction). The dividing portion 50 in this state is arranged in the upstream inflation portion 47 in a state in which the folding line 51 is positioned on an upstream side of an inner end 52 and an outer end 53. The inner end 52 of the dividing portion 50 is connected to an inner fabric portion 43 of the airbag 40 by the first joining portion 54 extending in a substantially up and down direction. Further, the outer end 53 of the dividing portion 50 is connected to an outer fabric portion 44 of the airbag 40 by the first joining portion 55 extending in the substantially up and down direction.

The dividing portion 50 is bridged between the inner fabric portion 43 and the outer fabric portion 44 by the above connections. The dividing portion 50 comes to be in the state of being folded in half when the airbag 40 comes to be in a non-inflated and deployed state (see FIG. 61). Further, the dividing portion 50 comes to be in a state of being tensed in a lateral direction (vehicle widthwise direction) when the inflation portion 46 is deployed and inflated (see FIG. 62), and restricts inflation thickness of the inflation portion 46 in the aforementioned direction.

A part (rear half) of the inner fabric portion 43, a part (rear half) of the outer fabric portion 44, and the dividing portion 50 configure a wall portion of the upstream inflation portion 47.

Accordingly, a part of the wall portion of the upstream inflation portion 47 (dividing portion 50) is formed by a different member from the remainder (inner fabric portion 43 and outer fabric portion 44). The part of the wall portion (dividing portion 50) is connected to the remainder (inner fabric portion 43 and outer fabric portion 44) by the first joining portions 54, 55 provided in the peripheral portion thereof.

Figure 63:
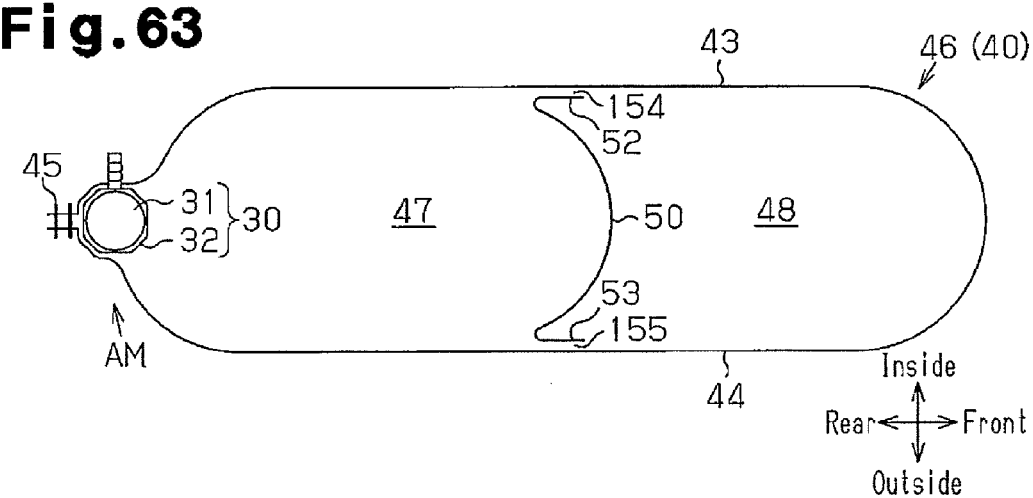
FIG. 63 is a cross-sectional plan view schematically showing an opening and an auxiliary opening in the airbag module in which the inflation portion is deployed and inflated in the thirty-second embodiment.

As shown in FIG. 61 and FIG. 63, the first joining portion 54 is released of its connection at a part thereof. In other words, at a part of the dividing portion 50 in a vertical direction (up and down direction), the first joining portion 54 that connects the dividing portion 50 to the inner fabric portion 43 is not provided. Accordingly, the part where the first joining portion 54 is not provided, which is a portion where the connection is cancelled, configures a slit-shaped opening 154 extending in the vertical direction (up and down direction).

Further, the first joining portion 55 is released of its connection at a part thereof. In other words, at a part of the dividing portion 50 in the vertical direction (up and down direction), the first joining portion 55 that connects the dividing portion 50 to the outer fabric portion 44 is not provided. Accordingly, the part where the first joining portion 55 is not provided, which is a portion where the connection is cancelled, configures a slit-shaped auxiliary opening 155 extending in the vertical direction (up and down direction). The outflow amount changing apparatus is configured by the auxiliary opening 155.

The opening 154 and the auxiliary opening 155 are desirably provided at portions where an external force is not applied due to a restraint upon the occupant restraint, or at portions that are not likely to receive an external force. This is to avoid difficulty in opening the opening 154 and the auxiliary opening 155 due to the external force.

The configurations other than the above are similar to the twenty-eighth embodiment. Therefore, elements identical to the twenty-eighth embodiment are given the same reference numerals, and redundant descriptions are omitted.

In the thirty-second embodiment configured as above, the opening 154 and the auxiliary opening 155 both function as passages for inflation gas in the upstream inflation portion 47 to flow out to the downstream inflation portion 48.

When the inflation gas is supplied to the upstream inflation portion 47 in response to an impact from a side to a vehicle seat 12, an internal pressure of the upstream inflation portion 47 rises and the upstream inflation portion 47 is deployed and inflated at a side of an occupant. Accordingly, the dividing portion 50 comes to be in a tensed state that curves to bulge toward the downstream inflation portion 48. The opening 154 and the auxiliary opening 155 function as the passages for inflation gas in the upstream inflation portion 47 to flow out to the downstream inflation portion 48. Therefore, a part of the inflation gas in the upstream inflation portion 47 is capable of flowing out through the opening 154 and the auxiliary opening 155 despite being before the occupant restraint. However, before the occupant restraint, since the internal pressure of the upstream inflation portion 47 is not so high as during the occupant restraint, the inflation gas that flows out from the upstream inflation portion 47 through the opening 154 and the auxiliary opening 155 is scarce.

Then, the upstream inflation portion 47 of which internal pressure has been increased is pressed against the occupant, whereby the occupant is restrained, and the impact from a side transmitted to the occupant is reduced by the upstream inflation portion 47.

Upon the occupant restraint by the upstream inflation portion 47, since the internal pressure of the upstream inflation portion 47 increases by the external force applied due to the restraint, it is easy for the inflation gas in the upstream inflation portion 47 to flow out to the downstream inflation portion 48 through the opening 154 and the auxiliary opening 155. Upon the occupant restraint, for the addition of the outflow of the inflation gas by the auxiliary opening 155, the inflation gas flowing out from the upstream inflation portion 47 increases. Compared to a case in which the auxiliary opening 155 is not provided, the internal pressure of the upstream inflation portion 47 decreases quickly.

Thus, the thirty-second embodiment achieves advantages as follows in addition to the advantage of (25) as above.

(32) In those in which the dividing portion 50 is connected to the outer fabric portion 44 of the airbag 40 by the first joining portion 55, the auxiliary opening 155 is provided by cancelling the connection of the dividing portion 50 to the outer fabric portion 44 at a part of the first joining portion 55, and the auxiliary opening 155 is configured as the outflow amount changing apparatus.

Therefore, the inflation gas in the upstream inflation portion 47 can be caused to flow out to the downstream inflation portion 48 through the auxiliary opening 155 from before the occupant restraint by the upstream inflation portion 47.

Further, with the addition of the outflow of the inflation gas through the auxiliary opening 155 upon the occupant restraint by the upstream inflation portion 47, the inflation gas flowing out from the upstream inflation portion 47 can be increased.

Modifications of the Thirty-Second Embodiment

The thirty-second embodiment may be modified as follows.

The inflation portion 46 does not necessarily need to be divided by the dividing portion 50, that is, may be configured by one chamber. In this case, the wall portion of the inflation portion 46 is configured by the inner fabric portion 43 and the outer fabric portion 44.

However, a part of the wall portion (inner fabric portion 43 and outer fabric portion 44) is formed of a different member from the remainder of the wall portion. The aforementioned part is connected to the remainder of the wall portion by the first joining portion provided in the peripheral portion of the part. Further, the first joining portion is released of its connection at a part thereof.

Thirty-Third Embodiment

Figure 64:
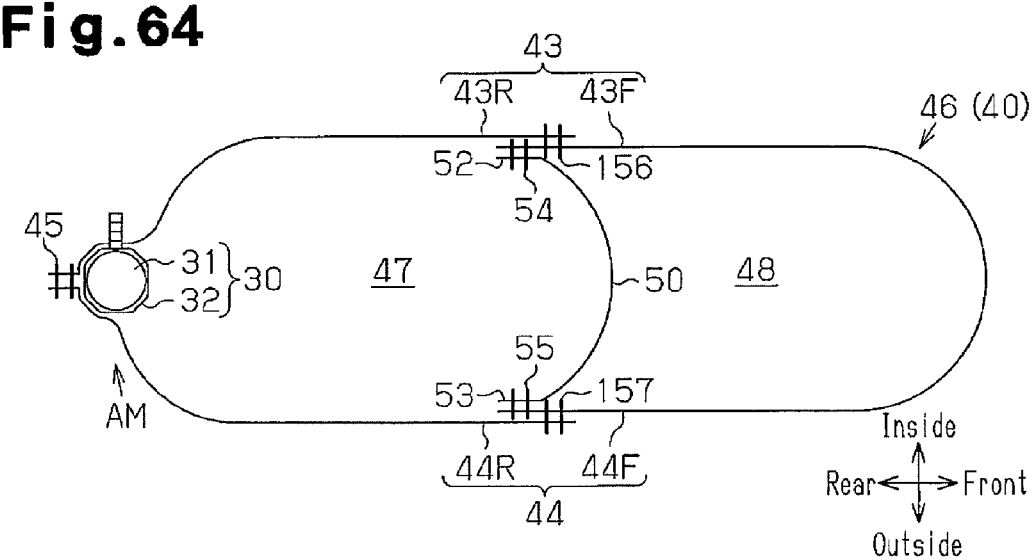
FIG. 64 is a cross-sectional plan view of a side airbag apparatus of a thirty-third embodiment, showing a schematic configuration of an inside of an airbag module with an inflation portion inflated.

Next, a side airbag apparatus of the thirty-third embodiment will be described with reference to FIG. 64.

The thirty-third embodiment differs from the thirty-second embodiment in regards to a configuration of an inflation portion 46. An inner fabric portion 43 is configured by a rear-side inner fabric portion 43R, and a front-side inner fabric portion 43F positioned on a front side thereof. A rear end of the front-side inner fabric portion 43F is overlapped from an inner side (lower side in FIG. 64) to a front end of the rear-side inner fabric portion 43R, and is connected to the rear-side inner fabric portion 43R by a joining portion 156.

Further, an outer fabric portion 44 is configured by a rear-side outer fabric portion 44R, and a front-side outer fabric portion 44F positioned on the front side thereof. A rear end of the front-side outer fabric portion 44F is overlapped from the inner side (upper side in FIG. 64) to a front end of the rear-side outer fabric portion 44R, and is connected to the rear-side outer fabric portion 44R by a joining portion 157.

A dividing portion 50 that divides the inflation portion 46 into an upstream inflation portion 47 and a downstream inflation portion 48 is arranged between the front-side inner fabric portion 43F and the front-side outer fabric portion 44F. An inner end 52 of the dividing portion 50 is connected to the rear end of the front-side inner fabric portion 43F by a first joining portion 54 at a location further back from the joining portion 156. An outer end 53 of the dividing portion 50 is connected to the rear end of the front-side outer fabric portion 44F by a first joining portion 55 at a location further back from the joining portion 157.

Although not shown, an opening 154 being formed by a part of the first joining portion 54 being released of its connection, and an auxiliary opening 155 being formed by a part of the first joining portion 55 being released of its connection are similar to the aforementioned thirty-second embodiment. An outflow amount changing apparatus being configured by the auxiliary opening 155 is also similar to the aforementioned thirty-second embodiment. See FIG. 63.

The configurations other than the above are similar to the thirty-second embodiment. Therefore, elements identical to the thirty-second embodiment are given the same reference numerals, and redundant descriptions are omitted.

The thirty-third embodiment achieves advantages similar to those of the thirty-second embodiment. Other than that, the following advantages are expected.

As a method to connect the rear-side inner fabric portion 43R and the front-side inner fabric portion 43F, and to connect the inner end 52 of the dividing portion 50 to the front-side inner fabric portion 43F, it may be assumed to connect the rear-side inner fabric portion 43R, the front-side inner fabric portion 43F, and the inner end 52 of the dividing portion 50 by a common joining portion, for example, by the first joining portion 54.

However, a part of the first joining portion 54 is released of its connection. Therefore, not being limited to the portion (opening 154) where the connection is cancelled is formed between the front-side inner fabric portion 43F and the inner end 52 of the dividing portion 50, a portion where the connection is cancelled is formed between the front-side inner fabric portion 43F and the rear-side inner fabric portion 43R as well. As a result, a part of the inflation gas in the upstream inflation portion 47 flows out to outside the inflation portion 46 from the portion where the connection is cancelled between the front-side inner fabric portion 43F and the rear-side inner fabric portion 43R.

In regards to this aspect, in the thirty-third embodiment, the front-side inner fabric portion 43F and the rear-side inner fabric portion 43R are connected to each other by another joining portion 156 that is different from the first joining portion 54 connecting the inner end 52 of the dividing portion 50 to the front-side inner fabric portion 43F. The joining portion 156 is not provided with a portion where the connection is cancelled. Therefore, an occasion by which a part of the inflation gas in the upstream inflation portion 47 flows out to the outside of the inflation portion 46 from between the front-side inner fabric portion 43F and the rear-side inner fabric portion 43R is not likely to occur.

Similarly, in the thirty-third embodiment, the front-side outer fabric portion 44F and the rear-side outer fabric portion 44R are connected to each other by another joining portion 157 that is different from the first joining portion 55 connecting the outer end 53 of the dividing portion 50 to the front-side outer fabric portion 44F. The joining portion 157 is not provided with a portion where the connection is cancelled. Therefore, an occasion by which a part of the inflation gas in the upstream inflation portion 47 flows out to the outside of the inflation portion 46 from between the front-side outer fabric portion 44F and the rear-side outer fabric portion 44R is not likely to occur.

Thirty-Fourth Embodiment

Next, a side airbag apparatus of the thirty-fourth embodiment will be described with reference to FIGS. 65A and 65B.

In the thirty-fourth embodiment, as a woven fabric 124, one that has a gap portion 125 (opening) that is enlarged from before an occupant restraint by an upstream inflation portion 47 is used, and a dividing portion 50 is formed by this woven fabric 124. Differing from the twenty-sixth embodiment as above, in the woven fabric 124, a woven state of warps 122 and wefts 123 does not change drastically (stitches are not displaced significantly) even if a pressure is applied, and a size of gap portions 125 does not undergo much change. Further, a pre-restraint flowing out apparatus that causes inflation gas to start flowing out from the upstream inflation portion 47 before the occupant restraint by the upstream inflation portion 47 is configured by gap portions 125.

Figure 65A:
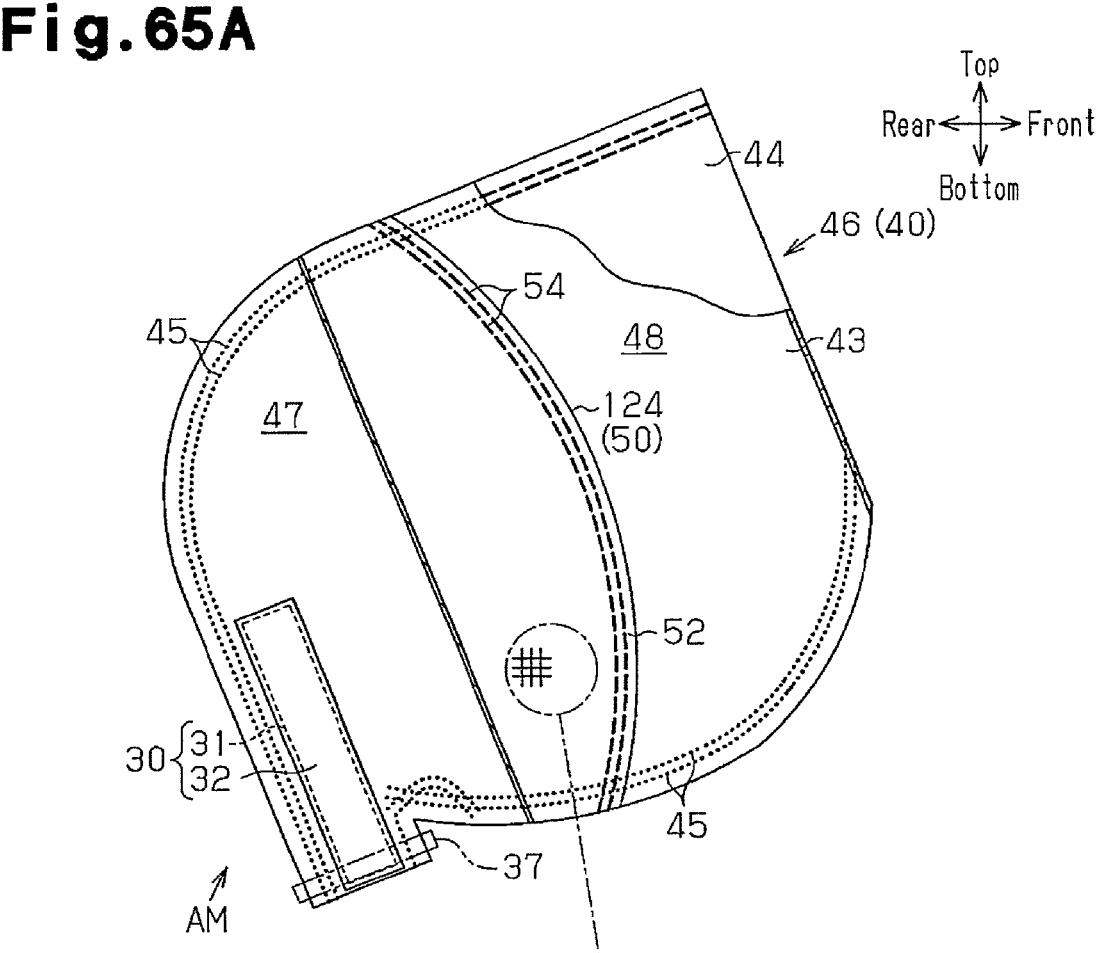
FIGS. 65A, 65B are diagrams showing a side airbag apparatus of a thirty-fourth embodiment, where
Figure 65B:
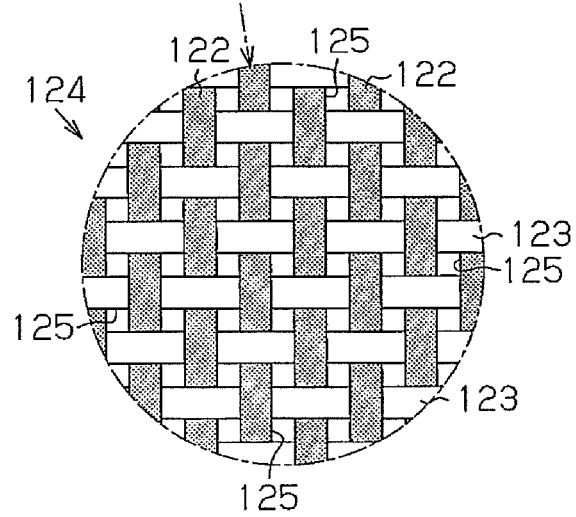

In FIG. 65A, in order to illustrate an inner fabric portion 43 as well, a large part of an outer fabric portion 44 is illustrated in a state of being cut away.

The configurations other than the above are similar to the twenty-sixth embodiment. Therefore, elements identical to the twenty-sixth embodiment are given the same reference numerals, and redundant descriptions are omitted.

In the thirty-fourth embodiment configured as above, when the inflation gas is supplied to the upstream inflation portion 47 in response to an impact from a side to a vehicle seat 12, an internal pressure of the upstream inflation portion 47 rises and the upstream inflation portion 47 is deployed and inflated at a side of an occupant. The dividing portion 50 is pulled by the inner fabric portion 43 and the outer fabric portion 44 of an airbag 40, and comes to be in a tensed state. In the woven fabric 124 that forms the dividing portion 50, the plurality of gap portions 125 formed between pairs of adjacent warps 122 and pairs of adjacent wefts 123 respectively function as openings. Despite being before the occupant restraint by the upstream inflation portion 47, the inflation gas in the upstream inflation portion 47 starts to flow out to a downstream inflation portion 48 through the plurality of gap portions 125 (openings) of the dividing portion 50. This timing of the outflow is earlier than that of cases in which the openings are closed before the occupant restraint by the upstream inflation portion 47. An internal pressure of the upstream inflation portion 47 becomes low due to the outflow of the inflation gas.

However, since the internal pressure of the upstream inflation portion 47 at this time is not as high as during the occupant restraint, the inflation gas passing through the gap portions 125 (openings) is not sufficiently ample. Therefore, the upstream inflation portion 47 of which internal pressure has been decreased for the outflow of the inflation gas is pressed against the occupant, whereby the occupant is restrained, and the impact from a side transmitted to the occupant through the body side portion 11 is reduced.

Upon the occupant restraint by the upstream inflation portion 47, the internal pressure of the upstream inflation portion 47 increases by the external force applied due to the restraint more than before the occupant restraint. Therefore, the inflation gas in the upstream inflation portion 47 starts to flow out through the gap portions 125 (openings) by a larger amount than that before the occupant restraint.

The thirty-fourth embodiment achieves the following advantages.

(33) The pre-restraint flowing out apparatus is provided, and the inflation gas is caused to start flowing out from the upstream inflation portion 47 before the occupant restraint by the upstream inflation portion 47.

Therefore, by setting the outflow starting time of the inflation gas (manner of outflow) from the upstream inflation portion 47 to be before the occupant restraint, the internal pressure of the upstream inflation portion 47 is changed to be suitable for restraining and protecting the occupant P, and a performance to restrain and protect the occupant P by the airbag 40 is increased.

(34) The dividing portion 50 is formed by the woven fabric 124, which is configured by interlacing the warps 122 and the wefts 123 in directions that are orthogonal to each other. From before the occupant restraint by the upstream inflation portion 47, in the woven fabric 124, the openings and the pre-restraint flowing out apparatus are configured by the gap portions 125 formed between the pairs of adjacent warps 122 and the pairs of adjacent wefts 123.

Therefore, from before the occupant restraint by the upstream inflation portion 47, the inflation gas in the upstream inflation portion 47 can be caused to start flowing to the downstream inflation portion 48 through the gap portions 125. It is thus possible to cope with a case in which the protection performance of the occupant is desired to be increased by increasing an internal pressure of the downstream inflation portion 48 without increasing the internal pressure of the upstream inflation portion 47 before the occupant restraint.

Further, it is effective for a case where the restraint and protection of the occupant are desired to be performed by causing larger amount of inflation gas to flow out during the occupant restraint than that before the occupant restraint, and performing the reduction of the internal pressure of the upstream inflation portion 47 and the increase in the internal pressure of the downstream inflation portion 48 at an early stage.

Modifications of the Thirty-Fourth Embodiment

The thirty-fourth embodiment may be modified as follows.

The woven fabric 124 with the enlarged gap portions 125 (openings) may be used only at a part of the dividing portion 50.

The inflation portion 46 does not necessarily need to be divided by the dividing portion 50, that is, may be configured by one chamber. In this case, the wall portion of the inflation portion 46 is configured by the inner fabric portion 43 and the outer fabric portion 44.

However, a part of the wall portion (inner fabric portion 43 and outer fabric portion 44) is formed of a different member from the remainder of the wall portion. The aforementioned part is connected to the remainder of the wall portion by the first joining portion provided in the peripheral portion of the part.

Further, the woven fabric 124 with the enlarged gap portions 125 (openings) is used at least a part of the inner fabric portion 43 and the outer fabric portion 44.

Thirty-Fifth Embodiment

Figure 67:
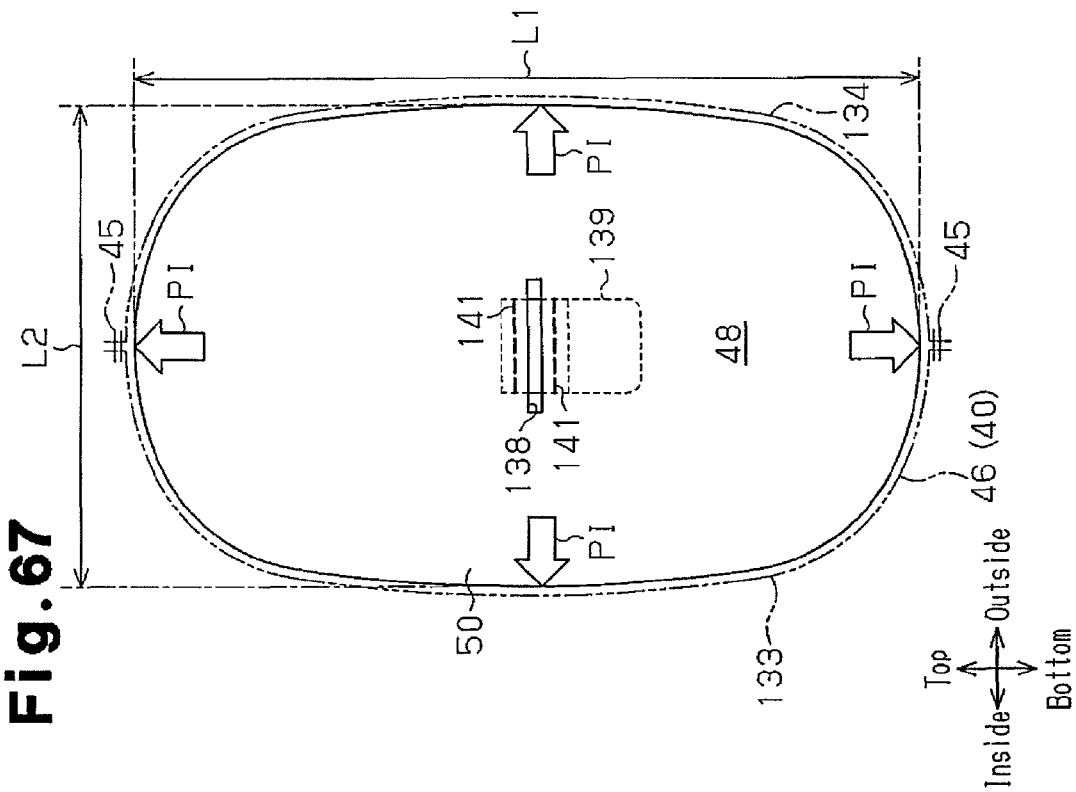
FIG. 67 is a front view showing a state in which a dividing portion of the thirty-fifth embodiment is tensed.
Figure 66:
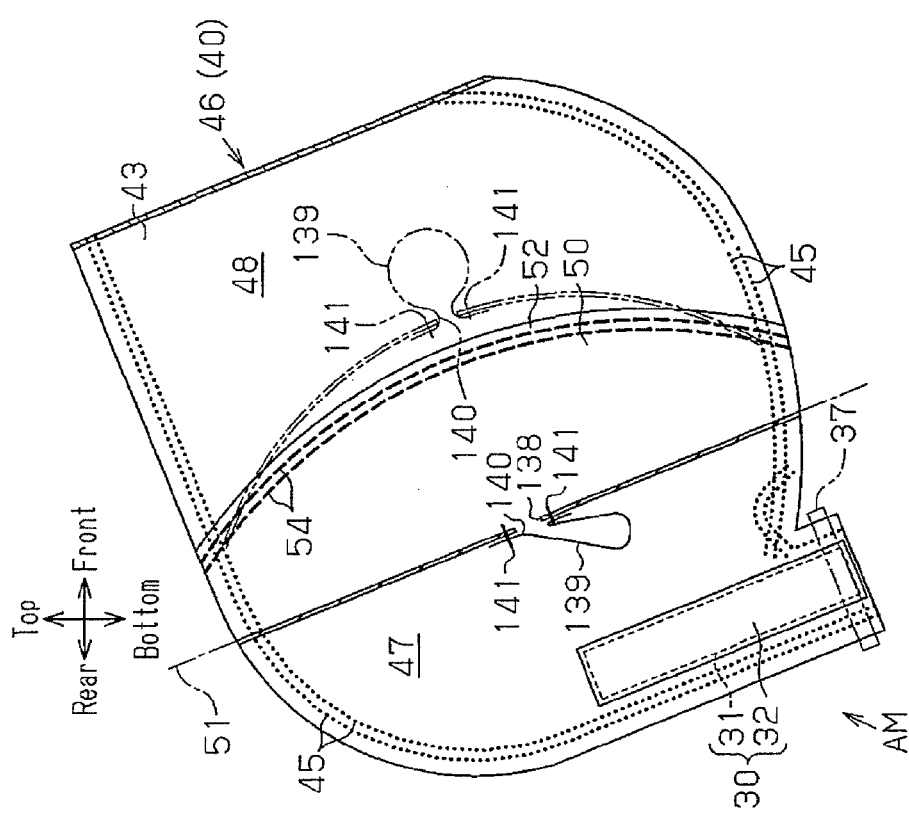
FIG. 66 is a cross-sectional side view of a side airbag apparatus of a thirty-fifth embodiment, showing an internal structure of an airbag module having an airbag in a non-inflated and deployed state.

Next, a side airbag apparatus of the thirty-fifth embodiment will be described with reference to FIG. 66 to FIG. 68.

In the thirty-fifth embodiment, an inflation portion 46 is divided by a dividing portion 50 into an upstream inflation portion 47 and a downstream inflation portion 48. When an airbag 40 is in a non-inflated and deployed state, the dividing portion 50 is overlapped in a lateral direction (vehicle widthwise direction) by being folded in half along a folding line 51 extending in a vertical direction (up and down direction). The dividing portion 50 in this state is arranged in the upstream inflation portion 47 in a state in which the folding line 51 is positioned on an upstream side of the inner end 52 and the outer end 53.

The dividing portion 50 configures a part of a wall portion of the upstream inflation portion 47. In the dividing portion 50, an opening 138 formed of a laterally elongated hole extending in a lateral direction (vehicle widthwise direction) in a tensed state of the dividing portion 50. The opening 138 is provided at a center portion in the lateral direction (vehicle widthwise direction), which is a center portion in a vertical direction (up and down direction), however, it may be provided at a section different from the above.

In the upstream inflation portion 47, a bag 139 is arranged as a pre-restraint flowing out apparatus. An opening portion 140 of the bag 139 is connected to the dividing portion 50 in a state in which both side parts in a lateral direction (vehicle widthwise direction) of the opening 138 being exposed. This connection is performed by a pair of joining portions 141 provided respectively on an upper side and a lower side of the opening 138. Of the opening 138, portions other than the side parts in the lateral direction (vehicle widthwise direction) are in a state of being lidded from an upstream inflation portion 47 by the bag 139.

The configurations other than the above are similar to the thirty-fourth embodiment. Therefore, elements identical to the thirty-fourth embodiment are given the same reference numerals, and redundant descriptions are omitted.

In the thirty-fifth embodiment configured as above, an internal pressure of the upstream inflation portion 47 is low before an occupant restraint by the upstream inflation portion 47, and the bag 139 is in a slack state whereby it clings to the dividing portion 50. Most portions of the opening 138 are in a state of being concealed by the bag 139, and the inflation gas in the upstream inflation portion 47 is restricted from flowing out through the opening 138. At this time, a part of the opening 138 (both side parts in the lateral direction (vehicle widthwise direction)) is exposed from the bag 139. Therefore, despite being before the occupant restraint by the upstream inflation portion 47, a part of the inflation gas in the upstream inflation portion 47 starts to flow out from the upstream inflation portion 47 to the downstream inflation portion 48 through this exposed portion (both side parts of the opening 138). A starting time of this outflow is earlier than that in a case in which the opening 138 is closed before the occupant restraint by the upstream inflation portion 47.

However, since the internal pressure of the upstream inflation portion 47 at this time is not as high as during the occupant restraint, the inflation gas passing through the opening 138 is not so ample. Therefore, the upstream inflation portion 47 of which internal pressure has been decreased by the outflow of the inflation gas is pressed against the occupant, whereby the occupant is restrained, and the impact from a side transmitted to the occupant is reduced by the upstream inflation portion 47.

Upon the occupant restraint by the upstream inflation portion 47, the internal pressure of the upstream inflation portion 47 rises by an external force applied due to the restraint more than before the occupant restraint, and the bag 139 is pushed out to outside the upstream inflation portion 47 through the opening 138. A part of the inflation gas in the upstream inflation portion 47 passes through the opening 138, and starts to flow in the bag 139. Further, at this time, the both side parts of the opening 138 in the lateral direction (vehicle widthwise direction) are exposed from the bag 139, and a part of the inflation gas in the upstream inflation portion 47 passes through this exposed portion (both side parts of the opening 138) and starts to flow out to outside the upstream inflation portion 47 and outside the bag 139.

Thus, the thirty-fifth embodiment achieves advantages as follows in addition to the advantages of (33) as above.

(35) The bag 139 is provided in the upstream inflation portion 47 as the pre-restraint flowing out apparatus, and the opening portion 140 of the bag 139 is connected to the dividing portion 50 in the state of having a part of the opening 138 (both side parts in the lateral direction (vehicle widthwise direction)) exposed.

Therefore, the inflation gas in the upstream inflation portion 47 can be caused to flow out to the downstream inflation portion 48 through the exposed portion of the opening 138 (both side parts in the lateral direction (vehicle widthwise direction)) from before the occupant restraint by the upstream inflation portion 47.

Modifications of the Thirty-Fifth Embodiment

The thirty-fifth embodiment may be modified as follows.

The inflation portion 46 does not necessarily need to be divided by the dividing portion 50, that is, may be configured by one chamber. In this case, the wall portion of the inflation portion 46 is configured by the inner fabric portion 43 and the outer fabric portion 44.

However, a part of the wall portion (inner fabric portion 43 and outer fabric portion 44) is formed of a different member from the remainder of the wall portion. Further, the aforementioned part is connected to the remainder of the wall portion by the first joining portion provided in the peripheral portion of the part. Further, the opening 138 and the bag 139 are provided at either portions of the inner fabric portion 43 and the outer fabric portion 44.

Modifications in Common to the First to Thirty-Fifth Embodiments

The first to thirty-fifth embodiments as described above may be modified as follows.

<As to Housing Portion 21 of Airbag Module AM>

Instead of the seat back 14 of the vehicle seat 12, a portion corresponding to the housing portion 21 may be provided in the body side portion 11, and the airbag module AM may be assembled therein.

<As to Inflator Assembly 30>

The inflator assembly 30 may be provided outside the airbag 40. In this case, the inflator 31 and the upstream inflation portion 47 (or the inflation portion 46) are coupled by a tube, and the inflation gas from the inflator 31 may be provided to the upstream inflation portion 47 (or the inflation portion 46) via this tube.

<As to Inflation Portion 46>

Substantially an entirety of the airbag 40 may be configured by the inflation portion 46 as in the first to thirty-fifth embodiments, however, the airbag 40 may include as its part a non-inflation portion to which the inflation gas is not supplied and that does not inflate.

<Others>

A target of protection among the upper half of the body of the occupant by the side airbag apparatus may differ from the first to thirty-fifth embodiments as above.

The side airbag apparatus can be adapted to a side airbag apparatus of a type that protects the occupant from the impact in a case where the impact from the side (front and rear direction of the motor vehicle) is applied to the vehicle seat 12 in a motor vehicle in which the vehicle seat 12 is arranged in a posture by which the seat back 14 faces a direction different from the front of the motor vehicle, for example the side.

The motor vehicles to which the side airbag apparatus as above is adapted include not only private cars, but also various industrial vehicles.

The side airbag apparatus may be adapted to a side airbag apparatus installed in a seat of a vehicle other than motor vehicles, for example, airplanes, ships and the like.

The invention claimed is:

1. A side airbag apparatus comprising:
an airbag that includes an inflation portion that inflates by inflation gas supplied in response to an impact applied from a side to a vehicle seat, and that deploys toward a front of the vehicle seat at a side of the vehicle seat, wherein an opening is provided in a wall portion forming the inflation portion; and
an outflow amount changing apparatus, wherein, when the inflated part of the inflation portion restrains an occupant, the outflow amount changing apparatus changes an amount of the inflation gas flowing out from the inflated part to an outflow amount that is different from an outflow amount in a case in which the inflation gas passes through only the opening,
wherein
the wall portion is configured by a dividing portion that is arranged in the inflation portion and divides at least a part of the inflation portion into an upstream inflation portion, to which the inflation gas is supplied, and a downstream inflation portion, which is adjacent to the upstream inflation portion and to which the inflation gas is supplied via the opening,
the opening is configured by a slit that is provided in the dividing portion and extends in a widthwise direction of the vehicle seat when the dividing portion comes to be in a tensed state,
the outflow amount changing apparatus is configured be an auxiliary opening, and
the auxiliary opening is configured by a slit provided in a section of the dividing portion that is different from the opening, and the slit extends in the widthwise direction of the vehicle seat when the dividing portion comes to be in the tensed state,
the dividing portion is connected to an inner fabric portion and an outer fabric portion of the upstream inflation portion by first joining portions, the dividing portion is configured to protrude frontward, and
the auxiliary opening is provided at at least one location adjacent to an upper end and a lower end of the dividing portion.

2. The side airbag apparatus according to claim 1, wherein the dimension in the lateral direction of the dividing portion is the largest at a center portion in the vertical direction of the dividing portion, and the dimension in the lateral direction of the dividing portion decreases from the center portion toward upper and lower ends of the dividing portion.

3. A side airbag apparatus comprising:
an airbag that includes an inflation portion that inflates by inflation gas supplied in response to an impact applied from a side to a vehicle seat, and that deploys toward a front of the vehicle seat at a side of the vehicle seat, wherein an opening is provided in a wall portion forming the inflation portion; and
an outflow amount changing apparatus, wherein, when the inflated part of the inflation portion restrains an occupant, the outflow amount changing apparatus changes an amount of the inflation gas flowing out from the inflated part to an outflow amount that is different from an outflow amount in a case in which the inflation gas passes through only the opening,
wherein
the wall portion is configured by a dividing portion that is arranged in the inflation portion and divides at least a part of the inflation portion into an upstream inflation portion, to which the inflation gas is supplied, and a downstream inflation portion, which is adjacent to the upstream inflation portion and to which the inflation gas is supplied via the opening,
the opening is configured by a slit that is provided in the dividing portion and extends in a widthwise direction of the vehicle seat when the dividing portion comes to be in a tensed state,
the outflow amount changing apparatus is configured by an auxiliary opening,
the auxiliary opening is configured by a slit provided in a section of the dividing portion that is different from the opening, and extends in the widthwise direction of the vehicle seat when the dividing portion comes to be in the tensed state,
a dimension of the dividing portion in a vertical direction is set larger than a dimension of the dividing portion in a lateral direction,
at least one of the opening and the auxiliary opening is provided as a specific opening at a section in the vertical direction where an external force applied due to the occupant restraint by the upstream inflation portion is the largest, and
the opening and the auxiliary opening with the dividing portion in the tensed state are more forcefully pulled in the lateral direction than in the vertical direction, and thereby close.

4. The side airbag apparatus according to claim 3, wherein the opening and the auxiliary opening are provided at sections in an up and down direction that are offset from a section where an external force applied due to the occupant restraint by the upstream inflation portion is the largest.

5. The side airbag apparatus according to claim 3, wherein the dimension in the lateral direction of the dividing portion is the largest at a center portion in the vertical direction of the dividing portion, and the dimension in the lateral direction of the dividing portion decreases from the center portion toward upper and lower ends of the dividing portion.

* * * * *